US007392288B2

(12) United States Patent
Ooi et al.

(10) Patent No.: US 7,392,288 B2
(45) Date of Patent: Jun. 24, 2008

(54) INFORMATION PROCESSING APPARATUS, INFORMATION PROCESSING METHOD, INFORMATION EXCHANGING METHOD, RECORDING MEDIUM, AND PROGRAM

(75) Inventors: Junji Ooi, Kanagawa (JP); Yutaka Hasegawa, Kanagawa (JP); Akitsugu Tsuchiya, Tokyo (JP)

(73) Assignee: Sony Corporation, Tokyo (JP)

( * ) Notice: Subject to any disclaimer, the term of this patent is extended or adjusted under 35 U.S.C. 154(b) by 790 days.

(21) Appl. No.: 10/093,611

(22) Filed: Mar. 11, 2002

(65) Prior Publication Data

US 2002/0133552 A1 Sep. 19, 2002

(30) Foreign Application Priority Data

Mar. 15, 2001 (JP) ............................. 2001-073361
Jan. 31, 2002 (JP) ............................. 2002-024780

(51) Int. Cl.
*G06F 15/16* (2006.01)
(52) U.S. Cl. ...................................................... 709/205
(58) Field of Classification Search ......... 709/220–222, 709/201, 203, 205; 719/318; 717/125; 361/308.1; 711/101–115
See application file for complete search history.

(56) References Cited

U.S. PATENT DOCUMENTS

| 5,619,250 | A  | * | 4/1997 | McClellan et al. | 725/132 |
| 5,721,827 | A  | * | 2/1998 | Logan et al. | 709/217 |
| 5,732,216 | A  | * | 3/1998 | Logan et al. | 709/203 |
| 6,457,099 | B1 | * | 9/2002 | Gilbert | 711/115 |
| 6,529,728 | B1 | * | 3/2003 | Pfeffer et al. | 455/418 |
| 6,704,189 | B2 | * | 3/2004 | Yoshii et al. | 361/308.1 |
| 6,715,139 | B1 | * | 3/2004 | Kodosky et al. | 717/125 |
| 6,725,260 | B1 | * | 4/2004 | Philyaw | 709/220 |
| 6,725,281 | B1 | * | 4/2004 | Zintel et al. | 719/318 |
| 6,854,009 | B1 | * | 2/2005 | Hughes | 709/220 |
| 6,963,897 | B1 | * | 11/2005 | Hubbard | 709/201 |

FOREIGN PATENT DOCUMENTS

| EP | 0 767 564 | 4/1997 |
| EP | 0 878 940 | 11/1998 |

(Continued)

OTHER PUBLICATIONS

Behler et al., Real time information exchange between data acquisition and control system at ASDEX upgrade, Real Time Conference, 1999 Santa Fe 1999, 11th IEEE NPSS, Jun. 14-18, 1999, pp. 264-267.*

(Continued)

*Primary Examiner*—Jason Cardone
*Assistant Examiner*—Thomas Duong
(74) *Attorney, Agent, or Firm*—Oblon, Spivak, McClelland, Maier & Neustadt, P.C.

(57) ABSTRACT

In an arrangement wherein a first personal computer and a second personal computer perform peer-to-peer communication, and the first personal computer has an additional function module which the second personal computer does not have, the first personal computer and the second personal computer can perform peer-to-peer communication based on the additional function module. Accordingly, the functions of a function module can be used for communication even in the event that not all terminals communicating have the function module.

8 Claims, 44 Drawing Sheets

FOREIGN PATENT DOCUMENTS

| | | |
|---|---|---|
| EP | 0 891 063 | 1/1999 |
| JP | 60-077259 | 5/1985 |
| JP | 62-212763 | 9/1987 |
| JP | 4-096168 | 3/1992 |
| JP | 4-347733 | 12/1992 |
| JP | 9-223020 | 8/1997 |
| JP | 11-312154 | 11/1999 |
| WO | WO 01/15021 | 3/2001 |

OTHER PUBLICATIONS

IBM Technical Disclosure Bulletin, Bollella, G., et al. "Supporting Advanced Peer-to-Peer Networking Session Services Extensions Protocols Over Non-Systems Network Architecture Transport Networks", vol. 39, No. 11, Nov. 1996, pp. 153-160.

* cited by examiner

FIG. 29

```
ACCESS KEY

PORT NO. TO BE USED

NUMBER OF IP ADDRESSES
APPROPRIATED TO SERVER

IP ADDRESS 1 OF SERVER

IP ADDRESS 2 OF SERVER
            ⋮
```

| ID | MODULE NAME | TYPE | ACTIVATION FLAG |
|---|---|---|---|
| 0x00001001 | ChatMgr | 0x00000000 | 0x01 |
| 0x00001007 | JoinLive | 0x00000005 | 0x00 |
| ⋮ | ⋮ | ⋮ | ⋮ |

| ID | USER NAME | IP ADDRESS |
|---|---|---|
| 0x00009876 | Suzuki | 201.123.45.6 |
| 0x00001234 | Sato | 192.168.1.2 |
| ⋮ | ⋮ | ⋮ |

INFORMATION PROCESSING APPARATUS, INFORMATION PROCESSING METHOD, INFORMATION EXCHANGING METHOD, RECORDING MEDIUM, AND PROGRAM

BACKGROUND OF THE INVENTION

1. Field of the Invention

The present invention relates to an information processing apparatus and method, recording medium, and program, and particularly relates to an information processing apparatus and method, recording medium, and program, wherein information necessary for establishing a communication connection can be obtained with simple procedures.

2. Description of the Related Art

Terminals connected to a network can communicate by executing communication programs corresponding to the network.

However, in the event that communication is attempted using predetermined functions realized on the communication programs, it has been necessary for all terminals communicating with one another to have a module for realizing the functions. That is to say, a terminal which does not have that module cannot communicate using that function, even in the event that a terminal with which it is communicating has the module.

SUMMARY OF THE INVENTION

The present invention has been made in light of the above, and accordingly, it is an object thereof to enable all terminals communicating with each other using the functions of the function module and communicate, even in the event that not all of the terminals have the function module.

To this end, according to a first aspect of the present invention, an information processing apparatus comprises: holding means for holding a function module necessary for using a predetermined function; first transmitting means for transmitting the function module to another information processing apparatus; specifying means for specifying processing of the function; first executing means for executing the processing specified by the specifying means, following the function module; receiving means for receiving information obtained by the other information processing apparatus by executing the processing of the function following the function module transmitted from the other information processing apparatus, and identification information of the function; second executing means for executing, by following the function module, the processing of the function identified by the identification information received by the receiving means, corresponding to information obtained by the other information processing apparatus executing the processing of the function following the function module received by the receiving means; and second transmitting means for transmitting, to the other information processing apparatus, information obtained by executing the processing of the function by the first executing means or the second executing means, and the identification information.

According to a second aspect of the present invention, an information processing method comprises: a holding step for holding a function module necessary for using a predetermined function; a first transmitting step for transmitting the function module to another information processing apparatus; a specifying step for specifying processing of the function; a first executing step for executing the processing specified in the specifying step, following the function module; a receiving step for receiving information obtained by the other information processing apparatus by executing the processing of the function following the function module transmitted from the other information processing apparatus, and identification information of the function; a second executing step for executing, by following the function module, the processing of the function identified by the identification information received in the receiving step, corresponding to information obtained by the other information processing apparatus executing the processing of the function following the function module received in the receiving step; and a second transmitting step for transmitting, to the other information processing apparatus, information obtained by executing the processing of the function in the first executing step or the second executing step, and the identification information.

According to a third aspect of the present invention, a recording medium storing a computer-readable program comprises: code for a holding step for holding a function module necessary for using a predetermined function; code for a first transmitting step for transmitting the function module to another information processing apparatus; code for a specifying step for specifying processing of the function; code for a first executing step for executing the processing specified in the specifying step, following the function module; code for a receiving step for receiving information obtained by the other information processing apparatus by executing the processing of the function following the function module transmitted from the other information processing apparatus, and identification information of the function; code for a second executing step for executing, by following the function module, the processing of the function identified by the identification information received in the receiving step, corresponding to information obtained by the other information processing apparatus executing the processing of the function following the function module received in the receiving step; and code for a second transmitting step for transmitting, to the other information processing apparatus, information obtained by executing the processing of the function in the first executing step or the second executing step, and the identification information.

According to a fourth aspect of the present invention, a program causes a computer to execute processing comprising at least: a holding step for holding a function module necessary for using a predetermined function; a first transmitting step for transmitting the function module to another information processing apparatus; a specifying step for specifying processing of the function; a first executing step for executing the processing specified in the specifying step, following the function module; a receiving step for receiving information obtained by the other information processing apparatus by executing the processing of the function following the function module transmitted from the other information processing apparatus, and identification information of the function; a second executing step for executing, by following the function module, the processing of the function identified by the identification information received in the receiving step, corresponding to information obtained by the other information processing apparatus executing the processing of the function following the function module received in the receiving step; and a second transmitting step for transmitting, to the other information processing apparatus, information obtained by executing the processing of the function in the first executing step or the second executing step, and the identification information.

With the present invention configured as described above, a function module necessary for using a predetermined function is held, the function module is transmitted to another information processing apparatus, processing of the function is specified, the processing that has been specified is executed following the function module, information obtained by another information processing apparatus by executing the processing of the function following the function module transmitted from the other information processing apparatus, and identification information of the function, are received, the processing of the function identified by the received identification information which corresponds to received information obtained by the other information processing apparatus executing the processing of the function following the function module, is executed, by following the function module, information obtained by executing the processing of the function, and the identification information is transmitted to the other information processing apparatus.

According to a fifth aspect of the present invention, an information processing apparatus comprises: first receiving means for receiving a function module necessary for using predetermined functions, transmitted from another information processing apparatus; specifying means for specifying processing of the function; first executing means for executing the processing specified by the specifying means, following the function module; second receiving means for receiving information obtained by the other information processing apparatus by executing the processing of the function following the function module transmitted from the other information processing apparatus, and identification information of the function; second executing means for executing, by following the function module, the processing of the function identified by the identification information received by the second receiving means, corresponding to information obtained by the other information processing apparatus executing the processing of the function following the function module received by the second receiving means; and transmitting means for transmitting, to the other information processing apparatus, information obtained by executing the processing of the function by the first executing means or the second executing means, and the identification information.

According to a sixth aspect of the present invention, an information processing method comprises: a first receiving step for receiving a function module necessary for using predetermined functions, transmitted from another information processing apparatus; a specifying step for specifying processing of the function; a first executing step for executing the processing specified by the specifying means, following the function module; a second receiving step for receiving information obtained by the other information processing apparatus by executing the processing of the function following the function module transmitted from the other information processing apparatus, and identification information of the function; a second executing step for executing, by following the function module, the processing of the function identified by the identification information received in the second receiving step, corresponding to information obtained by the other information processing apparatus executing the processing of the function following the function module received in the second receiving step; and a transmitting step for transmitting, to the other information processing apparatus, information obtained by executing the processing of the function in the first executing step or the second executing step, and the identification information.

According to a seventh aspect of the present invention, a recording medium storing a computer-readable program comprises: code for a first receiving step for receiving a function module necessary for using predetermined functions, transmitted from another information processing apparatus; code for a specifying step for specifying processing of the function; code for a first executing step for executing the processing specified in the specifying step, following the function module; code for a second receiving step for receiving information obtained by the other information processing apparatus by executing the processing of the function following the function module transmitted from the other information processing apparatus, and identification information of the function; code for a second executing step for executing, by following the function module, the processing of the function identified by the identification information received in the second receiving step, corresponding to information obtained by the other information processing apparatus executing the processing of the function following the function module received in the second receiving step; and code for a transmitting step for transmitting, to the other information processing apparatus, information obtained by executing the processing of the function in the first executing step or the second executing step, and the identification information.

According to an eighth aspect of the present invention, a program causes a computer to execute processing comprising at least: a first receiving step for receiving a function module necessary for using predetermined functions, transmitted from another information processing apparatus; a specifying step for specifying processing of the function; a first executing step for executing the processing specified in the specifying step, following the function module; a second receiving step for receiving information obtained by the other information processing apparatus by executing the processing of the function following the function module transmitted from the other information processing apparatus, and identification information of the function; a second executing step for executing, by following the function module, the processing of the function identified by the identification information received in the second receiving step, corresponding to information obtained by the other information processing apparatus executing the processing of the function following the function module received in the second receiving step; and a transmitting step for transmitting, to the other information processing apparatus, information obtained by executing the processing of the function in the first executing step or the second executing step, and the identification information.

With the present invention configured as described above, a function module necessary for using predetermined functions that has been transmitted from another information processing apparatus is received, processing of the function is specified, the processing specified in the specifying step is executed following the function module, information obtained by the other information processing apparatus by executing the processing of the function following the function module transmitted from the other information processing apparatus, and identification information of the function, is received, the processing of the function identified by the received identification information which corresponds to received information obtained by the other information processing apparatus executing the processing of the function following the function module received in the second receiving step is executed by following the function module, and information obtained by executing the processing of the function, and the identification information, is transmitted to the other information processing apparatus.

According to a ninth aspect of the present invention, an informational exchange method for exchanging, between a plurality of information processing apparatuses connected via a computer network, information obtained by executing processing following a function module necessary for using a predetermined function, comprises: an information transmitting step for transmitting the information from a transmitting side information processing apparatuses for transmitting the information, to another information processing apparatus; a function module transmitting step for transmitting the function module from the transmitting side information processing apparatuses to a receiving side information processing apparatus for receiving the information, in the event that the function module does not exist at the receiving side information processing apparatus; a function module storing step for storing the function module in storing means provided to the receiving side information processing apparatus; and an information exchanging step for exchanging the information between the transmitting side information processing apparatuses and the receiving side information processing apparatus, by executing processing following the function module at the receiving side information processing apparatus.

According to a tenth aspect of the present invention, a recording medium stores a computer-readable program for exchanging, between a plurality of information processing apparatuses connected via a computer network, information obtained by executing processing following a function module necessary for using a predetermined function, the program comprising: code for an information transmitting step for transmitting the information from a transmitting side information processing apparatuses for transmitting the information, to another information processing apparatus; code for a function module transmitting step for transmitting the function module from the transmitting side information processing apparatuses to a receiving side information processing apparatus for receiving the information, in the event that the function module does not exist at the receiving side information processing apparatus; code for a function module storing step for storing the function module in storing means provided to the receiving side information processing apparatus; and code for an information exchanging step for exchanging the information between the transmitting side information processing apparatuses and the receiving side information processing apparatus, by executing processing following the function module at the receiving side information processing apparatus.

According to a further aspect of the present invention, a program causes a computer to execute processing for exchanging, between a plurality of information processing apparatuses connected via a computer network, information obtained by executing processing following a function module necessary for using a predetermined function, the processing comprising at least: an information transmitting step for transmitting the information from a transmitting side information processing apparatuses for transmitting the information, to another information processing apparatus; a function module transmitting step for transmitting the function module from the transmitting side information processing apparatuses to a receiving side information processing apparatus for receiving the information, in the event that the function module does not exist at the receiving side information processing apparatus; a function module storing step for storing the function module in storing means provided to the receiving side information processing apparatus; and an information exchanging step for exchanging the information between the transmitting side information processing apparatuses and the receiving side information processing apparatus, by executing processing following the function module at the receiving side information processing apparatus.

According to the present invention configured as described above, at the time of multiple information processing apparatuses exchanging information processed by a particular function module, even in the event that the function module does not exist at the receiving side information processing apparatus, the function module can be transmitted from the transmitting side information processing apparatus. Accordingly, the information processed by the function module can be exchanged by the receiving side information processing apparatus executing the function module provided from the transmitting side information processing apparatus.

BRIEF DESCRIPTION OF THE DRAWINGS

FIG. 29 is a model diagram illustrating the structure of data of connection setting information used for the communication program.

DESCRIPTION OF THE PREFERRED EMBODIMENTS

First Embodiment

Figure 1:
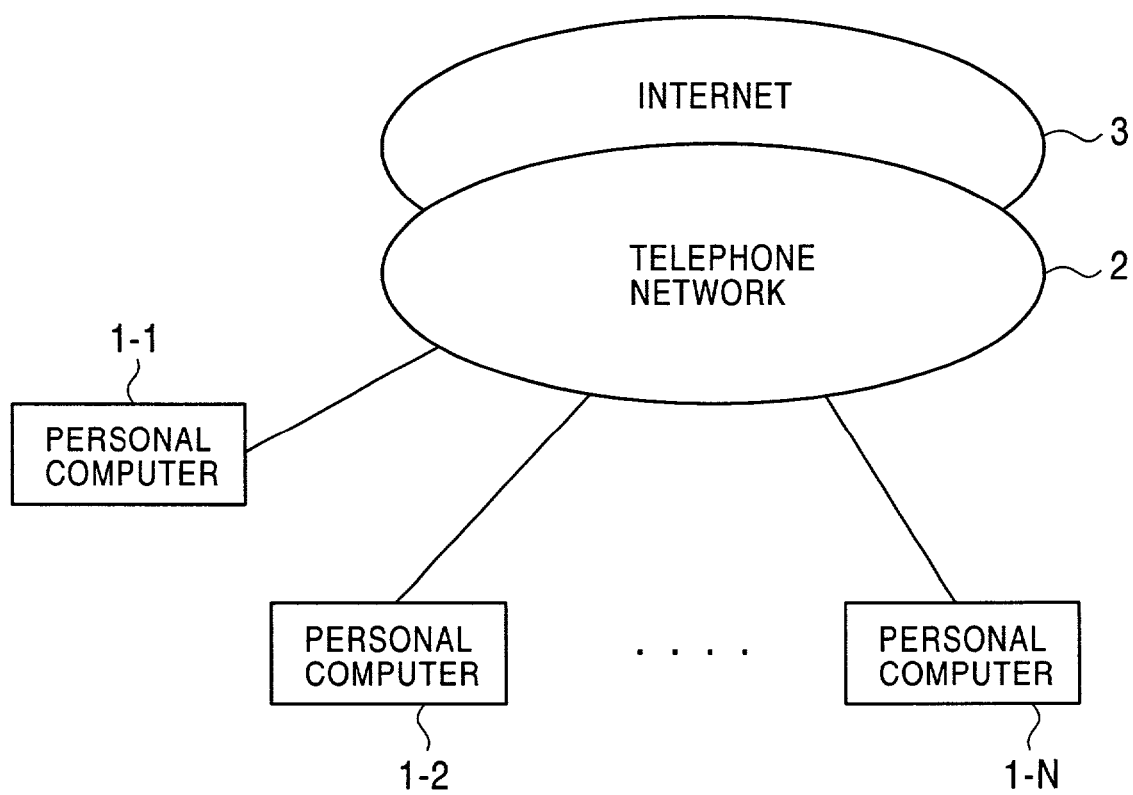
FIG. 1 is a schematic configuration diagram of a communication system illustrated as a first embodiment of the present invention.

First, a first embodiment of the present invention will be described in detail with reference to the drawings. FIG. 1 illustrates a configuration example of a communication system to which the present invention has been applied.

An N number of personal computers 1-1 through 1-N (simply referred to as "personal computer 1" in the event that there is no need to distinguish between individual computers) are connected to the Internet 3 via a telephone network 2 and respective Internet providers (not shown).

A personal computer 1 can exchange e-mail via the Internet 3. That is to say, the IP addresses of the personal computers 1 are registered with the respective e-mail servers (not shown) connected to the Internet 3.

Figure 2:
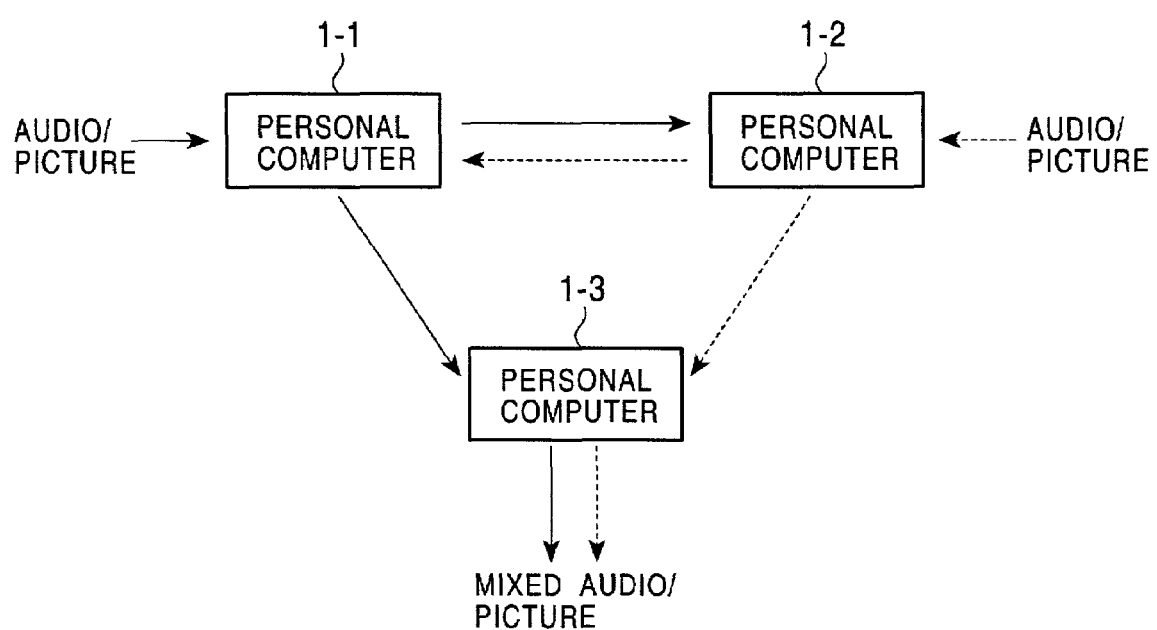
FIG. 2 is a diagram describing peer-to-peer communication.

The personal computer 1 is also capable of peer-to-peer communication via the telephone network 2, for example. Performing peer-to-peer communication allows, for example, as shown in FIG. 2, audio and pictures taken into the personal computer 1-1 to be directly supplied to personal computers 1-2 and 1-3 without going through a server, and audio and pictures taken into the personal computer 1-2 to be directly supplied to personal computers 1-1 and 1-3 without going through a server. At the personal computer 1-3, the audio and pictures supplied from each of the personal computers 1-1 and 1-2 are mixed and output (i.e., reproduced).

Now, the communication connection for this peer-to-peer communication is established, for example, by e-mail attached with the IP address of the personal computer 1-1 being transmitted from the personal computer 1-1 to desired communication destination, for example, the personal computer 1-2, the personal computer 1-2 opening the e-mail, and obtaining the IP address attached to the e-mail. That is to say, with the communication system to which the present invention is applied, communication connections for peer-to-peer communication are established using IP addresses already registered on the Internet 3 (more precisely, IP addresses registered in e-mail servers).

A personal computer 1 can communicate based on a function module (hereafter referred to as "additional function module") as long as at least one of the personal computers 1 communicating with one another have the additional function module.

For example, in the event that the personal-computer 1-1 and the personal computer 1-2 are to perform peer-to-peer communication, even in a case wherein the personal computer 1-1 has the additional function module but the personal computer 1-2 does not have it, peer-to-peer communication can be carried out between the personal computer 1-1 and the personal computer 1-2, based on the additional function module.

FIGS. 3 through 6 illustrate an external view of the personal computer 1-1.

Figure 3:
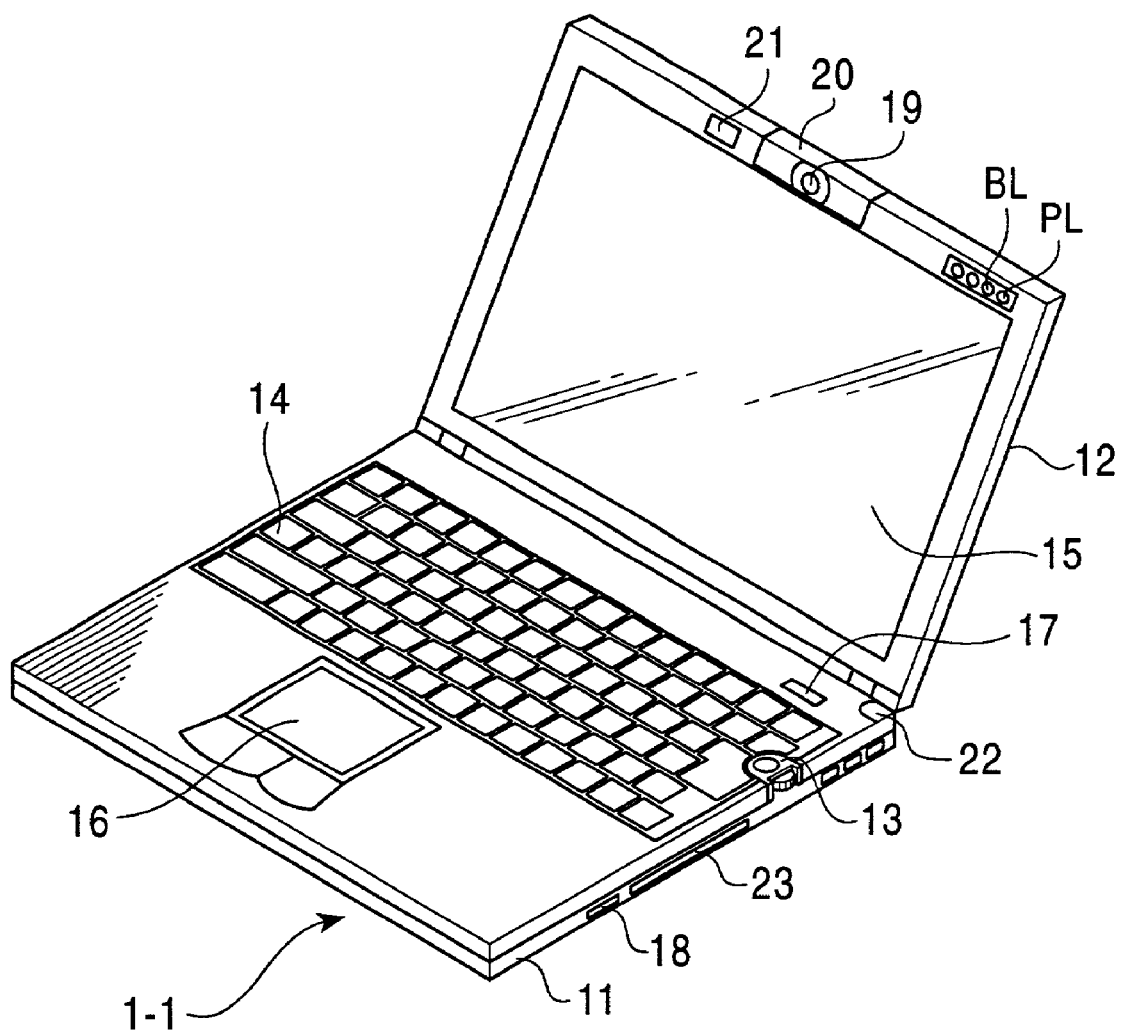
FIG. 3 is a diagram illustrating a configuration example of the exterior of the personal computer 1-1.
Figure 4:
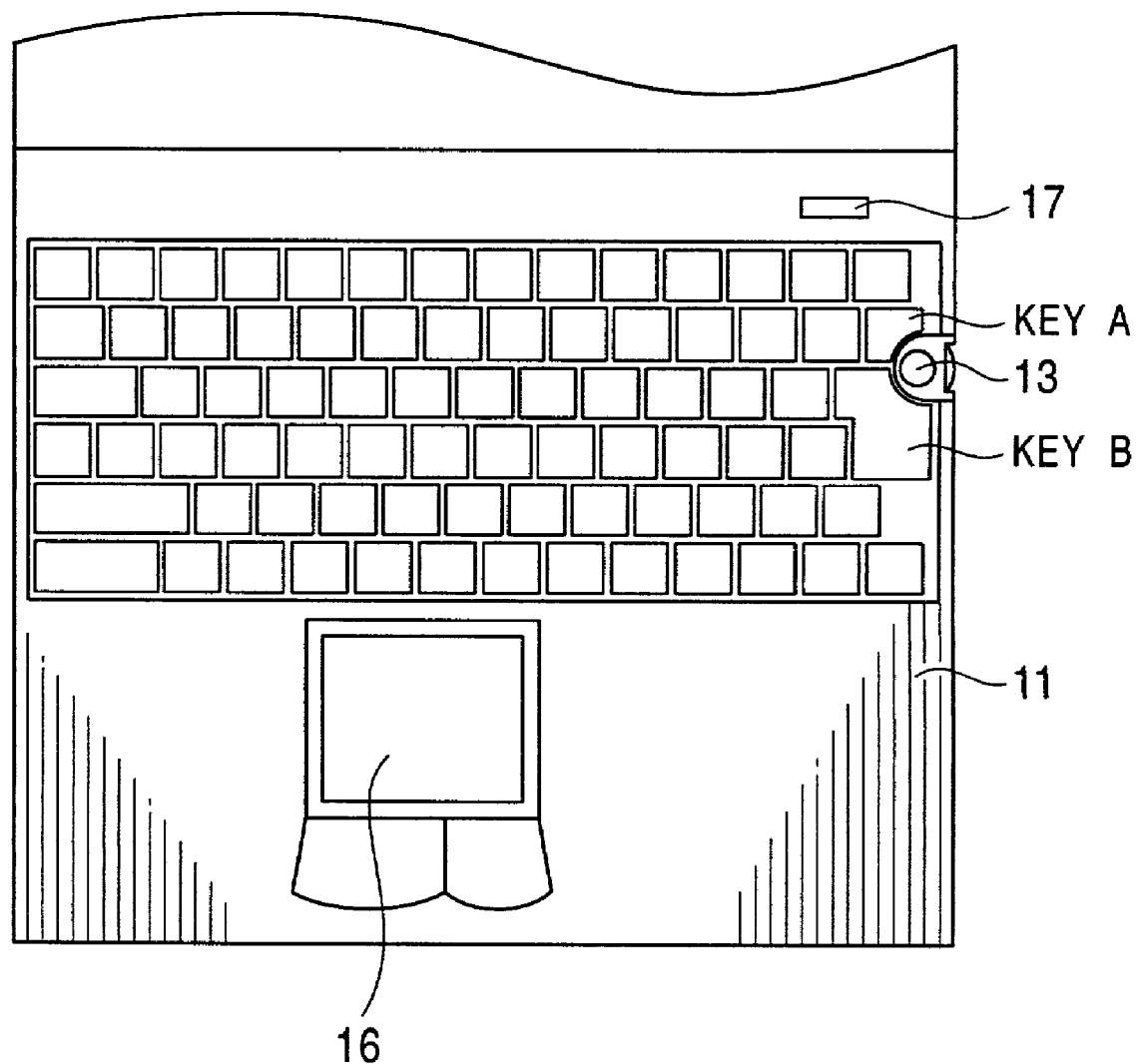
FIG. 4 is another diagram illustrating a configuration example of the exterior of the personal computer 1-1.
Figure 5:
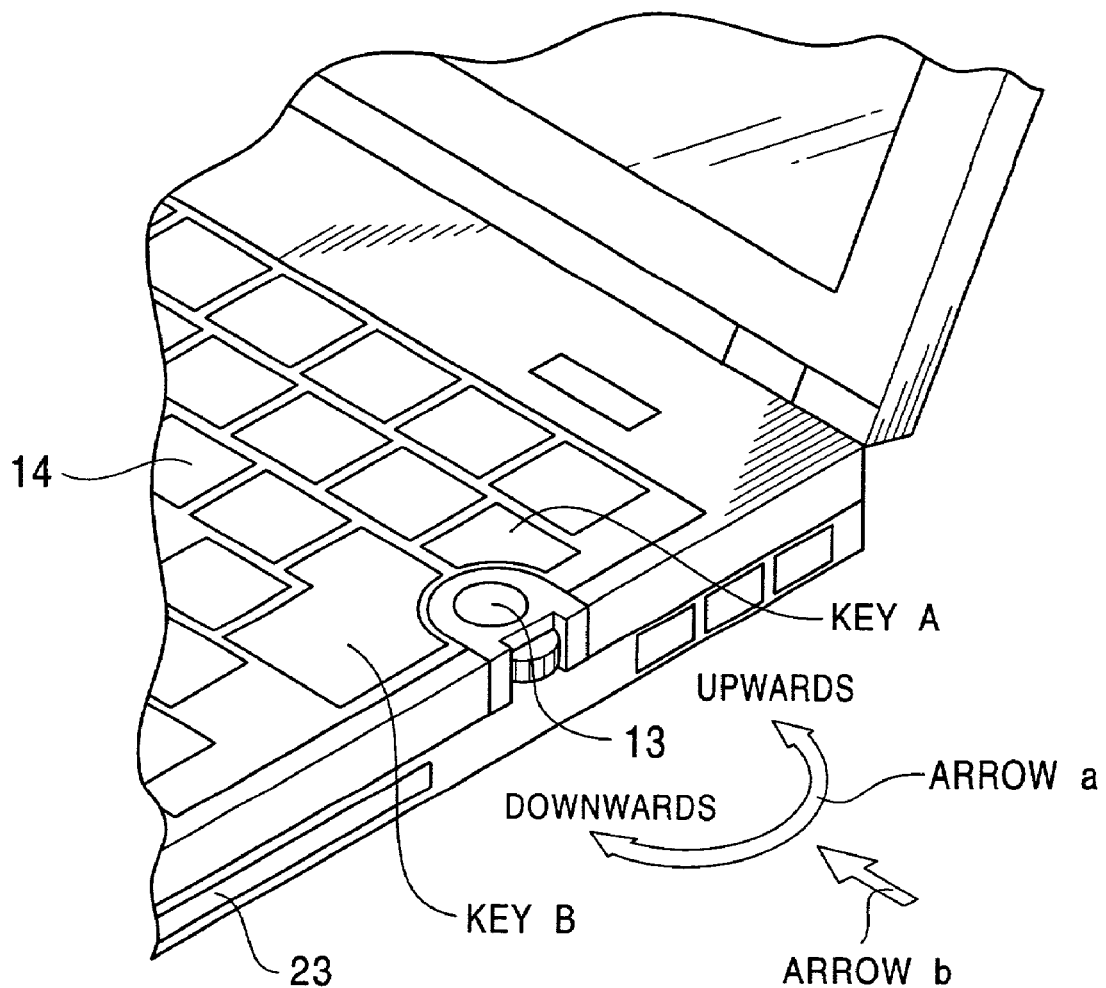
FIG. 5 is yet another diagram illustrating a configuration example of the exterior of the personal computer 1-1.
Figure 6:
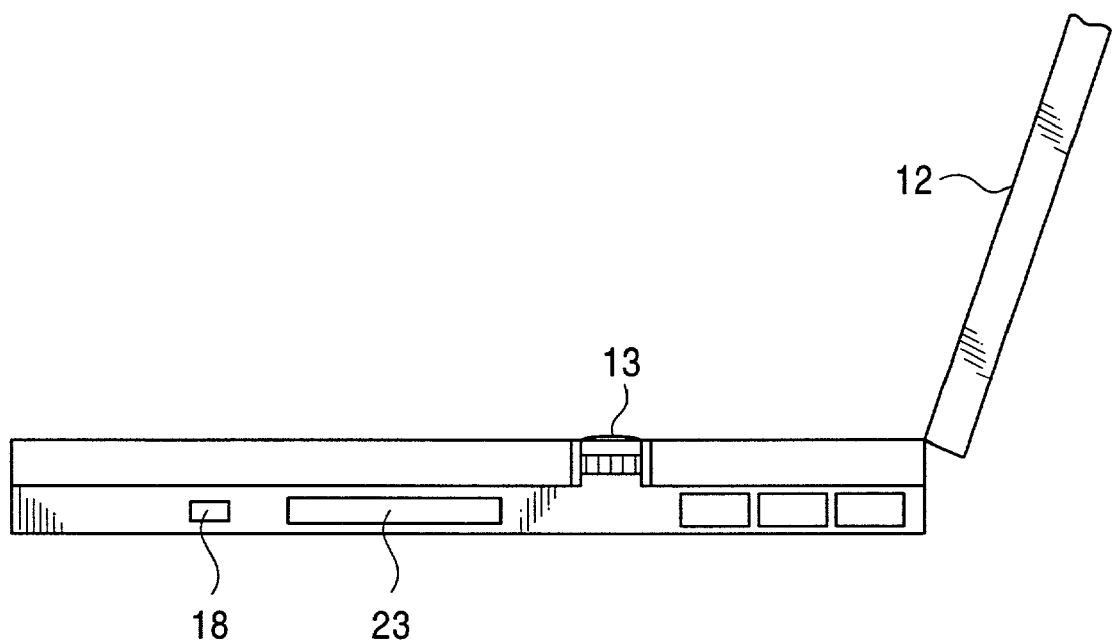
FIG. 6 is yet another diagram illustrating a configuration example of the exterior of the personal computer 1-1.

The personal computer 1-1 is basically configured of a main unit 11, and the display unit 12 which can open and close as to the main unit 11. FIG. 3 is an external perspective view illustrating the state wherein the display unit 12 is opened as to the main unit 11. FIG. 4 is a plan view of the main unit 11, and FIG. 5 is an enlarged view of a later-described jog dial 13 provided on the main unit 11. Also FIG. 6 is a side view of the jog dial 13 provided on the main unit 11.

Provided on the upper face of the main unit 11 are a keyboard 14 which is operated for inputting various types of characters and symbols, etc., a touchpad 16 serving as a pointing device operated for moving a pointer (mouse cursor) displayed on an LCD 15, and an electric power switch 17. Also the jog dial 13 and an IEEE 1394 port 18 and the like are provided on the side. Note that a stick type pointing device may be provided instead of the touchpad 16.

Provided on the front of the display unit 12 are the LCD (Liquid Crystal Display) 15 for displaying images, and at the upper right thereof, an electric power source lamp PL, a battery lamp BL, a message lamp ML (not shown) and other LED lamps. Further, provided at the upper central portion of the display unit 12, are an imaging unit 20 having a CCD video camera 19 comprising a CCD (Charge-Coupled Device), and a microphone 21. A shutter button 22 for operating the CCD video camera 19 is provided at the upper right side of the main unit 11 in FIG. 3.

The imaging unit 20 is rotatably fixed to the display unit 12. For example, the user can rotate the CCD video camera 19 from a position to where it can take an image of the user him/herself operating the personal computer 1-1, to a position taking images in the same direction as the field of view of the user operating the personal computer 1-1.

Next, the jog dial 13 is attached between a key A and key B disposed on the right side of the keyboard 14 on the main unit 11 in FIG. 4, for example, with the upper face thereof being at approximately the same height as the key A and key B. The jog dial 13 executes predetermined processing corresponding to rotational operation there of indicated by the arrow a in FIG. 5 (for example, scrolling a screen), and executes predetermined processing corresponding to rotational operation thereof indicated by the arrow b in the figure (for example, okaying selection of an icon).

The IEEE (Institute of the Electrical and Electronics Engineers) 1394 port 18 has a structure based on the standards stipulated in IEEE 1394, and a cable based on the standards stipulated in IEEE 1394 is connected thereto.

Next, an example of the internal configuration of the personal computer 1-1 will be described with reference to FIG. 7.

A CPU (Central Processing Unit) 51 is configured of a Pentium (a registered trademark) manufactured by Intel, for example, and is connected to a host bus 52. Further connected to the host bus 52 is a bridge (a so-called North bridge) 53, the bridge 53 having an AGP (Accelerated Graphics Port) 50 and being connected to a PCI (Peripheral Component Interconnect/Interface) bus 56.

The bridge 53 is configured of a 400BX which is an AGP Host Bridge Controller manufactured by Intel, or the like, and controls the CPU 51 and RAM (Random-Access Memory) 54 (so-called main memory) and the like. Further, the bridge 53 controls a video controller 57 via the AGP 50. Note that this bridge 53 and a bridge (a so-called South bridge (PCI-ISA Bridge)) 58 make up a so-called chip set.

The bridge 53 is also connected to cache memory 55. The cache memory 55 is configured of memory capable of executing writing or reading operations at higher speed than the RAM 54 such as SRAM (Static RAM) or the like, and caches (temporarily stores) programs and data which the CPU 51 uses.

Further, the CPU 51 has therein a primary cache capable of operating at higher speeds than the cache memory 55, operated by the CPU 51 itself.

The RAM 54 is configured of DRAM (Dynamic RAM), for example, and stores programs to be executed by the CPU 51, or data necessary for the CPU 51 to operate. Specifically, for example, the RAM 54 stores an e-mail program 54A, auto-pilot program 54B, jog dial state monitoring program 54C, jog dial driver 54D, operating system 54E, communication program 54F, additional function module 54G, and other application program 54H, loaded from a hard disk drive 67 at a certain timing.

The e-mail program 54A is a program for exchanging communication text (e-mail) via a modem 75, telephone network 2, Internet provider, e-mail server, and Internet 3.

The auto-pilot program 54B is a program for sequentially activating multiple processing (or programs) set beforehand in the order set beforehand.

The jog dial state monitoring program 54C receives notification regarding to whether compatible with the jog dial 13 or not, from the above described application programs, and if compatible with the jog dial 13, what can be done by operating the jog dial 13 is displayed on the LCD 15.

The jog dial state monitoring program 54C also, detects events of the jog dial 13 (operations such as the jog dial 13 being rotated in the direction indicated by the arrow a in FIG. 5, or pressed in the direction indicated by the arrow b in FIG. 5), and executes processing corresponding to the detected event. The jog dial driver 54D executes the various functions corresponding to the operations of the jog dial 13.

The operating system 54E is a program which controls the basic operations of a computer, the most representative of these being Windows 95 (a registered trademark) or Windows 98 (a registered trademark) from Microsoft, or the so-called Mac OS (a registered trademark) from Apple Computer, and so forth.

The communication program 54F executes processing for peer-to-peer communication, and also controls the e-mail program 54A to send e-mail attached with the IP address of the personal computer 1-1 to the other party, and obtaining IP addresses from certain e-mail sent from the other party, in order to establish the communication connection.

The communication program 54F also controls the additional function module 54G to perform communication based on the functions of the additional function module 54G.

The additional function module 54G executes predetermined processing following the control of the communication program 54F (described later).

The video controller 57 is connected to the bridge 53 via the AGP 50, to receive data supplied from the CPU 51 via the AGP 50 and bridge 53 (image data, text data, etc.), generate image data corresponding to the received data, and store the generated image data, or the received data as-is, in the built-in video memory. The video controller 57 displays an image corresponding to the image data stored in the video memory on the LCD 15 of the display unit 12.

Also the video controller 57 supplies video data supplied from the CCD video camera 19 to the RAM 54, via the PCI bus 56.

The PCI bus 56 has a sound controller 64 connected thereto. The sound controller 64 takes an audio from the microphone 21, generates data corresponding to the audio, and outputs this to the RAM 54. Also, the sound controller 64 drives a speaker 65, so that the speaker 65 outputs the audio.

Also, the modem 75 is connected to the PCI bus 56. The modem 75 is connected to a telephone network 2, and executes communication processing via the telephone network 2 or the Internet 3.

A PC card slot interface 111 is connected to the PCI bus 56, and supplies data supplied from an interface card 112 mounted to a slot 23 to the CPU 51 or RAM 54, while outputting data supplied from the CPU 51 to the interface card 112. A drive 113 is connected to the PCI bus 56 via of the PC card slot interface 111 and the interface card 112.

The drive 113 reads out data recorded in a mounted magnetic disk 121, optical disk 122, magneto-optical desk 123, or semiconductor memory 124, and supplies the data that has been read out to the RAM 54 via the interface card 112, the PC card slot interface 111, and the PCI bus 56.

Also, a bridge 58 (a so-called South bridge) is also connected to the PCI bus 56. The bridge 58 is configured of a PIIX4E manufactured by Intel, or the like, for example, and has built in an IDE (Integrated Drive Electronics) controller/configuration register 59, an IDE interface 61, a USB interface 68, and so forth. The bridge 58 controls the various types of I/O (Input/Output), such as devices connected to the IDE bus 62, devices connected via an ISA/EIO (Industry Standard Architecture/Extended Input Output) bus 63 or an I/O interface 69, or the like.

The IDE controller/configuration register 59 is configured of the two IDE controllers of a so-called primary IDE controller and the secondary IDE controller, and the configuration register and the like (none of these shown in the figures).

The hard disk drive 67 is connected to the primary IDE controller via the IDE bus 62. Also, in the event that the so-called IDE device such as an unshown CD-ROM drive or hard disk drive is mounted to another IDE bus, the mounted IDE device is electrically connected to the secondary IDE controller.

The hard disk drive 67 records an e-mail program 67A, auto-pilot program 67B, jog dial state monitoring program 67C, jog dial driver 67D, operating system 67E, communication program 67F, additional function module 67G, and other application program 67H and so forth.

The e-mail program 67A through application program 67H and so forth recorded on the hard disk drive 67 are loaded to the RAM 54 as appropriate.

An I/O interface 69 is further connected to the ISA/EIO bus 63. This I/O interface 69 is configured of an embedded controller, with ROM 70, RAM 71, and the CPU 72, being mutually connected therein.

The ROM 70 has stored therein beforehand an IEEE 1394 interface program 70A, LED control program 70B, touchpad input monitoring program 70C, key input monitoring program 70D, wake-up program 70E, and jog dial state monitoring program 70F and so forth.

The IEEE 1394 interface program 70A exchanges data conforming to IEEE 1394 standards (data stored in packets) via the IEEE 1394 port 18. The LED control program 70B performs control to light the electric power source lamp PL, battery lamp BL, the message lamp ML that is provided if necessary, and other LED lamps. The touchpad input monitoring program 70C is a program for monitoring input from the touchpad 16 corresponding to operation by the user.

The key input monitoring program 70D is a program for monitoring input from the keyboard 14 or from other key switches. The wake-up program 70E is a program which checks whether the time is a preset time, based on data indicating the current time that is supplied from a timer circuit (not shown) of the bridge 58, and in the event that the set time has been reached, the electric power source of each chip making up the personal computer 1-1 is managed in order to activate predetermined processing (or programs) or the like. The jog dial state monitoring program 70F is a program for constantly monitoring whether or not the rotating encoder of the jog dial 13 has been rotated, and whether or not the jog dial 13 has been pressed.

A BIOS (Basic Input/Output System) 70G is further written to the ROM 70. The BIOS70G controls handling (input/output) of data between the operating system or application programs, and the peripheral devices (the touchpad 16, keyboard 14, hard disk drive 67, and so forth).

The RAM 71 has registers for LED control, touchpad input status, key input status, or set time, a jog dial state monitoring I/O register, or an IEEE 1394 interface register or the like, as registers 71A through 71F. For example in the event that the jog dial 13 is pressed and the e-mail program 54A has been activated, a predetermined value is stored in the LED control register, and the lighting of the message lamp ML is controlled according to the value stored therein. In the event that the jog dial 13 expressed, a predetermined operation key flag is stored in the key input status register. A certain time is set in the set time register, according to operations of the keyboard 14 or the like by the user.

Also connected to this I/O interface 69 via an unshown connector, are the jog dial 13, touchpad 16, keyboard 14, IEEE 1394 port 18, shutter button 22, and so forth, with signals corresponding to the operations of each of the jog dial 13, touchpad 16, keyboard 14, IEEE 1394 port 18, and shutter button 22, being output to the ISA/EIO bus 63. Also the I/O interface 69 controls exchange of data with devices connected via the IEEE 1394 port 18. Further connected to the I/O interface 69 are the electric power source lamp PL, battery lamp BL, message lamp ML, electric power source control circuit 73, and other LED lamps.

The electric power source control circuit 73 is connected to an internal battery 74 or an AC power source, and supplies necessary power source to each block, while also performing control for charging the internal battery 74 and second batteries of peripheral devices. Also, the I/O interface 69 monitors the electric power switch 17 which is operated when turning the electric power on or off.

Even in the state that electric power is off, the I/O interface 69 executes the IEEE 1394 interface program 70A through the jog dial state monitoring program 70F by means of an internally provided electric power source. In other words, the IEEE 1394 interface program 70A through the jog dial state monitoring program 70F are constantly operating.

Accordingly, even in the event that the electric power switch 17 is off and the CPU 51 is not running the operating system 54E, that I/O interface 69 is executing the jog dial state monitoring program 70F, so in the event that the jog dial 13 is pressed in a power conservation state, or power off state, for example, the personal computer 1-1 activates processing of predetermined software or script file that has been set beforehand.

In this way, with the personal computer 1-1, the jog dial 13 has the functions of a programmable power key (PPK), so there is no need to provide a dedicated key.

The personal computers 1-2 through 1-N are also of the same basic configuration as the personal computer 1-1, so diagrams and description thereof will be omitted.

Next the processing procedures for establishing communication connection for peer-to-peer communication will be described with reference to an example of the personal computer 1-1 attempting peer-to-peer communication with the personal computer 1-2.

Figure 8:
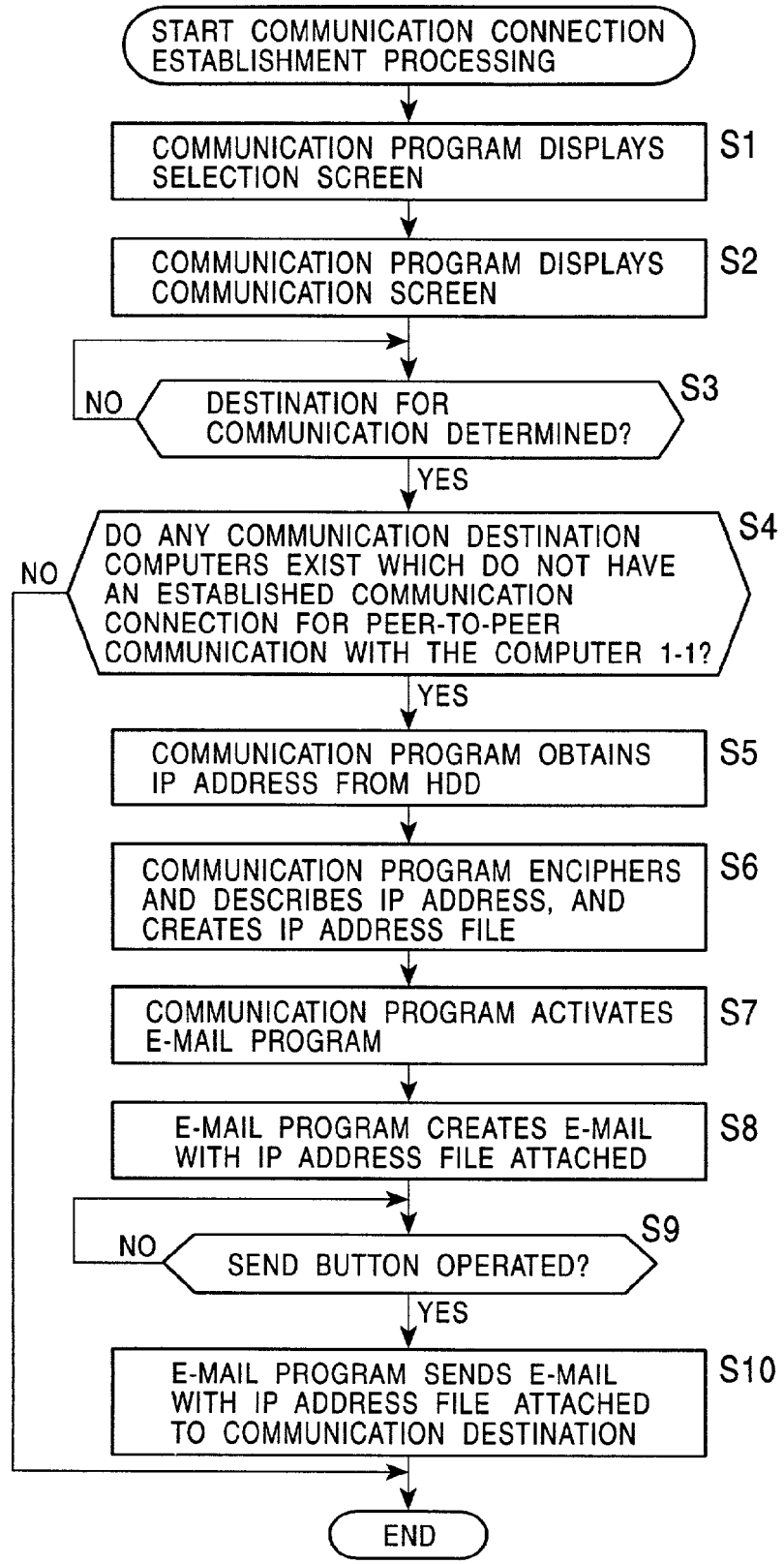
FIG. 8 is a flowchart describing the operation of the personal computer 1-1, for establishing a communication connection for peer-to-peer communication.

First, the operations of the personal computer 1-1 attempting peer-to-peer communication will be described with reference to the flowchart shown in FIG. 8.

Figure 9:
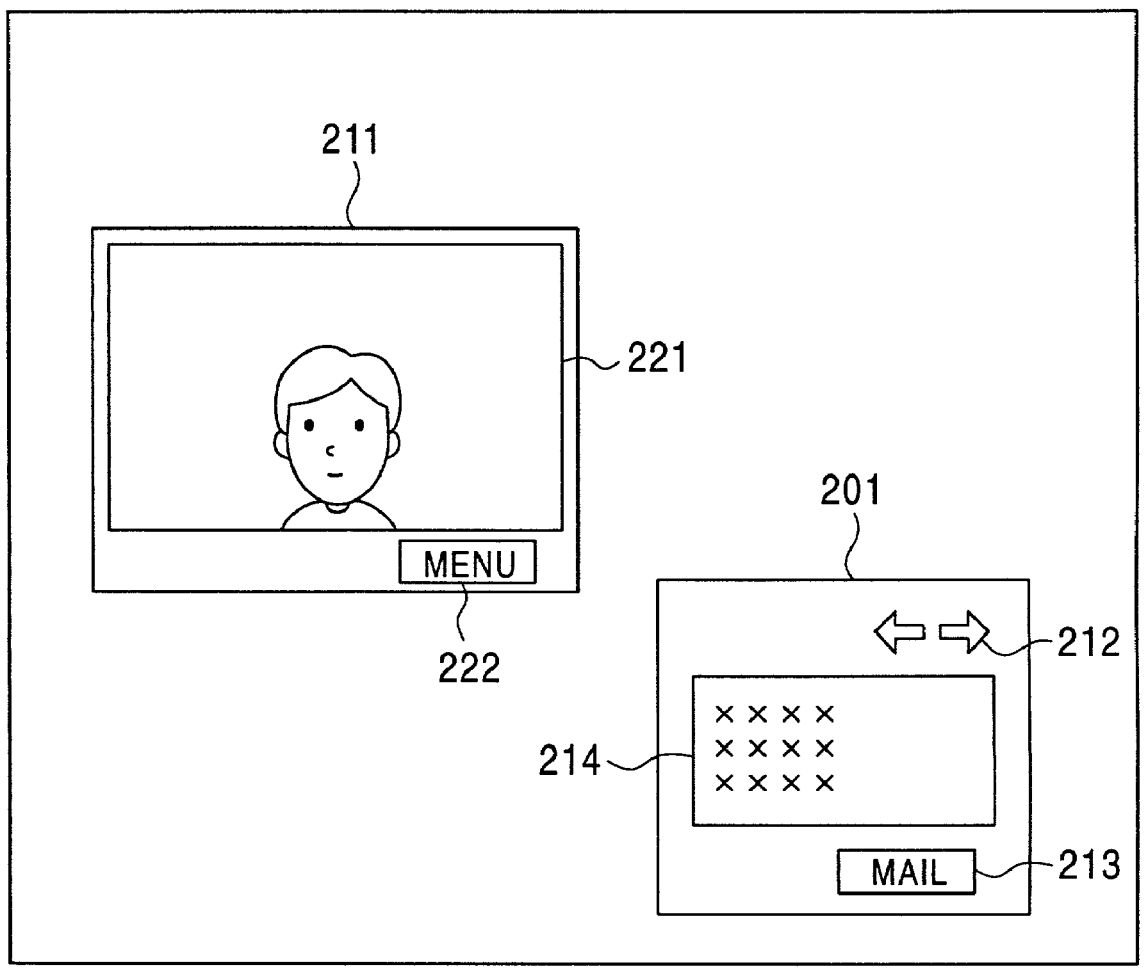
FIG. 9 is a diagram illustrating a display example of the LCD 15 of the personal computer 1-1.

In step S1, the CPU 51 of the personal computer 1-1 executes the communication program 54F, and thereby controlling the video controller 57 to display a screen 201 as shown in FIG. 9 which is operated for selecting the communication destination of peer-to-peer communication (hereafter referred to as "selection screen"), on the LCD 15.

This selection screen 201 comprises a display portion 214 displaying IP addresses and the like of the personal computers 1-2 through 1-N with which peer-to-peer communication can be made, a button 212 operated for switching over the display contents of the display portion 214, and the button 213 operated for selecting a personal computer 1 having an IP address displayed on the display portion 214 as the communication destination of the peer-to-peer communication.

Also, storing the IP addresses of the personal computer 1-2 through 1-N in the hard disk drive 67 or the like, grouped into certain groups beforehand, allows the IP addresses of the personal computers 1-2 through 1-N to be displayed on the display portion 214 by group, and selected by group.

The communication screen 211 displayed in FIG. 9 is not displayed on the LCD 15 at this time yet.

Next, in step S2, the CPU 51 (communication program 54F) of the personal computer 1-1 displays the communication screen 211 displaying the state of the user of the personal computer 1-1 on the LCD 15, as shown in FIG. 9 (in the example shown in FIG. 9, this is displayed to the upper left of the selection screen 201).

The communication screen 211 comprises a display portion 221 where images taken by the CCD video camera 19 (e.g., images of the facial portion of the user operating the personal computer 1-1) are displayed, and a button 222 operated for changing the display contents of the display portion 221.

In step S3, the communication program 54F stands by until the button 213 of the selection screen 201 is operated, and the communication destination of peer-to-peer communication has been decided upon, and once this has been decided, the flow proceeds to step S4. Note that in the following, the personal computer 1 selected as the communication destination for peer-to-peer communication may be referred to as a "communication peer personal computer".

In the case of this example, the button 213 operated with the IP address and so forth of the personal computer 1-2 displayed on the display portion 214, whereby the personal computer 1-2 is set as the communication peer personal computer.

In step S4, the communication program 54F makes judgment regarding whether or not a communication peer personal computer which has not established a communication connection for peer-to-peer communication with a personal computer 1-1 exists at the current time, and in the event that such a personal computer exists, the flow proceeds to step S5.

The personal computer 1-1 and a personal computer 1-2 have not yet established a communication connection for peer-to-peer communication at this time, so the flow proceeds to step S5.

In step S5, the communication program 54F obtains the IP address of the personal computer 1-1 from the hard disk drive 67.

Next, in step S6, the communication program 54F enciphers the IP address of the personal computer 1-1, and writes it to a predetermined file. The communication program 54F then stores the file to which the enciphered IP address has been written (hereafter referred to as "IP address file") in the hard disk drive 67.

In step S7, the communication program 54F activates the e-mail program 54A.

Next, in step S8, the e-mail program 54A generates an e-mail addressed to the communication peer personal computer regarding which judgment has been made in step S4 that communication connection for peer-to-peer communication has not been established, with the IP address file stored in a hard disk drive 67 in step S6 attached thereto, which is displayed on the LCD 15.

Figure 10:
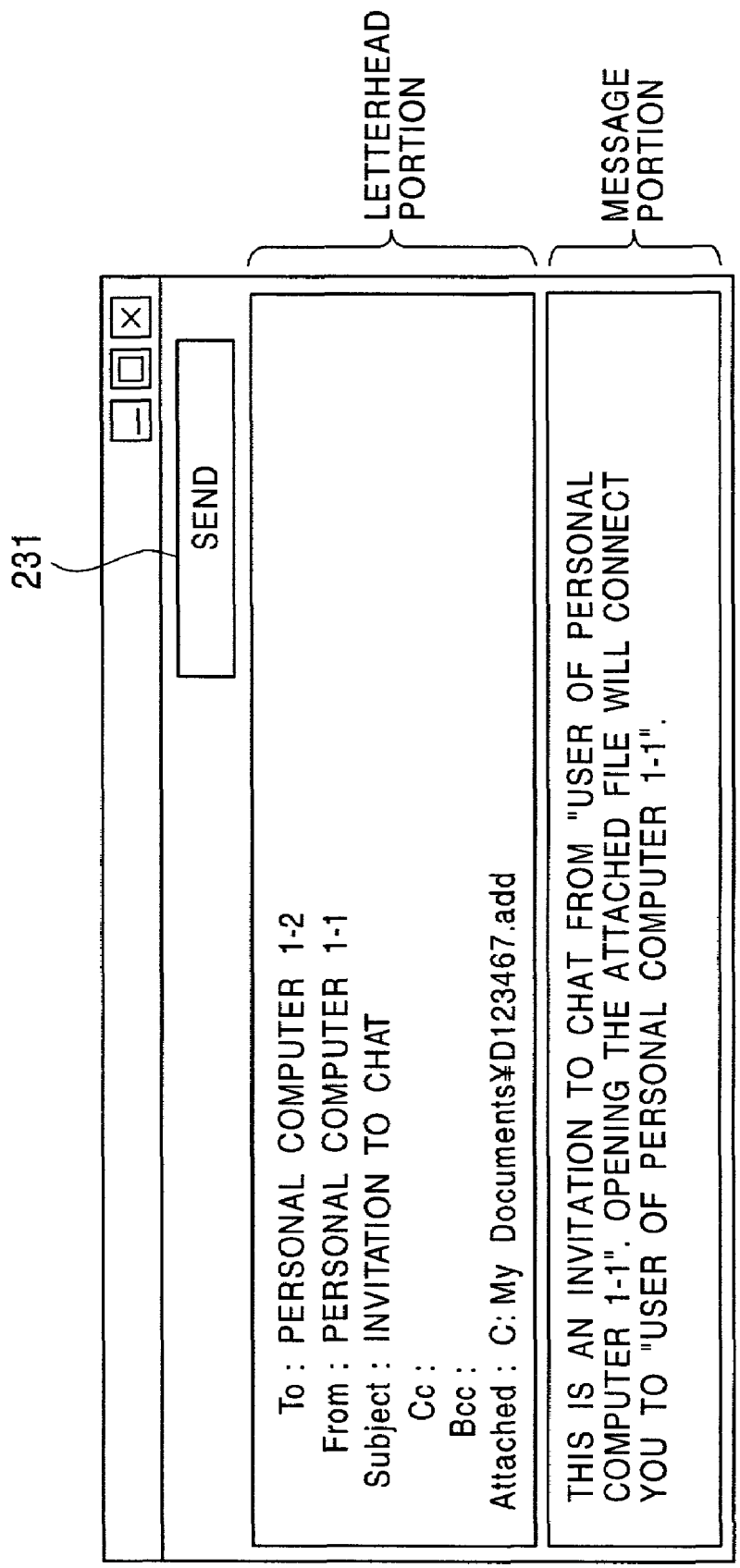
FIG. 10 is a diagram illustrating the contents of e-mail with an IP address file attached.

FIG. 10 is an example of the display of an e-mail addressed to the personal computer 1-2, with the IP address file having the enciphered IP address of the personal computer 1-1 described therein.

Described in the letterhead portion of this e-mail are: the IP address of the personal computer 1-2, which is the addressee; the IP address of the personal computer 1-1, which is the sender; and a directory or the like of the IP address file attached to this e-mail. Also, a preset phrase ("INVITATION TO CHAT") is described in the letterhead portion as the subject of the e-mail.

Described in the message portion of the e-mail is a preset text ("THIS IS AN INVITATION TO CHAT FROM 'USER OF PERSONAL COMPUTER 1-1'. OPENING THE ATTACHED FILE WILL CONNECT YOU TO 'USER OF PERSONAL COMPUTER 1-1'.").

The user of the personal computer 1-1 can change the subject of the e-mail or the text in the message portion, for example, as necessary.

In step S9, the e-mail program 54A stands by until the button 231 (FIG. 10) of the e-mail created in step S8 is operated, and upon operation thereof, the flow proceeds to step S10, and transmits the e-mail created in step S8 to the communication peer personal computer with which communication connection has not yet been established (in the case of this example, the personal computer 1-2).

In step S4, in the event that judgement has been made that a communication connection is established with all communication peer personal computers (in the case of this example, judgement made that a communication connection has already been established between the personal computer 1-2 and personal computer 1-1), or in the event that the processing in step S10 has been performed, the processing ends.

Figure 11:
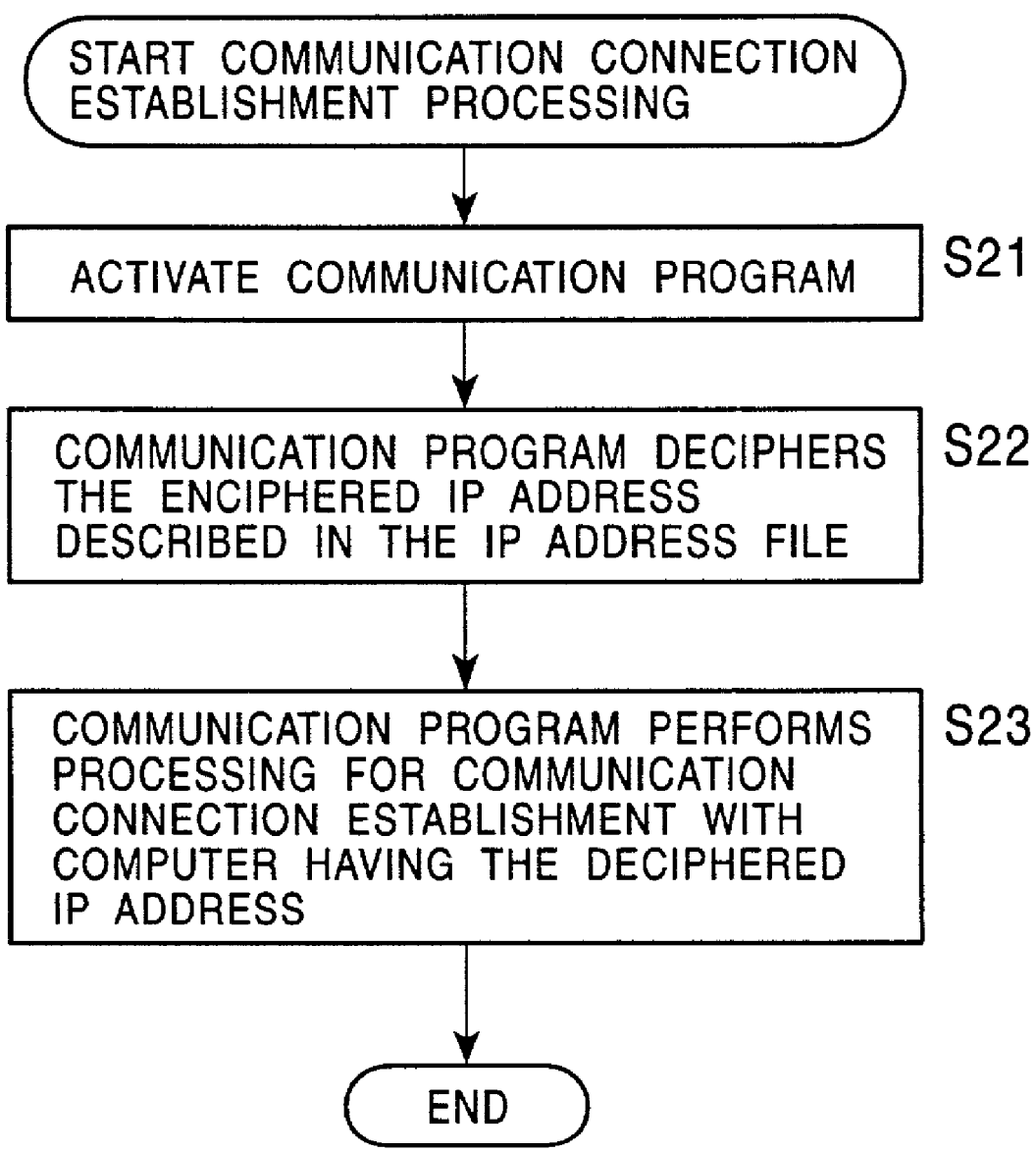
FIG. 11 is a flowchart describing the action of the personal computer 1-2 for establishing a communication connection for peer-to-peer communication.

Next, the operation of the personal computer 1-2 corresponding to the operation of the above described personal computer 1-1 will be described with reference to the flowchart shown in FIG. 11.

In step S21, the CPU of the personal computer 1-2 activates the communication program. In the case of this example, the communication program of the personal computer 1-2 is activated upon opening the IP address file wherein the IP address of the personal computer 1-1 (the enciphered IP address) is described, attached to the e-mail transmitted from the personal computer 1-1 (FIG. 10).

Next in step S22, the CPU (communication program) of the personal computer 1-2 deciphers the enciphered IP address (the IP address of the personal computer 1-1) which is described in the IP address file.

In step S23, the communication program of the personal computer 1-2 performs processing for establishing a communication connection for peer-to-peer communication with the personal computer 1-1 having the IP address that has been deciphered. Note that the communication program 54F of the personal computer 1-1 also at this time performs processing for establishing a communication connection with the personal computer 1-2, corresponding to this processing of the communication program of the personal computer 1-2.

Subsequently, the processing ends.

As described above with the communication system to which the present invention has been applied, a communication connection for peer-to-peer communication can be established simply by transmitting the computer's own IP address to the destination with which communication is desired.

Next, the processing procedures for performing communication based on an additional function module will be described with reference to the flowchart shown in FIG. 12. First description will be made with regard to an example wherein the personal computer 1-1 and the personal computer 1-2 perform peer-to-peer communication using an additional function module 54G for playing a Janken game (hereafter referred to as "Janken additional function module"). Note that in the case of this example, the personal computer 1-1 has the Janken additional function module 67G in the hard disk drive 67, but the personal computer 1-2 does not have it.

Figure 13:
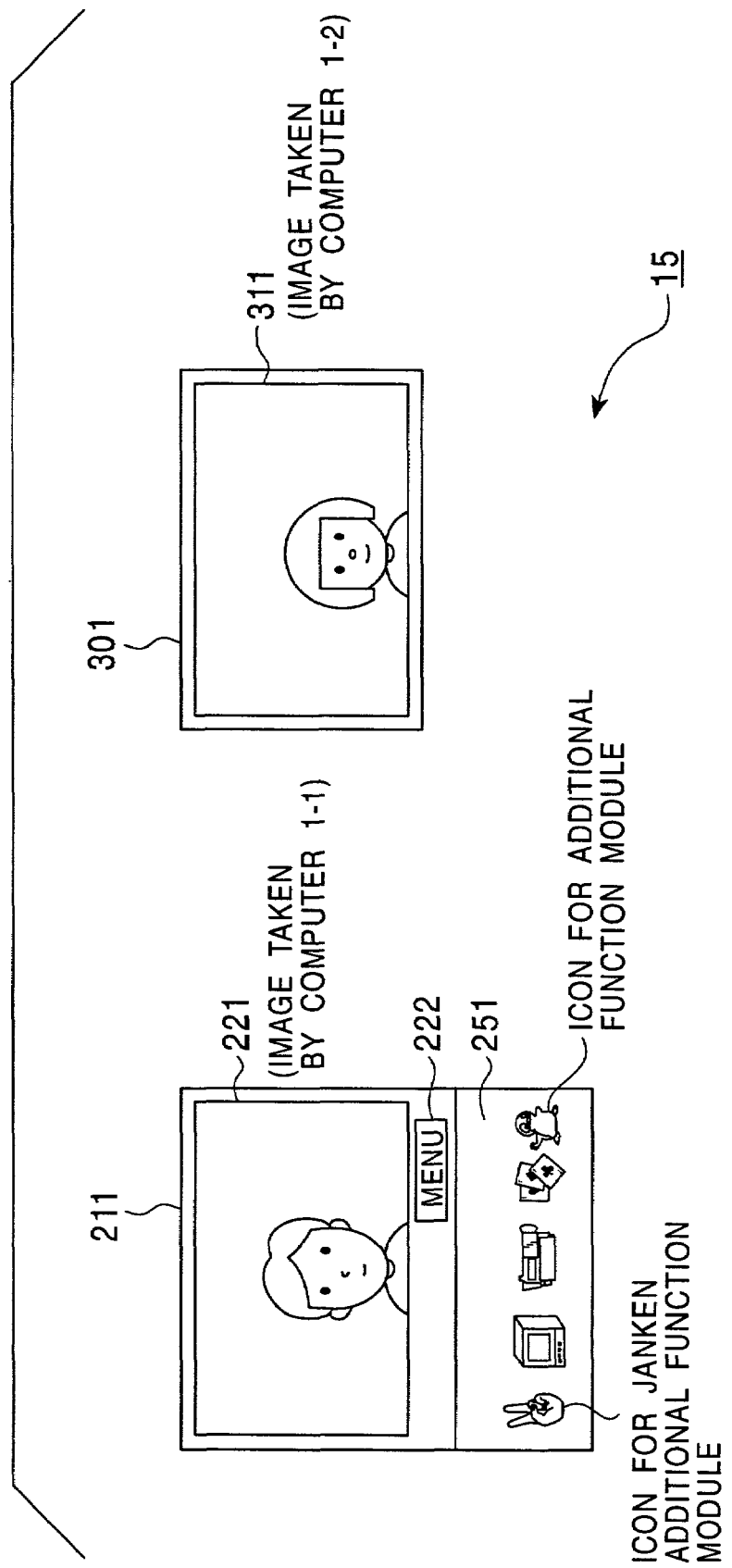
FIG. 13 is a diagram illustrating another example of display on the LCD 15 of the personal computer 1-1.

Also, at this time, the communication connection for peer-to-peer communication between the personal computer 1-1 and the personal computer 1-2 has already been established, and displayed on the LCD 15 of the personal computer 1-1, as shown in FIG. 13, are a communication screen 211 having an image taken by the CCD video camera of the personal computer 1-1 displayed on the display portion 221, an additional function module screen 251 displaying respective icons for the additional function module 67G which the personal computer 1-1 has (including, for example, an icon for the Janken additional function module 67G and an icon of a later-described design additional function module 67G), and a communication screen 301 made up of the display portion 311 and the like displaying an image taken by the personal computer 1-2 and transmitted by peer to peer communication from the personal computer 1-2.

Figure 14:
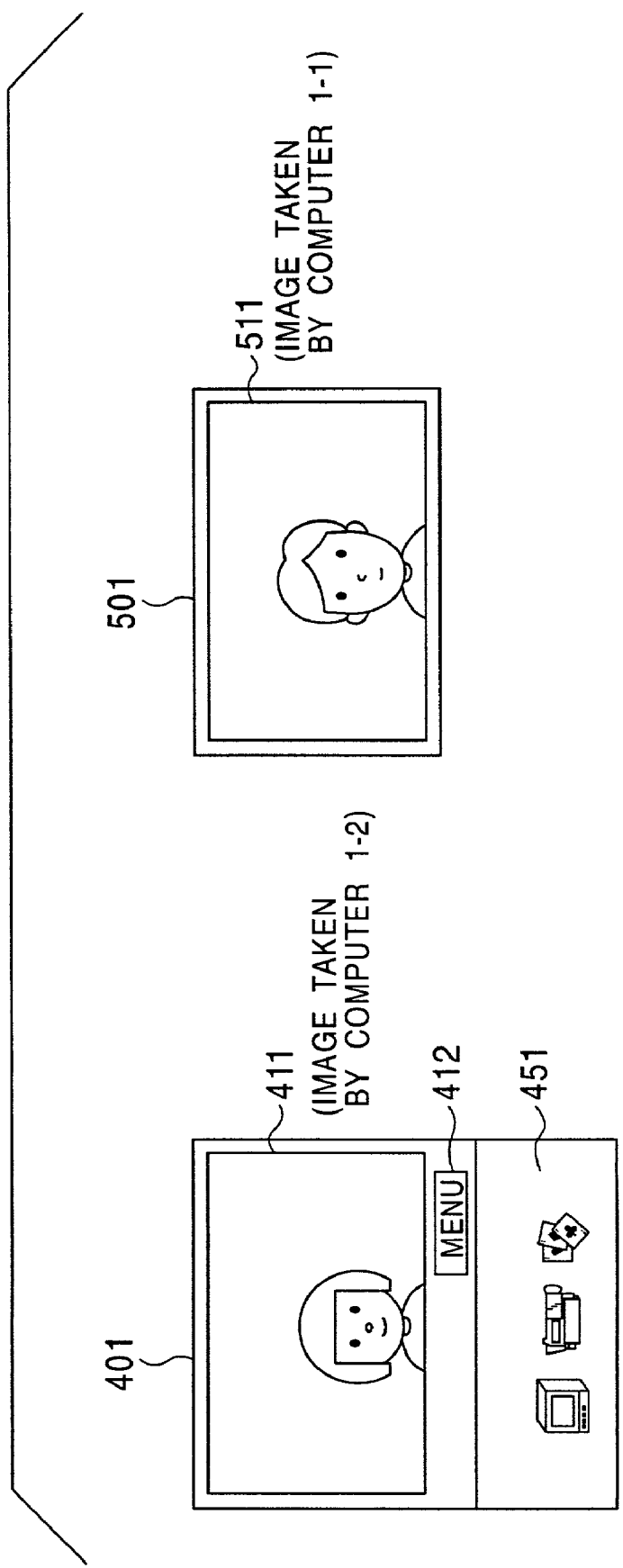
FIG. 14 is a diagram illustrating an example of display on the display portion of the personal computer 1-2.

On the other hand, as shown in FIG. 14, displayed on the display unit of the personal computer 1-2 are a communication screen 401 having an image taken by the personal computer 1-2 displayed on the display portion 411, an additional function module screen 451 displaying respective icons for the Janken additional function module 67G which the personal computer 1-2 has (not including the icon for the Janken additional function module and the icon of a later-described designed addition function module), and a communication screen 501 made up of the display portion 511 and the like displaying an image taken by the personal computer 1-1 and transmitted by peer to peer communication from the personal computer 1-1.

In step S31, the CPU 51 of the personal computer 1-1 loads the communication program 67F to the RAM 45 from the hard disk drive 67, executes the communication program 54F, and stands by until a certain event occurs.

The certain event here is operations with regard to the icon of the additional function module 67G displayed in the additional function module screen 251 (FIG. 13), operation with regard to a certain display (described later) corresponding to the additional function module 67G (more precisely, the additional function module 67G is loaded to the RAM 54, and accordingly is additional function module 54G), and reception of an identifier and display data (described later) transmitted from the personal computer 1-2. That is to say, the communication program 54F of the personal computer 1-1 stands by until the icon of the additional function module 67G is operated, a certain display is operated corresponding to the additional function module 54G, or an identifier and display data are received from the personal computer 1-2.

Now, the user operates the icon of the additional function module 67G displayed on the additional function module screen 251 to start communication using the additional function module 67G, and performs operations with regard to a certain display corresponding to the additional function module 54G to perform certain processing via the additional function module 54G.

In the event that judgement is made in step S31 that a certain event has occurred, the flow proceeds to step S32. In step S32, the communication program 54F of the personal computer 1-1 judges whether or not the event that has occurred in step S31 is due to an operation of the icon of the additional function module 67G, i.e., judges whether or not use of a new additional function module 67G has been requested, and in the event that judgement is made that use of a new additional function module 67G has been requested, the flow proceeds to step S33.

In the case of this example, the user of the personal computer 1-1 operates the touchpad 16 or the like, and clicks on the icon of the Janken additional function module 67G displayed on the additional function module screen 251 (FIG. 13). That is to say, the event that has occurred here is due to operation with regard to the icon of the additional function module 67G (i.e., use of the Janken function module 67G has been requested), so the flow proceeds to step S33.

In step S33, additional function module starting processing is executed. The details of this processing are shown in the flowchart in FIG. 15.

In step S51, the communication program 54F of the personal computer 1-1 loads the additional function module 67G whose icon has been operated, that is, the Janken additional function module 67G, from the hard disk drive 67 to the RAM 54.

Next in step S52, the communication program 54F displays the initial display of the Janken additional function module 54G on the LCD 15 of the display unit 12.

Figure 16:
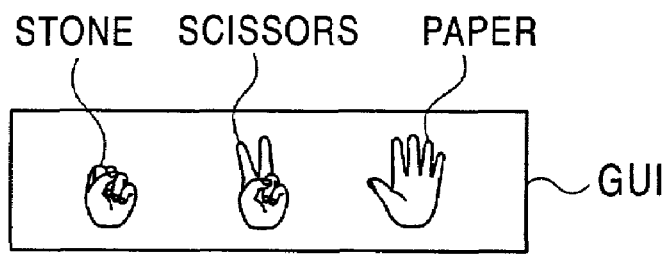
FIG. 16 is a diagram illustrating the GUI displayed as the initial state of a Janken game additional function module.

FIG. 16 shows a display example of the GUI displayed as the initial display of the Janken additional function module 54G. This GUI is made up of a "stone" icon, a "scissors" icon, and a "paper" icon, i.e., three types of icons.

In step S53, the communication program 54F transmits the identifier of the Janken additional function module 54G loaded to the RAM 54 from the hard disk drive 67 in step S51, and data (display data) indicating the initial display of the Janken additional function module 54G (FIG. 16) to the personal computer 1-2.

Subsequently, the processing ends, and the flow proceeds to step S34 in FIG. 12.

In step S34, the communication program 54F of the personal computer 1-1 judges whether or not execution of the communication program 54F has been instructed to quit, and in the event that judgement is made that there has been no such instruction, the flow returns to step S31, and executes subsequent processing.

In the case of this example, there is no instruction to quit the execution of the communication program 54F, so the flow returns to step S31. Also in the case of this example, the user of the personal computer 1-1 operates the touchpad 16 and so forth to click on the "stone" icon of the GUI shown in FIG. 16 which is displayed on the LCD 15 in step S52 in FIG. 15, so the processing further proceeds through step S31 and step S32, on to step S35.

In step S35, the communication program 54F judges whether or not the event that has occurred at step S31 is due to operation with regard to a predetermined display corresponding to the additional function module 54G, and in the event that judgement is made that this is due to operation with regard to a predetermined display corresponding to the additional function module 54G, the flow proceeds to step S36.

The selecting operation with regard to the "stone" icon of the GUI shown in FIG. 16 is an operation with regard to the predetermined display corresponding to the additional function module 54G, so the flow proceeds to step S36.

In step S36, additional function module display changing processing is executed. The details of this processing are shown in the flowchart in FIG. 17.

In step S61, the communication program 54F of the personal computer 1-1 changes the display according to the operation contents with regard to the predetermined display corresponding to the additional function module 54G.

Figure 18:
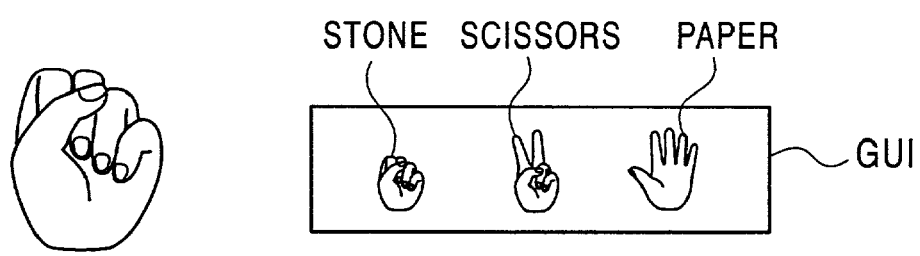
FIG. 18 is a diagram illustrating another example of display on the LCD 15 of the personal computer 1-1.

In the case of this example, the display of FIG. 16 is changed to a display such as shown in FIG. 18, according to the selection operation with regard to the "stone" icon of the GUI. That is to say, a large "stone" display is displayed to the left side of the GUI.

Returning to FIG. 17, in step S62, the communication program 54F transmits the identifier of the Janken additional function module 54G, and the display data representing the display contents of the display changed in step S61 (FIG. 18), to the personal computer 1-2. The personal computer 1-2 receives this.

In step S63, the communication program 54F judges whether or not there have been instructions to quit the use of the Janken additional function module 54G, and in the event that there have been such instructions, the flow proceeds to step S64, the Janken additional function module 54G is unloaded and to the hard disk drive 67, and use of the Janken additional function module 54G is quit.

Figure 12:
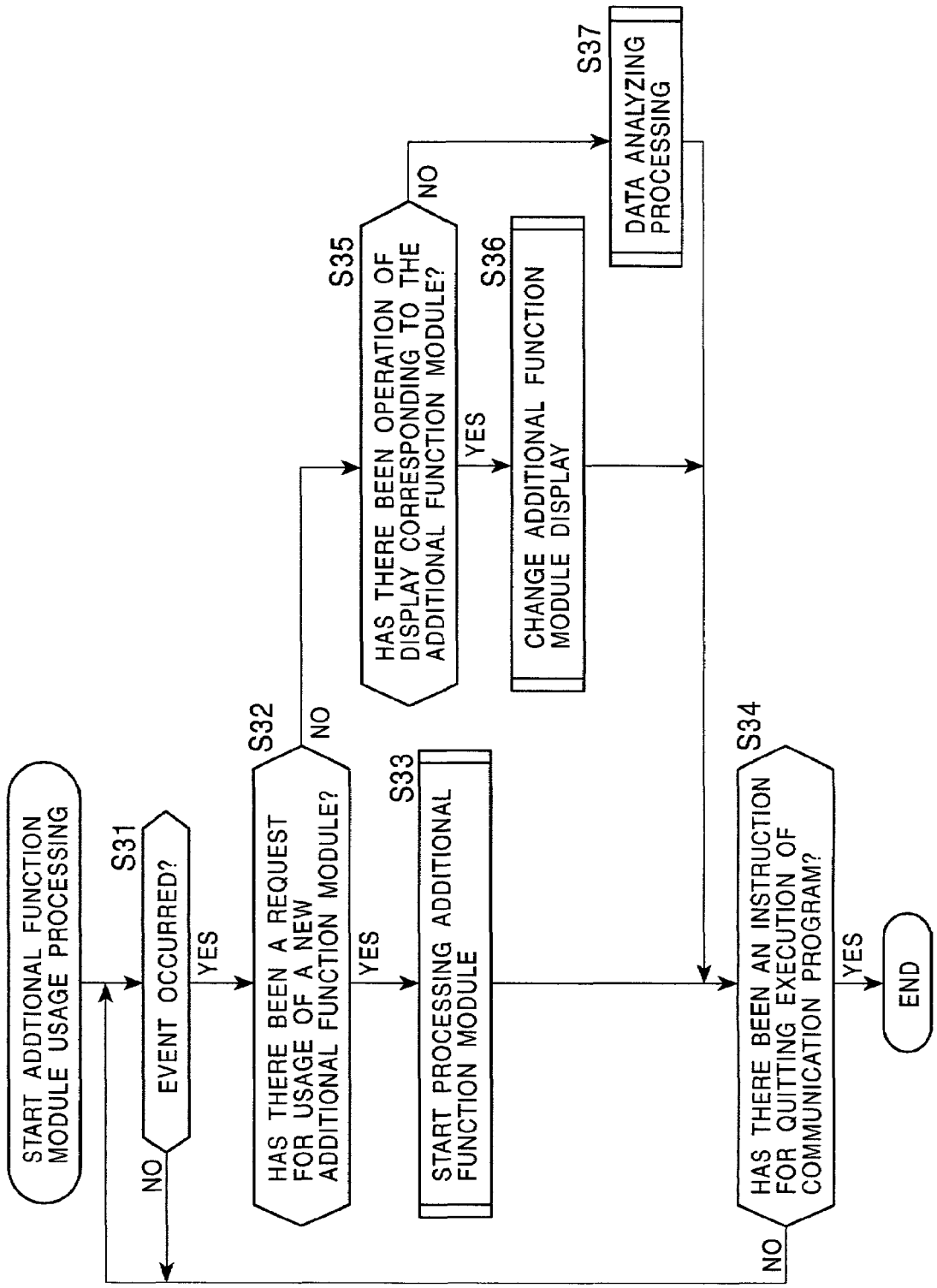
FIG. 12 is a flowchart illustrating the processing procedures in the case of communicating using an additional function module.

In the event that judgement is made in step S63 that there have been no instructions to quit the Janken additional function module 54G, or in the event that the processing in step S64 has been performed, the processing ends, and the flow proceeds to step S34 in FIG. 12.

Also in the case of this example, while described in detail later, the personal computer 1-1 receives the identifier (the identifier of the Janken additional function module 54G) and the display data (displayed data showing display contents corresponding to the operation contents with regard to the "scissors" icon of the GUI), transmitted from the personal computer 1-2, so the processing proceeds through step S31, step S32, step S35, and on to step S37.

In step S37, the communication program 54F performs processing for analyzing the received data and (the identifier and display data). The details of the processing here are shown in the flowchart in FIG. 19.

In step S71, the communication program 54 F of the personal computer 1-1 judges whether or not the Janken additional function module 54G which has received identifier has already been loaded to the RAM 54, and in the event that it is judged to have already been loaded, the flow proceeds to step S72.

The Janken additional function module 54G of the personal computer 1-1 is already loaded to the RAM 54 at this time (since it has been loaded in the processing in step S51 in FIG. 15 performed earlier), so the flow proceeds to step S72.

In step S72, the communication program 54F changes the display of the display unit 12, according to the received display data (the display data of the display contents according to the selection operation with regard to the "scissors" icon of the GUI).

Figure 17:
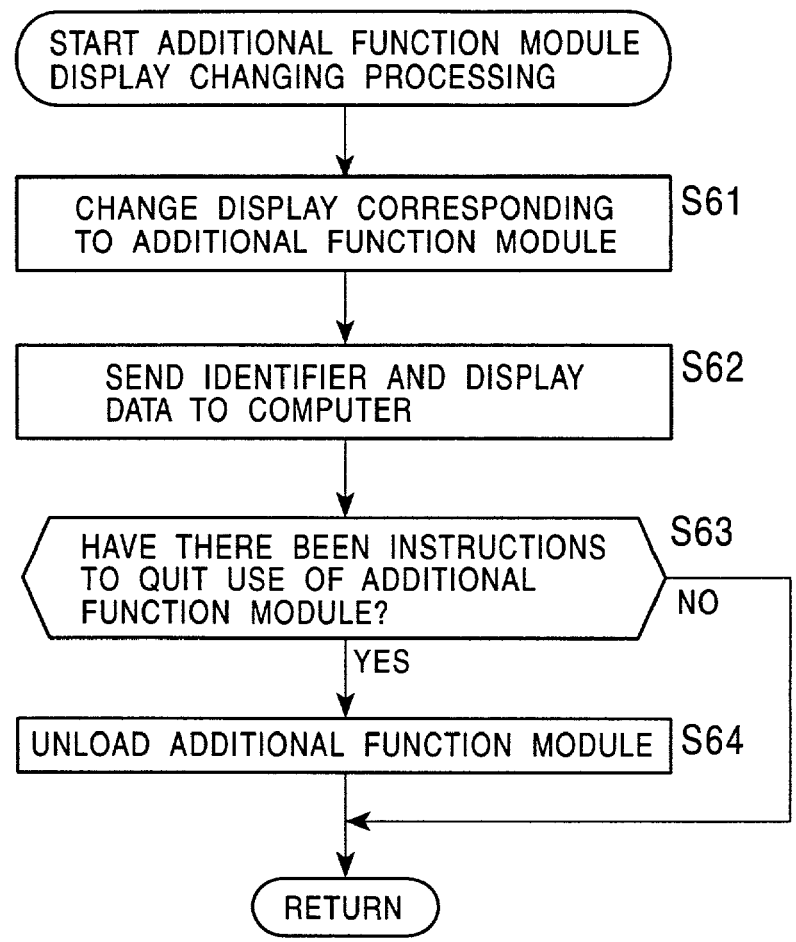
FIG. 17 is a flowchart illustrating the details of the processing in step S36 in FIG. 12.
Figure 20:
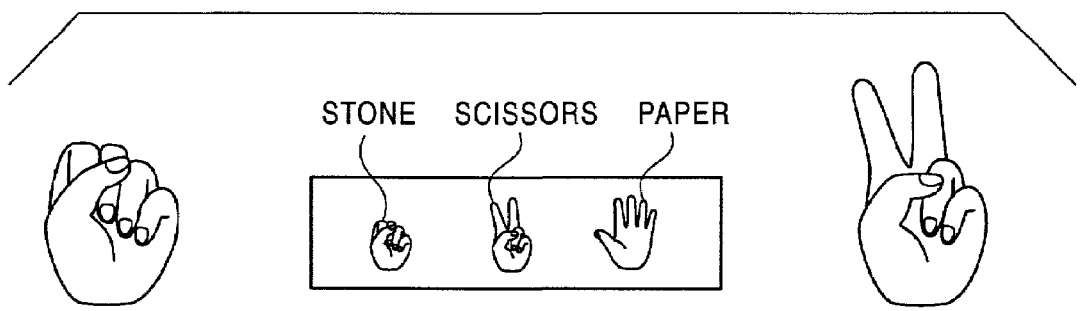
FIG. 20 is a diagram illustrating another example of display on the LCD 15 of the personal computer 1-1.

In the case of this example, the display in FIG. 18 that was displayed in the processing in step S61 in FIG. 17 performed earlier, is changed to that shown in FIG. 20. That is to say, the "scissors" display selected at the personal computer 1-2 is displayed enlarged at the right side of the GUI (at the opposite side of the "stone" display selected by the personal computer 1-1).

Next, in step S73, the communication program 54 F of the personal computer 1-1 judges whether or not there has been an instruction to quit the use of the Janken additional function module 54G, and in the event that judgement is made that there has been such an instruction, the flow proceeds to step S74, and the Janken additional function module 54G is unloaded from the RAM 54 to the hard disk drive 67.

In the event that judgement is made in step S73 that there has been no instruction to quit the use of the Janken additional function module 54G, or in the event that the processing in step S74 has been performed, the processing ends, and the flow proceeds to step S34 in FIG. 12.

The processing in step S75 to step S78 will be described later.

That is to say, in the case of this example, the display shown in FIG. 20 is displayed on the LCD 15 of the personal computer 1-1.

Next, the operations of the personal computer 1-2 corresponding to the operations of the personal computer 1-1, in the case of performing peer-to-peer communication using the above described Janken additional function module 54G, will be described with reference to the flowchart in FIG. 12. That is to say, the personal computer 1-2 also executes the processing shown in FIGS. 12, 15, 17, and 19, in the same manner as with the personal computer 1-1.

In step S31, the CPU of the personal computer 1-2 loads the communication program from the hard disk drive to the RAM, executes the communication program, and stands by until a certain event occurs.

Figure 15:
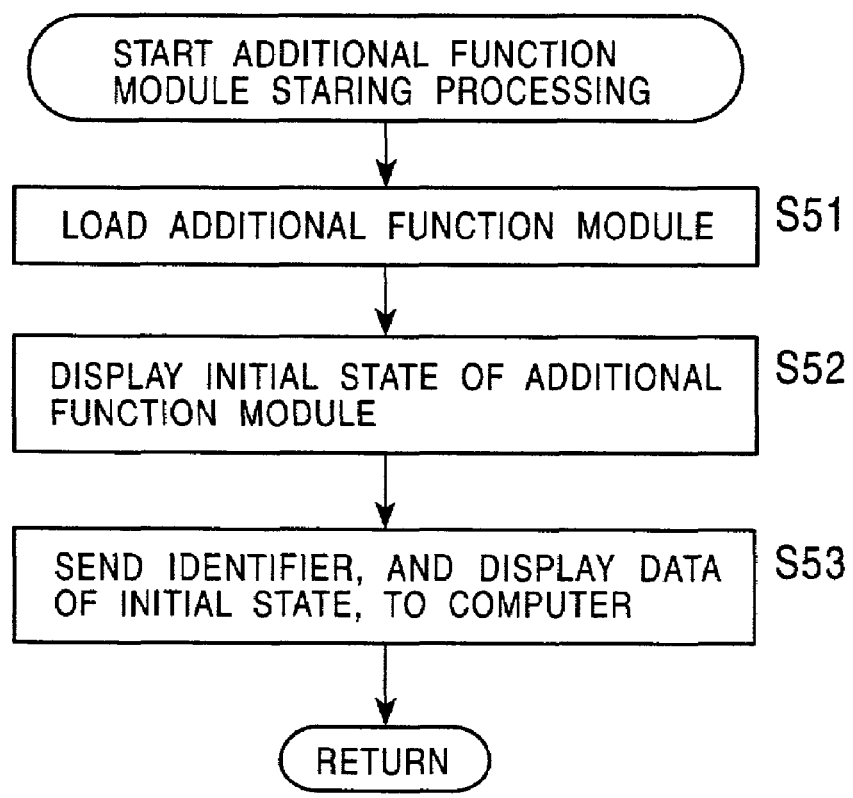
FIG. 15 is a flowchart illustrating the details of step S33 in FIG. 12.

In the case of this example, the personal computer 1-2 receives the identifier (the identifier of the Janken additional function module 54G) and the display data (the display data of the GUI as the initial display of the Janken additional function module 54G) transmitted from the personal computer 1-1 in the processing in step s53 in FIG. 15 which had been performed earlier by the personal computer 1-1, so the processing proceeds through step S31, step S32, step S35, and on to step S37.

In step S37, the communication program of the personal computer 1-2 performs processing for analyzing the received data (the identifier and display data).

Figure 19:
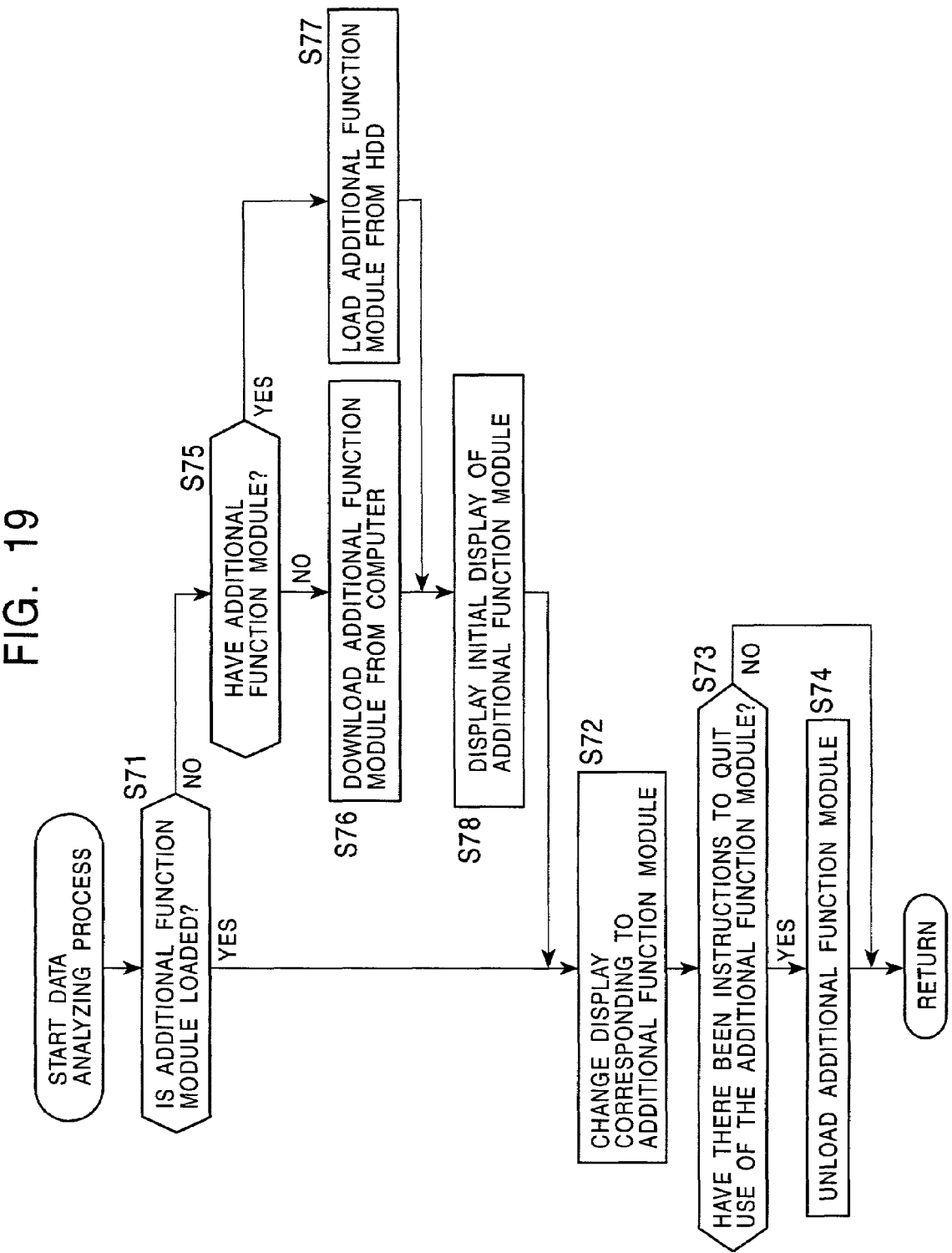
FIG. 19 is a flowchart illustrating the details of the processing in step S37 in FIG. 12.

That is to say, in step S71 of FIG. 19, the communication program of the personal computer 1-2 judges whether or not the Janken additional function module 54G having the received identifier is loaded to the RAM, and in the event that judgement is made that this is not loaded, the flow proceeds to step S75.

The Janken additional function module 54G is not loaded to the RAM of the personal computer 1-2 at this time, so the flow proceeds to step S75.

In step S75, the communication program of the personal computer 1-2 judges whether or not it has the Janken additional function module 67G having the received identifier, and in the event that judgement is made that it does not have this, the flow proceeds to step S76.

In the case of this example, the personal computer 1-2 does not have the Janken additional function module 67G, so the flow proceeds to step S76.

In step S76, the communication program of the personal computer 1-2 communicates with the personal computer 1-1 (the sender of the identifier of the additional function module 54G and the display data thereof), downloads the Janken additional function module 67G therefrom, and loads it to the RAM.

On the other hand, in the event that the personal computer 1-2 has the Janken additional function module 67G, for example, judgement is made in step S75 that it has the additional function module 67G, the flow proceeds to step S77, and the communication program of the personal computer 1-2 loads the Janken additional function module 67G from the hard disk drive to the RAM.

Upon the Janken additional function module 67G being loaded to the RAM by the processing in step S76 or step S77, the flow proceeds to step S78, and the communication program of the personal computer 1-2 displays the GUI (FIG. 16) as the initial display of the Janken additional function module 54G on the display unit, in the same manner as with the processing executed in step S52 in FIG. 15 by the personal computer 1-1.

Subsequently, the flow proceeds to step S72, and the communication program of the personal computer 1-2 changes the display on the display unit, according to the display data received. With the case of this example, the display data of the initial display of the Janken additional function module 54G is received, so the display of the initial display displayed by the processing in step S78 is not changed.

Subsequently, the flow proceeds to step S73, but in the case of this example, there are no instructions to quit the Janken additional function module 54G, so the processing skips step S74, and proceeds to step S34 in FIG. 12. Also, in the case of this example, there are no instructions here to quit execution of a communication program of the personal computer 1-2, so the processing further returns to step S31.

Then, in the case of this example, the user of the personal computer 1-2 operates the touchpad or the like, and clicks on the "scissors" icon in the GUI (FIG. 16) displayed on the display portion by the processing in step S78 of FIG. 19, so the processing proceeds to step S31 step S32 and step S35, on to step S36.

Figure 21:
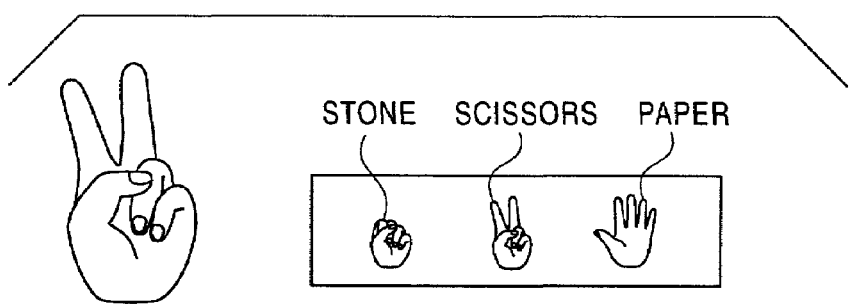
FIG. 21 is a diagram illustrating another example of display on the display portion of the personal computer 1-2.

That is, in step S61 of FIG. 17, the communication program of the personal computer 1-2 changes the display in FIG. 16, as shown in FIG. 21, according to the selection operation with regard to the "scissors" icon of the GUI. That is, a large "scissors" display is displayed to the left side of the GUI.

Next, in step S62, the communication program of the personal computer 1-2 transmits the identifier of the Janken additional function module 54G and display data representing the display changed in step S61 (FIG. 21) to the personal computer 1-1. The personal computer 1-1 receives that data.

Subsequently, the processing proceeds to step S63, but in the case of this example, there are no instructions to quit the use of the Janken additional function module 54G, so the processing skips step S64, and proceeds to step S34 of FIG. 12.

In the case of this example, there are no instructions to quit that execution of the communication program of the personal computer 1-2, so the processing further returns to step S31.

Then, in the case of this example, the personal computer 1-2 receives, from the personal computer 1-1, the identifier and display data (the identifier of the Janken additional function module 54G transmitted from the personal computer 1-1 by the processing in step S62 of FIG. 17 performed earlier by the personal computer 1-1, and the display data representing the display contents corresponding to the selected operation with regard to the "stone" icon of the GUI), so the processing proceeds through step S31, step S32, and step S35, on to step S37.

That is, in step S71 of FIG. 19, judgement is made regarding whether or not the Janken additional function module 54G is loaded, but the Janken additional function module 54G downloaded from the personal computer 1-1 in the earlier-performed step S76 is already downloaded, so the flow proceeds to step S72.

In step S72, the communication program of the personal computer 1-2 changes display of the display portion according to the received display data (the display data representing the display contents according to the selected operations with regard to the "stone" icon of the GUI).

Figure 22:
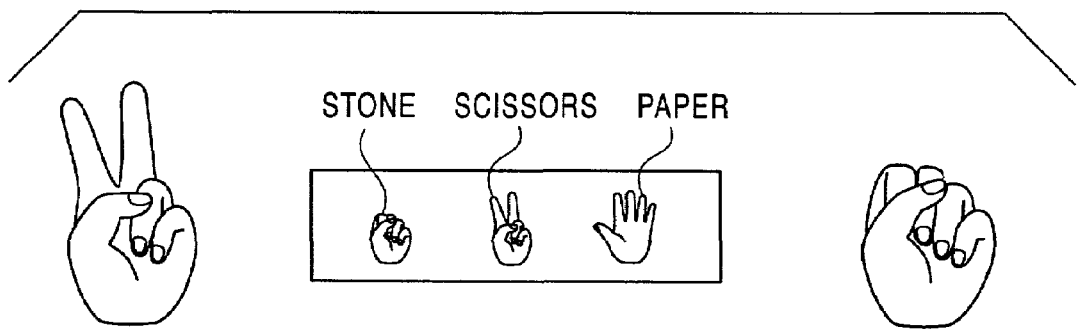
FIG. 22 is a diagram illustrating another example of display on the display portion of the personal computer 1-2.

In the case of this example, the display in FIG. 21 displayed by the processing in step S61 of FIG. 17 is changed as shown in FIG. 22. That is, the "stone" display, selected at the personal computer 1-1, is displayed in an enlarged manner to the right side of the GUI (to the opposite side of the "scissors" display selected at the personal computer 1-2).

Finally, in the case of this example, the display shown in FIG. 22 is displayed on the display portion of the personal computer 1-2.

Thus, screens corresponding to the Janken patterns selected by the user of one and a user of the other are displayed on the screens of the personal computer 1-1 and the personal computer 1-2, so the personal computer 1-1 and the personal computer 1-2 can play Janken.

Next, the processing procedures for communication based on the design additional function module 54G will be described with reference to the flowchart in FIG. 12, again.

Performing communication using the design additional function module 54G allows, for example, the frame of the communication screen 211 (FIG. 13) and the communication screen 501 (FIG. 14) wherein the state of the user of the personal computer 1-1 is displayed on the LCD 15 of the personal computer 1-1 or the display portion of the personal computer 1-2, to be displayed in the shape of a penguin.

Also, in the case of this example as well, let us assume that the personal computer 1-1 has the design additional function module 67G, while the personal computer 1-2, which is the communication peer, does not.

Also, this assumes that the communication connection for peer-to-peer communication is already established between the personal computer 1-1 and a personal computer 1-2, and that the screen shown in FIG. 13 is displayed on the LCD 15 of the personal computer 1-1, and the screen shown in FIG. 14 on the display portion of the personal computer 1-2.

In the case of this example, the user of the personal computer 1-1 operates the touchpad 16 or the like and clicks on the icon of the design additional function module 67G displayed in that additional function module screen 251 (FIG. 13), so the processing proceeds through step S31 and step S32, on to step S33.

In step S33, the additional function module starting processing is executed. That is, in step S51 of FIG. 15, the communication program 54F of the personal computer 1-1 loads that additional function module 67G whose icon has been operated, i.e., the design additional function module 67G from the hard disk drive 67 to the RAM 54.

Next, in step S52, the communication program 54F displays the initial display of the design additional function module 54G on the LCD 15 of the display unit 12.

Figure 23:
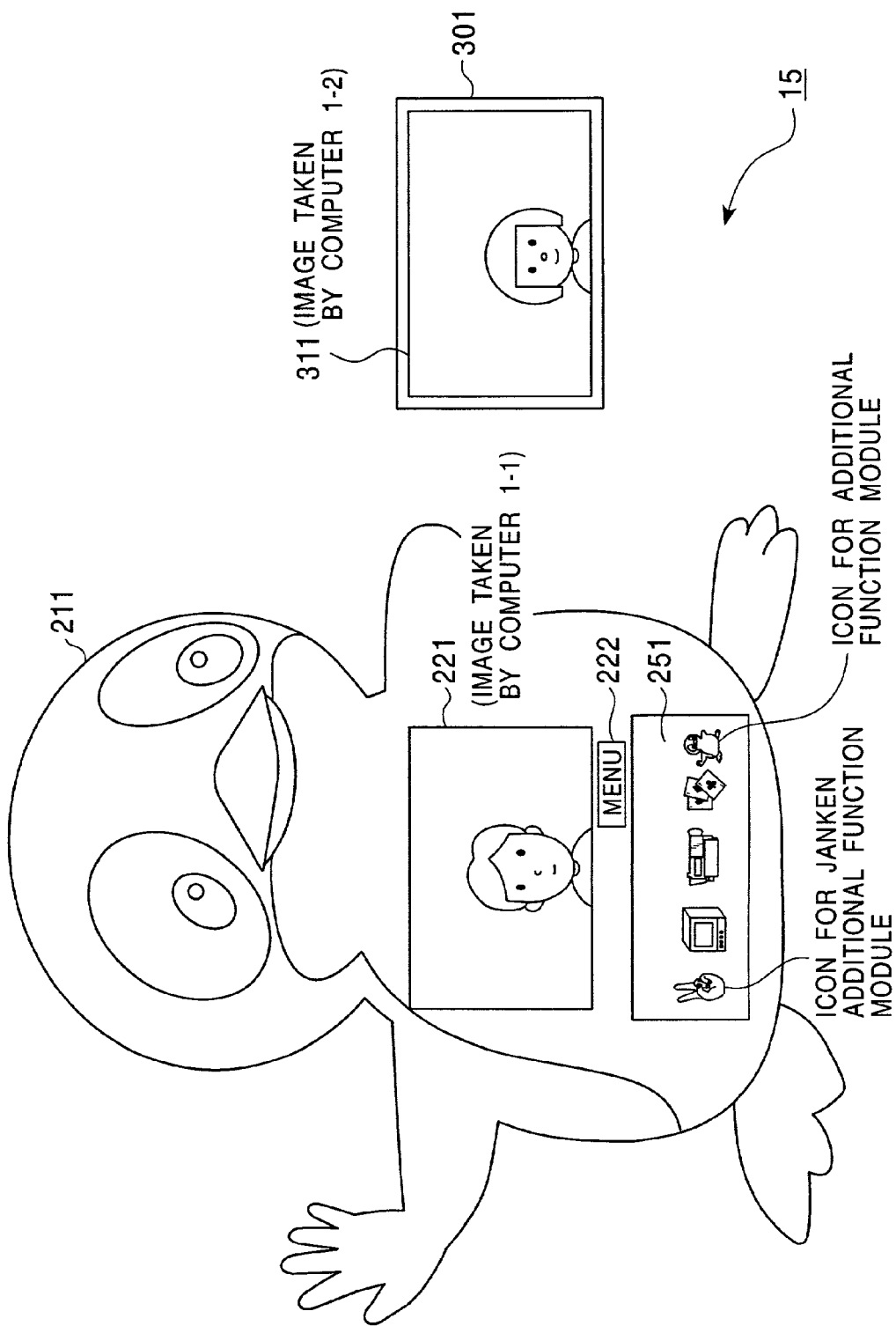
FIG. 23 is a diagram illustrating another example of display on the LCD 15 of the personal computer 1-1.

FIG. 23 is the display example of the communication screen 211 displayed as the initial state of the design additional function module 54G. That is, the communication screen 211 is displayed in the shape of a penguin.

In step S53 the communication program 54F transmits, to the personal computer 1-2, the identifier of the design additional function module 54G loaded from the hard disk drive 67 to the RAM 54 in step S51, and display data representing the initial display of the design additional function module 54G (in the case of this example, display data indicating the display contents (that the shape is the shape of a penguin) of the communication screen 211).

Then the processing ends, and the flow proceeds to step S34 in FIG. 12.

The processing after step S34 is the same as that of the Janken additional function module 54G, so description thereof will be omitted.

Next, the operation of the personal computer 1-2 corresponding to the operation of the personal computer 1-1 in the case of performing peer-to-peer communication using the design additional function module 54G with reference to the flowchart in FIG. 12.

In the case of this example, the CPU (communication program) of the personal computer 1-2 receives the identifier transmitted in the processing in step S53 in FIG. 15 performed earlier by the personal computer 1-1, and display data (the identifier of the design additional function module 54G and display data representing the display contents of the communication screen 211), so the processing proceeds through step S31, step S32, and step S35, on to step S37.

That is, in step S71 in FIG. 19, the communication program of the personal computer 1-2 judges regarding whether or not the design additional function module 54G having the received identifier is loaded to the RAM, and in the event that judgement is made that it is not loaded, the flow proceeds to step S75.

The design additional function module 54G is not loaded to the RAM of the personal computer 1-2 at this time, so the flow proceeds to step S75. Then, in the case of this example, the personal computer 1-2 does not have the design additional function module 54G, so the flow proceeds to step S76.

In step S76, the communication program of the personal computer 1-2 communicates with the personal computer 1-1 (the sender of the identifier of the design additional function module 54G and the display data), downloads the design additional function module 67G from the personal computer 1-1, and loads this to the RAM.

Figure 24:
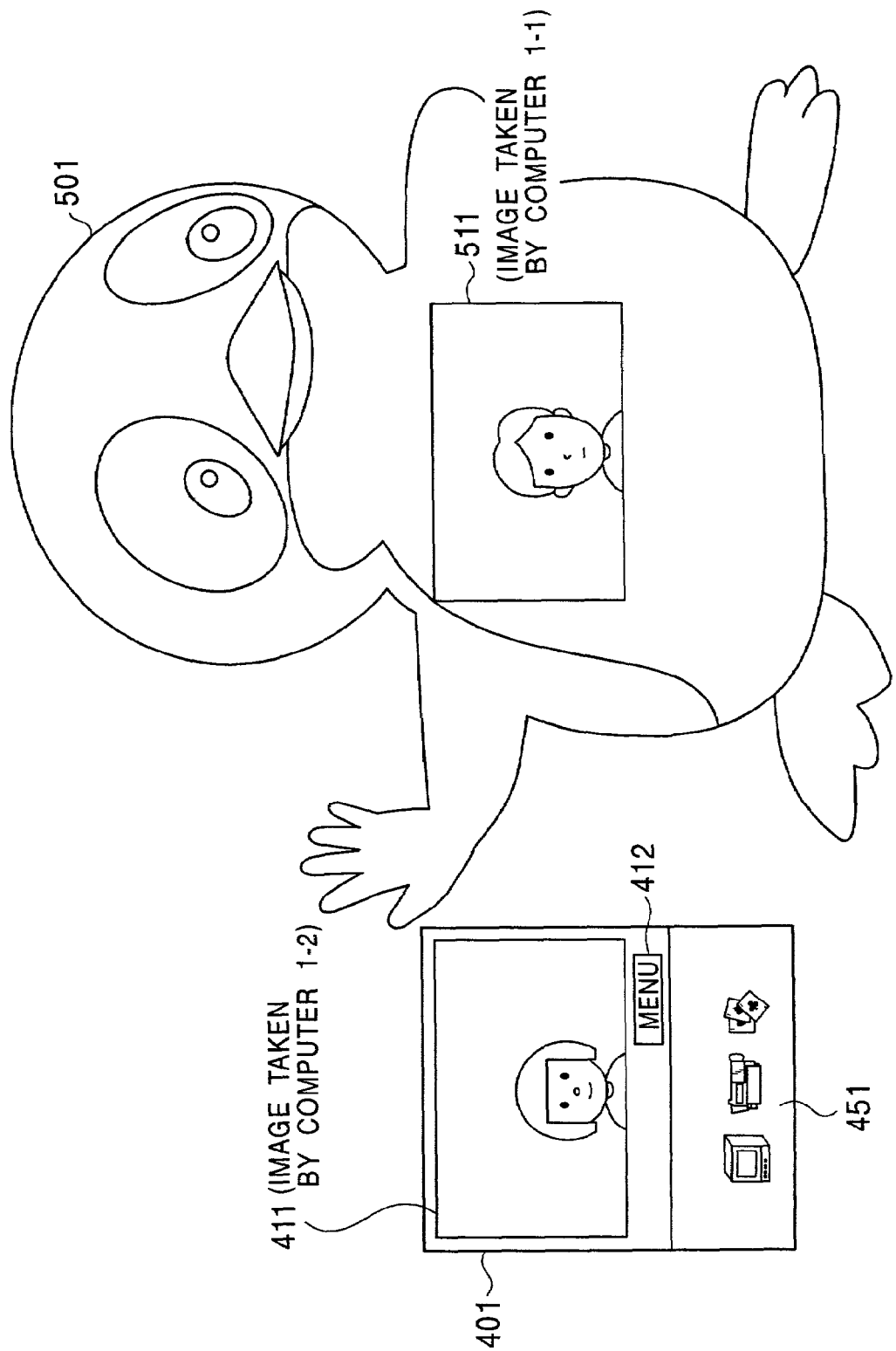
FIG. 24 is a diagram illustrating another example of display on the display portion of the personal computer 1-2.

Next, in step S78, the communication program of the personal computer 1-2 displays the initial display of the design additional function module 54G on the display unit. That is, accordingly, the communication screen 501 displayed on the display unit of the personal computer 1-2, made up of the display portion 511 displaying the image taken by the personal-computer 1-1, and so forth is displayed in the shape of a penguin, as shown in FIG. 24.

Subsequently, the processing proceeds to step S72. The processing following step S72 is the same as that of the Janken additional function module 54G, so description thereof will be omitted.

In this way, even in the event of that only the personal computer 1-1 has the design additional function module 67G, the communication screen 501 displaying the image taken by the personal computer 1-1 that is displayed on the personal computer 1-2 can be displayed in the shape of a penguin, in the same way as with the communication screen 211.

As described above, even in the event that not all of the communicating personal computers 1 have an additional function module, the additional function module can be used for communication, so the user of a personal computer 1 who does not have such an additional function module can experience usage of the additional function module by communicating with the user of the personal computer 1 which has the additional function module, and can decide to purchase that additional function module based on that experience. Also the side providing that additional function module can allow users to readily experience using the additional function module, thus promoting sales of the additional function module.

Though the above description has been made with reference to a personal computer 1 as a terminal, this can be used with a cellular telephone as the terminal, as well.

The above-described series of processing can be executed by hardware, or can be executed by software as well. In the event of executing this series of processing with software, the program making up the software may be built into dedicated hardware, or may be installed from a program storing medium to general-purpose personal computer, for example, capable of executing various functions by installing various programs.

Figure 7:
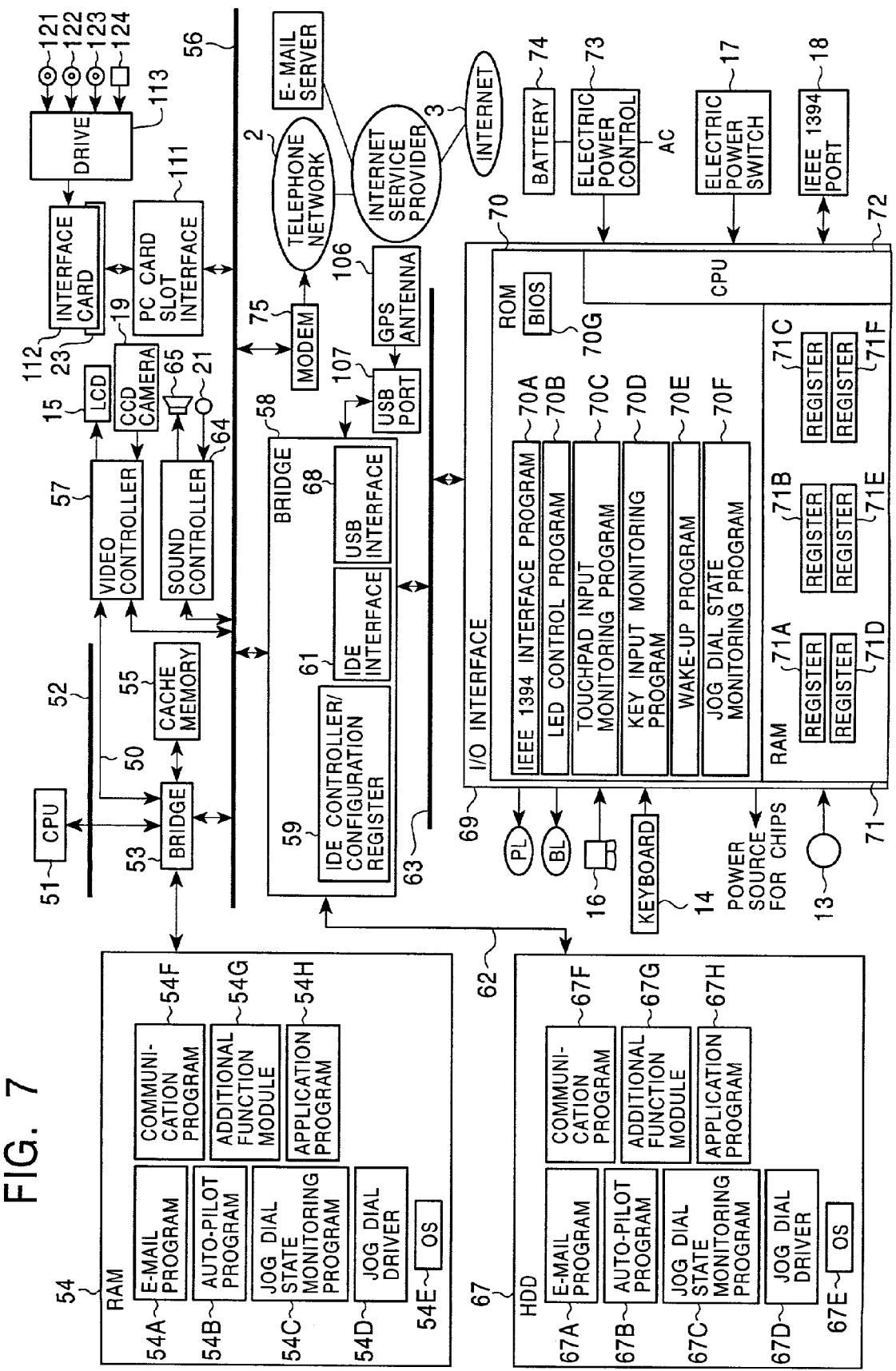
FIG. 7 is a block diagram illustrating a configuration example of the interior of the personal computer 1-1.

The recording medium is not limited to packaged media such as shown in FIG. 7 which is distributed to users separately from the computer for the purpose of providing the program thereto, examples thereof being a magnetic disk 121 (including floppy disks), optical disk 122 (including CD-ROMs (Compact Disc Read-Only Memory) and DVDs (Digital Versatile Disk)), magneto-optical disks 123(including MDs (Mini-Disk)), and semiconductor memory 124, with the program recorded therein, but also includes a hard disk drive 67 of the program recorded therein to be provided to users in a state of having been assembled into the computer beforehand, and so forth.

Now, in the above description, the steps describing the program provided by the recording medium may be, of course, processing which is performed in a time-sequence following the described to order, but does not necessarily have to be processed in the time-sequence thereof, and the present invention also encompasses processing wherein these are executed in parallel or independently. Also, in the above description, the term "system" represents the entire equipment made up of multiple devices.

Second Embodiment

Next, a second embodiment of the present invention will be described in detail with reference to the drawings. The present embodiment assumes a case of the present invention being applied to a communication system where users of information processing apparatuses, connected to a computer network, communicate ideas and emotions, by exchanging arbitrary data from image data, audio data, text data, and control data. First, a schematic description of the basic system configuration for realizing such communication will be described.

Note that the following description will be given assuming a network architecture enabling mutual connection between multiple information processing apparatuses, using the so-called TCP/IP (Transmission Control Protocol/Internet Protocol) protocols. However the present invention is by no means restricted to application to such a network architecture, and maybe widely applied to computer networks exchanging various types of information between multiple information processing apparatuses.

Also, in the following description, though description will be made in assuming that the information processing apparatuses exchanging the various types of information are consumer-grade personal computer apparatuses (hereafter referred to simply as "computer apparatus"), the present invention is by no means restricted to application to such computer apparatuses, and may be widely applied to using various types of information processing apparatuses such as various types of PDA (Personal Digital Assistant) devices, cellular telephones equipped with communication functions, and so forth.

(2-1) Basic Configuration of the Communication System

Figure 25:
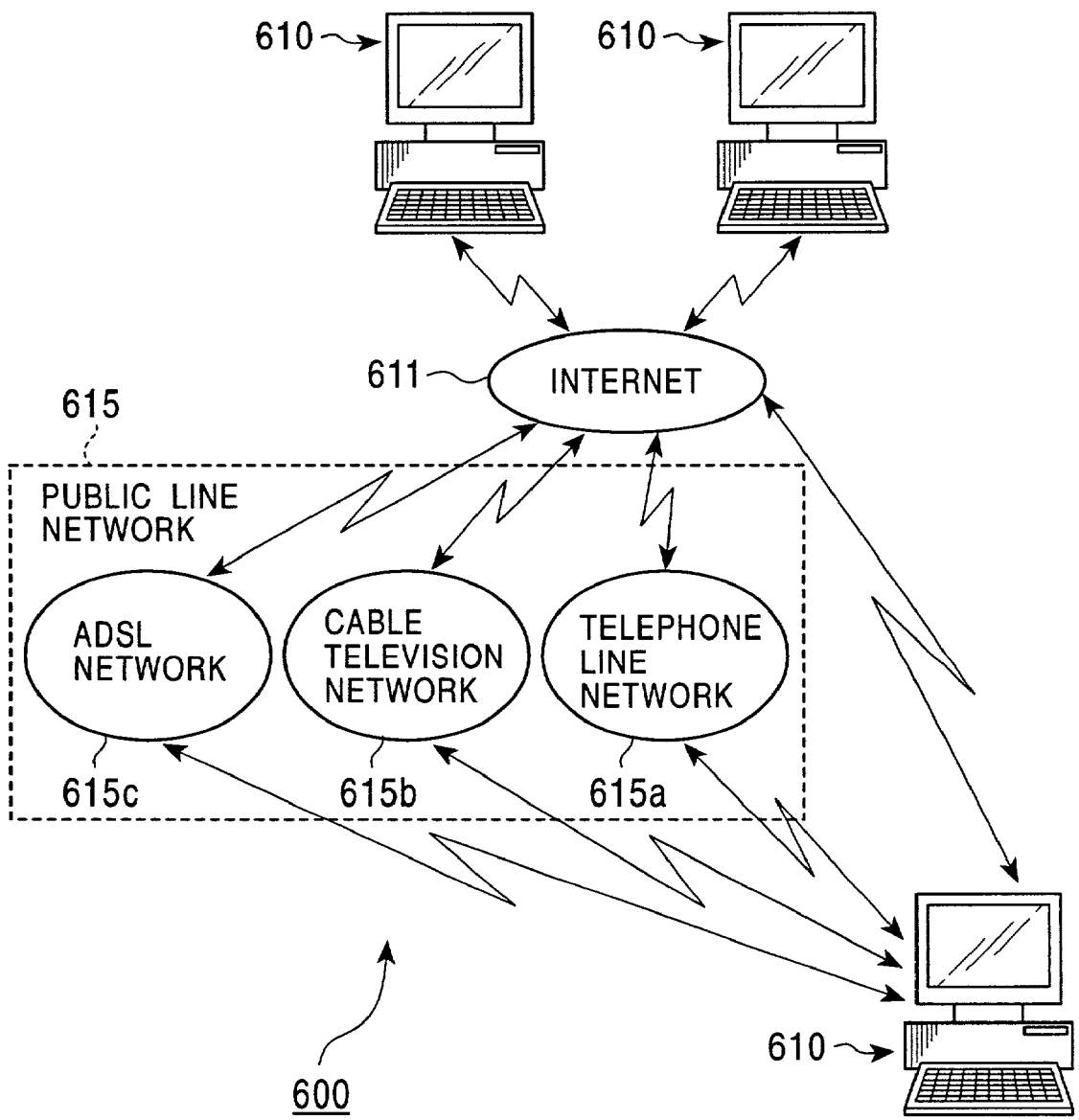
FIG. 25 is a schematic diagram illustrating the overall basic configuration of a communication system illustrated as a second embodiment of the present invention.

The communication system 600 described with the present embodiment has, as shown in FIG. 25 for example, multiple computer apparatuses 610 connected via the Internet 611, in a manner so as to enable mutual exchange of various types of information.

Now, each computer apparatus 610 may be either directly connected to the Internet 611, or may be in an environment capable of being connected to the Internet 611 via public telephone network 615, using an ISP (Internet Service Provider) or the like. Examples of the public telephone network 615 include, for example, a telephone line network 615a, a cable television networks 615b, an ADSL (Asymmetric Digital Subscriber Line) network 615c, and so forth. Now, as long as the computer apparatus 610 is in an environment capable of being connected to the Internet 611, the connection may be either a cable connection or wireless connection. For example, the computer apparatus 610 may be configured so as to connect to the Internet 611 via a PHS (Personal Handyphone System) device or the like.

Each of the computer apparatuses 610 are capable of establishing transfer pass on the Internet 611 using the TCP/IP protocols and mutually exchanging various types of information such as image data, audio data, text data, control data, etc., with each being connected to the Internet 611.

(2-2) Configuration of User Terminals

The following is a description of the configuration of the computer apparatuses 610 making up the above-described communication system 600.

Now, the following description will be made with regard to a case wherein the digital video camera is mounted on the computer apparatus 610, to facilitate explanation thereof. However, the computer apparatus 610 may be connected with an external digital video camera device, either by cable or wireless, or may be of a configuration wherein a digital video camera a range to be directly connected will to a computer network such as a LAN (Local Area Network) or the like to which the computer apparatus 610 is connected, with image data and audio data taken by this digital video camera being taken into the computer apparatus 610 via the computer network.

Figure 26:
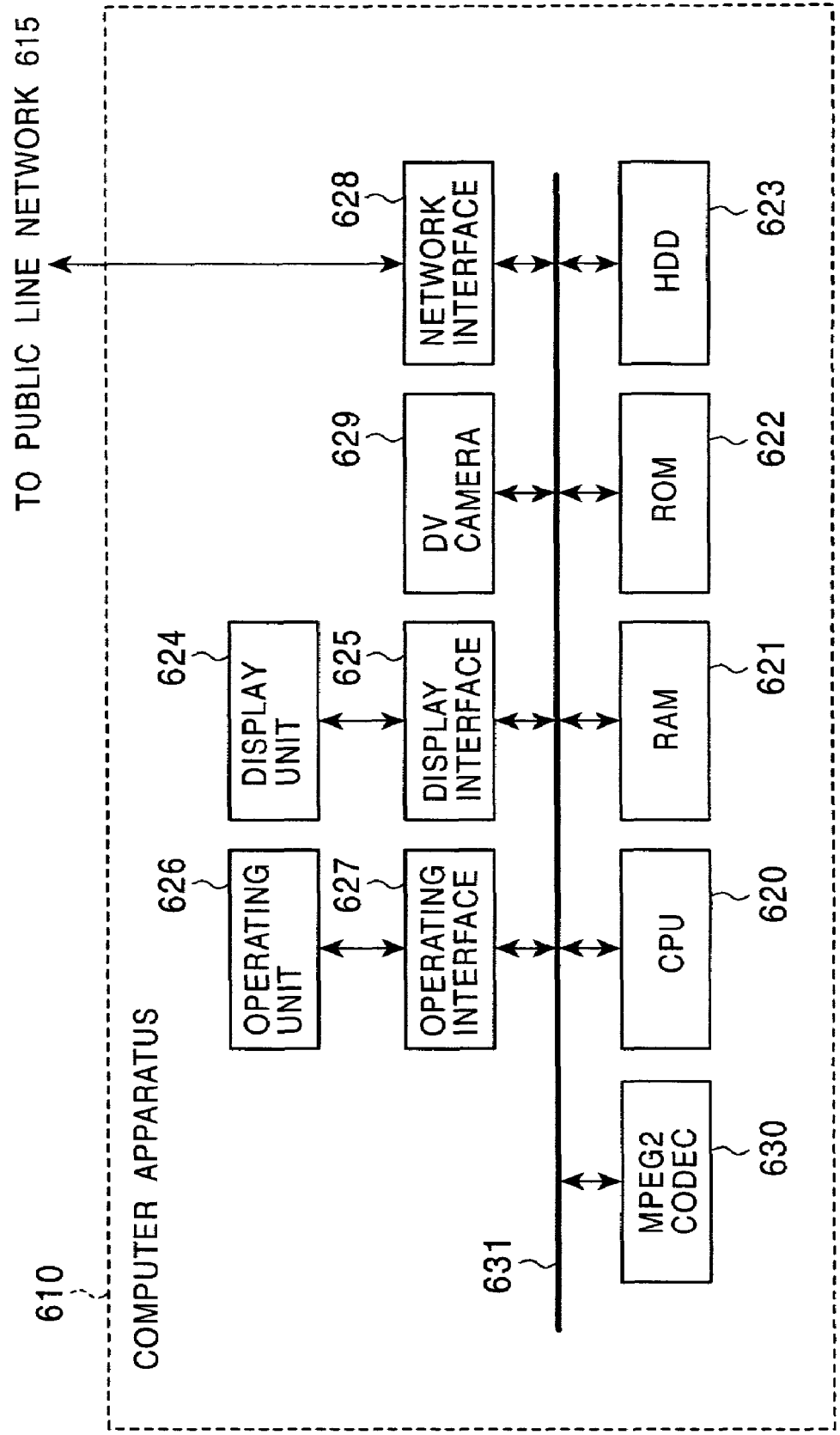
FIG. 26 is a functional block diagram illustrating the configuration of a computer apparatuses used for the communication system.

As shown in FIG. 26, the computer apparatus 610 comprises a CPU (Central Processing Unit) 620 for executing various types of computation processing and for centrally controlling the components, RAM (Random Access Memory) 621 functioning as work area of the CPU 620, ROM (Read-Only Memory) 622 storing information including a various types of programs to be executed by the CPU 620, a hard disk drive 23 storing an operating system to be executed by the CPU 620 and various types of programs such as application programs and the like, where various types of data and the like are recorded and reproduced, a display unit 624 for displaying various types of information, a display interface 625 for exchanging data between this display unit 624 and the CPU 620, an operating unit 626 for inputting various types of information or instruction operations from the user, and operating interface 627 for exchanging data between the operating unit 626 and the CPU 620, a network interface 628 for exchanging data with an external device connected to the Internet 611 via the above-described public telephone network 615, a digital video camera 629 for imaging subjects to obtain picture data and audio data, and an MPEG2 CODEC 630 for performing compression encoding and decoding based on the so-called MPEG2 (Moving Picture Experts Group phase 2) format.

Of these components, the computer apparatus 610 is configured of the CPU 620, the RAM 621, the ROM 622, the hard disk drive 623, the display interface 625, the operating interface 627, the network interface 628, the digital video camera 629, and MPEG2 CODEC 630, being connected via a bus 631.

Note that the digital video camera 629 for the computer apparatus 610 may be connected to the bus 631 via, for example, a predetermined interface for connecting external devices, or network interface 628, or the like, instead of being mounted on the computer apparatus 610. Also, the computer apparatus 610 may be of an arrangement wherein, if necessary for example, a removable recording/reproducing device which writes to and reads from a detachable recording medium is connected in addition to the hard disk drive 623, so that various types of data can be recorded to and reproduced from this recording/reproducing device.

The CPU 620 is connected with the RAM 621, ROM 622, hard disk drive 623, display interface 625, operating interface 627, Network interface 628, digital video camera 629, and MPEG2 CODEC 630, via the bus 631. The CPU 620 centrally controls each of the components, and also executes the operating system and the various application programs recorded on the hard disk drive 623, for example. Particularly, the CPU 620 processes execution of a communication program configured as one of the application programs. The details of this communication program will be described later.

The RAM 621 functions as a work area for the CPU 620 to execute the various types of programs, and temporarily stores various types of data under control of the CPU 620.

The ROM 622 stores various types of programs and setting information necessary for activating the computer apparatus 610. The various types of programs and setting information stored in the ROM 622 are read out at the time of activating the computer apparatus 610, and used by the CPU 620.

The hard disk drive 623 stores the operating system and application programs, and so forth, and also records and reproduces various types of programs and data, etc., under control of the CPU 620.

The display unit 624 is formed of an LCD (Liquid Crystal Display) for example, and displays various types of information, such as data and the like recorded on the hard disk drive 623, on the display screen, under control of the CPU 620. Particularly, the display unit 624 displays a particular Graphical User Interface window for displaying results of execution of the later-described communication program, and buttons for performing various types of instructions to this communication program.

The display interface 625 exchanges data between the CPU 620 and the display unit 624. That is, the display interface 625 supplies the various types of information supplied from the CPU 620 via the bus 631, to the display unit 624.

The operating unit 626 accepts operations of the user using a user interface such as, for example, a keyboard, a pointing device such as a mouse or the like, or rotational switch such as a so-called jog dial, or the like, and supplies control signals representing the contents of operation to the CPU 620 via the operating interface 627.

The operating interface 627 exchanges data between the CPU 620 and operating unit 626. That is to say, the operating interface 627 supplies control signal supplied from the operating unit 626 to the CPU 620, via the bus 631.

The network interface 628 functions as an interface for performing external communication, under control of the CPU 620. That is to say, the network interface 628 is provided for exchanging various types of information with other computer apparatuses 610 connected to the Internet 611.

The digital video cameras 629 is made up of certain optical systems for taking images of subjects, photo-conversion devices such as CCDs (Charged Coupled Devices), and so forth. Picture data and audio data obtained by the digital video camera 629 is supplied to the MPEG2 CODEC 630 via the bus 631, under control of the CPU 620.

The MPEG2 CODEC 630 performs compression encoding of the picture data and audio data supplied from the digital video camera 629 via the bus 631, based on the MPEG2 format, under control of the CPU 620. At this time, the MPEG 2 CODEC 630 performs real-time compression encoding of the picture data and audio data, under control of the CPU 620. Also, the MPEG2 CODEC 630 can also decode the data subjected to compression encoding, based on the MPEG2 format.

(2-3) Overview of Communication Program

Next, the communication program executed by the above-described computer apparatus 610 will be described.

The communication program is configured of a program groups series wherein multiple modules, each for realizing individual functions, can be freely combined one with another, the communication program being recorded on the hard disk drive 623 of the computer apparatus 610, for example. The computer apparatus 610 can, by executing this communication program with the CPU 620, exchange various types of information such as image data, audio data, text data, etc., with other computer apparatuses, thereby enabling the users of the computer apparatuses to communicate their ideas and emotions one with another. Note that the communication program may also be provided by recording medium such as the so-called compact disk, or a transmission medium such as the Internet 611 or the like, for example.

The communication program executed by the computer apparatus 610 performs so-called server/client communication with communication programs being executed on other computer apparatuses. That is to say, with multiple communication programs regarding which a mutual connection state has been established, functions of the server are realized by certain communication program, while other communication programs act as clients. However, at a point wherein execution processing of the communication program is started at the computer apparatus 610, but no mutual connection state has been established with other communication programs, i.e., in the initial activation state, the operation is in a virtual session mode, as it might be, with no distinction between server and client, capable of self-establishment of sessions.

Now, in the event of establishing sessions between the communication programs executed by multiple computer apparatuses 610, connection setting information is exchanged between these communication programs. This connection setting information is generated by the computer apparatus 610 at the time of activating the communication program, for example, and is made up of a file describing an IP address set to the computer apparatus 610 which is the sender of the connection setting information, a port No. used by the communication program, and so forth. The details of the connection setting information will be described later.

Upon the connection setting information being sent out from the communication program to another communication program, the communication program obtaining this connection setting information performs connection processing with a computer apparatus 610 (and accordingly, the communication program executed on the computer apparatus 610) is the sender, based on the IP address and port No. described in the connection setting information, thereby establishing a session.

At this time, the file including the connection setting information is correlated with the communication program by a suffix, for example, and selecting this file on the computer apparatus by performing a so-called double-click operation automatically activates the communication program.

With the communication systems 600, the communication program at the side which generates the connection setting information at the time of activation and sends out this connection setting information to other communication programs carries out the functions of the server, and a communication program at the side which is activated based on the obtained connection setting information acts as a client.

Here, exchanging the connection setting information between the computer apparatuses as described above is realized by the computer apparatus 610 serving as a server attaching a file containing the connection setting information to an e-mail carrying a message encouraging a connection start to the computer apparatus serving as a client, and transmitting this e-mail, for example.

Though the communication system 600 described in the present embodiment sends the connection setting information using e-mail, an arrangement may be made wherein the connection setting information is sent as a data file or application program, by using an application program for realizing various types of file exchange between computer apparatuses connected to the Internet 611, such a so-called FTP Software, for example. Also, for example, a configuration may be made wherein the communication program is automatically activated in on the client-side computer apparatus without the user being conscious of starting of the connection (establishing of a section), by directly exchanging the connection setting information between the computer apparatuses, without notifying starting of the connection to the user of the computer apparatus.

(2-4) Module Structure of the Communication Program

Figure 27:
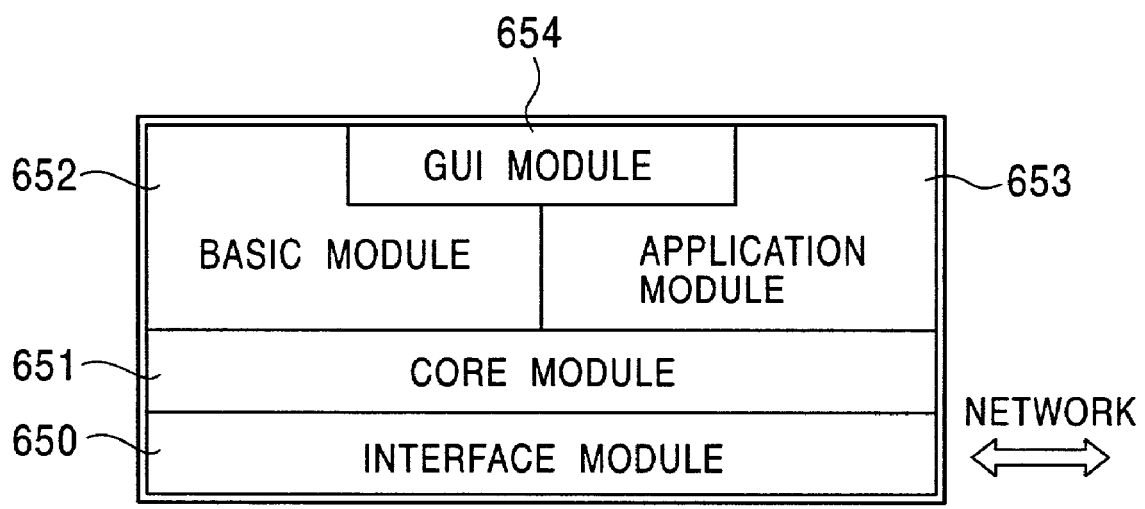
FIG. 27 is a model diagram illustrating the module structure of a communication program executed for processing on the computer apparatus.

Now an example of the structure of modules of the communication program will be described with reference to FIG. 27. As shown in FIG. 27, for example, the communication program is made up of an interface module 650 for controlling operation of the network interface 628 on the computer apparatus 610, a core module 651 for providing establishment of sessions with communication programs executed on other computer apparatuses, a basic module 652 for providing basic functions for the communication program, multiple application modules 653 for providing each individual functions, and a GUI module 654 for managing the Graphical User Interface.

The interface module 650 is configured as an API (Application Program Interface), and is a module for establishing a transmission paths for various types of information, such as image data, audio data, text data, and so forth, with programs executed on other computer apparatuses via computer networks such as the Internet 611, thereby allowing the details of network communication to be readily processed by simple command system. An example of this interface module 650 is "DirectPlay", from Microsoft.

The core module 651 establishes sessions with other communication programs, and has session managing functions for managing established sessions. Specifically, the core module 651 provides connection setting information creating functions for creating connection setting information, session establishing functions for establishing sessions, data transmitting/receiving functions for transmitting and receiving data between communication programs, in-session player managing functions for managing players in established sessions, and so forth, as session managing functions.

Now, in the communication systems 600, there exist communication programs serving as a server, and communication programs serving as clients. Server-side communication programs perform processing such as taking data sent from client-side communication programs, making reference to the addressee of this stated, and transferring to another client-side communication program specified as that addressee, and so forth. Accordingly, in the communication systems 600, there is the need to have a session established for exchanging various types of information such as image data, audio data, text data, and so forth. Accordingly communication programs are provided with session managing functions serving as an interface for performing such session establishment and managing, by the core module 651.

The core module 651 obtains IP addresses, port Nos., and so forth, and generates a file describing connection setting information. This file is also subjected to enciphering and deciphering. Also, in the event of acting as a client, the core module 651 connects to a computer apparatus serving as the server side, based on the IP address and port No. described in the obtained connection setting information. Thus, a session is established.

Also, the core module 651 manages each of the communication programs with sessions is established (i.e., the users). Specifically, for example, the core module 651 generates or obtains lists of users, and obtains or manages unique identification information appropriated to each user (user ID). Also, in the event that an event occurs, such as a connection being established with the new user, connection with a certain user being cut off, or user information including connection state or connection name for each user being changed, the core module 651 notifies this event to the basic module 652 and that application modules 653.

Also, the core module 651 has application module managing functions for controlling each of the multiple application module 653. Specifically, for example, the core module 651 performs activation management of the application module 653, exchanging of data between the application module 653, and so forth.

Specifically, for example, the core module 651 obtains module information relating to application module 653 installed to the communication program, from a predetermined storage area of the computer apparatus 610, and creates a list of application modules 653 which have already been installed. This module information is configured of, for example, module identification information unique to each application module, GUI information which is information relating to the GUI, flag information indicating whether or not the module starts operating at the same time as activation of the communication program, and so forth. Then, the core module 651 manages the activation state of application modules 653, based on this module information.

Also, the core module 651 activates application modules 653 which have not been activated, performs switch-over control of display/non-display on the display unit 624 of the computer apparatus 610, and so forth.

Figure 28:
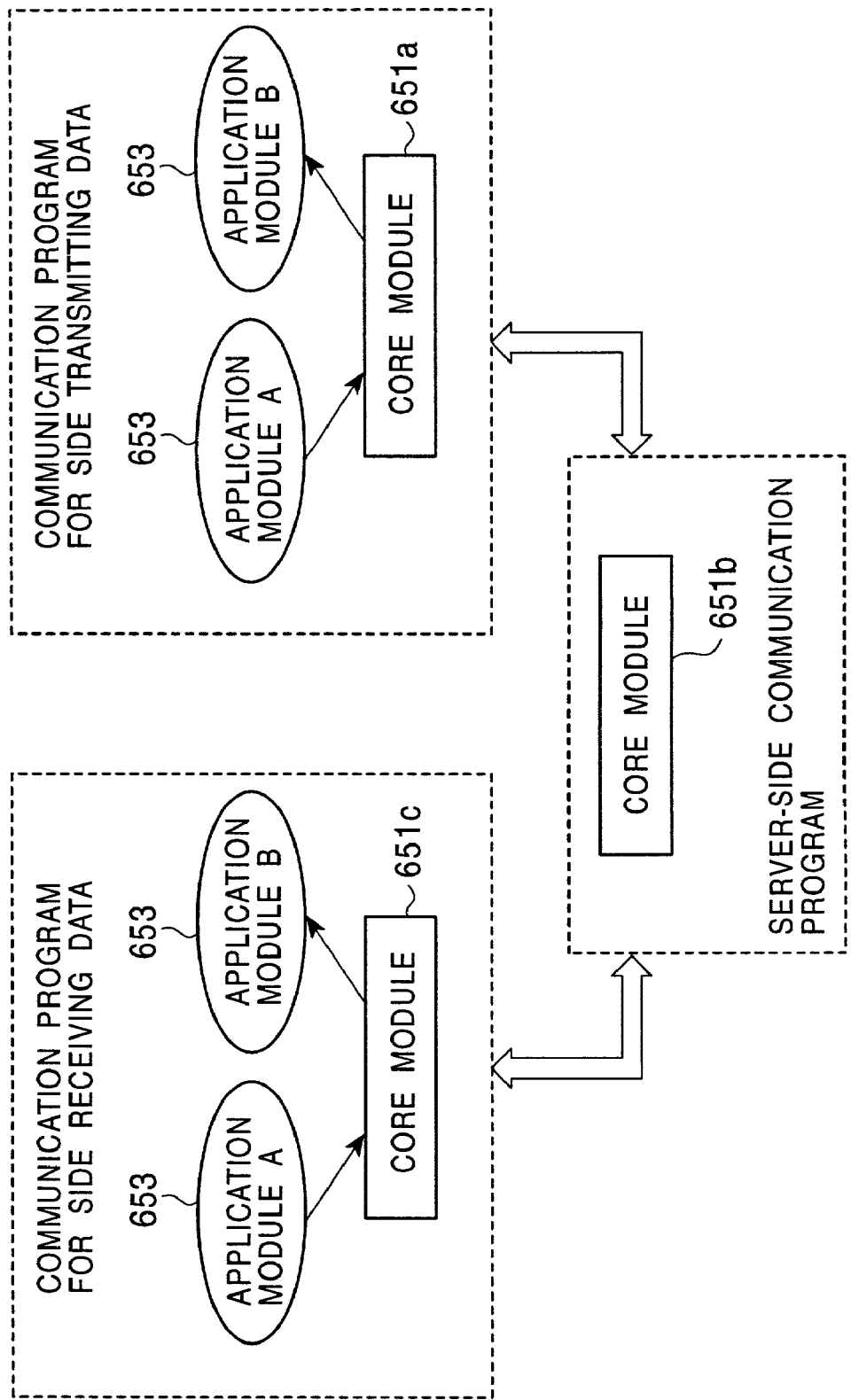
FIG. 28 is a model diagram describing a case wherein an application module making up the communication program is activated by data being exchanged by the communication program.

Now, as an example of operation of the core module 651, a case of transmitting data from one communication program on the client side to another communication program, via the server-side communication program, will be described with reference to FIG. 28.

In this case, the core module 651a operating on the data transmitting side receives data transmitted from the basic module 652 and application modules 653, attaches a transmission header to this data, and transmits this to the server-side communication program. There is no involvement in the contents of the received data with regard to such transmission to the server side.

On the other hand, the core module 651b operating on the server side makes reference to the transmission header contained in the data obtained from the data transmitting side, and transmits the data obtained from the data transmitting side to the communication program at the data receiving side described in the transmission header as the addressee.

Also, the core module 651c which operates on the data receiving side makes reference to the transmission header contained in the obtained data, and hands the data to the predetermined application module 653. At this time, in the event that the application module 653 which is to be handed with this data from the communication program at the data receiving side is not activated, activation processing of this application model 653 is performed.

Also, in the event that an intended application module 653 does not exist at the receiving-side communication program, the core module 651c transmits a message to that effect to the data sending side communication program. At this time the core module 651c only hands this data to an application model that is activated, in the event that all application modules 653 have been specified as the application module 653 to which to hand the obtained data.

The core module 651 performs handing of data between communication programs acting as clients, by operating as described above.

On the other hand, the basic module 652 is a module having functions for preparing various types of windows used in the communication program. Also, the basic module 652 has setting functions for setting for various types of information which become necessary in the execution processing of the communication program, e-mail transmitting functions for attaching connection setting information for establishing settings to e-mail and transmitting the e-mail to the client side, and so forth.

Also, multiple application modules 653 are installed to the communication program as necessary, each having functions for providing individual functions. In the communication program according to the present embodiment, the installed application modules 653 include a personal information managing module 653a, an image transmitting module 653b, an audio data transmitting module 653c, a Web function module 653d, a chat contents transfer module 653e, a chat log module 653f, an emotion expression module 653g, an action module 653h, a live performance module 653i, and so forth.

The personal information managing module 653a is a module for managing personal information such as image data and name information and so forth corresponding to the communication programs existing in the session, i.e., corresponding to each user.

The communication program, in the initially activated state, requests from users and obtains input and settings corresponding to the user, such as images, name, and so forth. At this time, the display request is transmitted to the personal information managing module 653a, via the core module 651. Upon receiving the display request from another module in this way, the personal information managing module 653a transmits a predetermined obtaining request to the GUI module 654, obtains the appropriateness personal information, and displays the predetermined personal information and a predetermined area within a window displayed on the computer apparatus 610.

Also, in the event of receiving a user information update request from another module, the personal information managing module 653a transmits a personal information obtaining a request to the personal information managing module 653a of another communication program with a connection established via the network. At this time, the personal information managing module 653a at the side which is obtained the personal information obtaining a request obtains and returns the personal information of itself as a display notification.

Such a user information update request is transmitted by the core module 651 to the personal information managing module 653a in the event that a new user is participating in the communication system 600, for example.

The image transmission module 653b is a module for providing processing of image data such as addition processing, deletion processing, or processing at the time of selection. Also, the image transmission module 653b performs various types of control of the digital video cameras 629 either mounted to or connected to the computer apparatus 610, such as controlling switching between on and off of taking pictures. In the event that the picture-taking state of the digital video camera 629 is on, the image transmission module 653b performs transmission processing of the image data, while monitoring the load on the communication state with regard to the Internet 611. Further, the image transmission module 653b is also capable of performing the transmission to other communication programs and by unguaranteed communication, according to the settings of the user. In this case, even in the event that the transmitted image data is lost along the transmission path, it is not retransmitted.

The audio transmission/reception module 653c is equivalent to the image transmission module 653b, and is a module for providing processing for audio data such as addition processing, deletion processing, processing at the time of selection, and so forth. Also, the audio transmission/reception module 653c has functions for realizing transmission and reception of audio data between communication programs, using audio functions installed to the interface module 650. With the communication system 600, only in the event that audio output is turned on at the server-side communication program, can audio output be turned on at the client-side communication program. Also, audio data sent from the client-side communication program is mixed by the audio transmission/reception module 653c installed at the server-side communication program, and is transmitted again to the client-side communication programs.

The Web function module 653d is a module for obtaining various types of information such as hypertext or image data held in an the computer apparatus 610 upon which the communication program has been executed, or another computer apparatus connected to the Internet 611, and providing Web information display functions for displaying the obtained various types of information. Also, the Web function module 653d has URL (Uniform Resource Locator) sharing functions for sharing URLs indicating the location and obtaining method of various types of information (resources) existing on the Internet 611.

The chat contents transfer module 653e is a module for obtaining text data input based on an event indicating input of text data to the GUI module 654 being notified from this GUI module 654, and transmitting a chat message notification containing that obtained text data to all other communication programs with sessions established. Also, the chat contents transfer module 653e, upon receiving a chat message notification, makes a request to display the text data contained in the chat message notification to the GUI module 654. Accordingly, a so-called "balloon"-like text display area is secured at a predetermined location on the communication program window, and text data is displayed in this area.

The chat log module 653f records the input as received text data, based on the chat message notifications transmitted from the chat contents transfer module 653e and so forth, and generates a chat log file. The chat log module 653f stores the text data, for a predetermined storage capacity, in the RAM 621 of the computer apparatus 610, and if necessary, shunts the text data stored in the RAM 621 to the hard disk drive 623 or the like, and generates a chat log file. Also, in the event that a request is made to display this chat log, the chat log module 653f has functions for obtaining the text data stored in the chat log file, and displaying in a predetermined area of the communication program window.

The emotion expression module 653g is a module for reading in and displaying animation effects relating to expression of emotions. Also, the emotion expression module 653g requests the GUI module 654 to display buttons selected for expressing emotions, and so forth.

Also, upon receiving notification that a certain button has been selected from the GUI module 654, the emotion expression module 653g transmits emotion expression data (animation data) corresponding to this button, to all communication programs with sessions established. On the other hand, in the event of receiving emotion expression data, the emotion expression module 653g requests the GUI module 654 to display the emotion expression data.

The action module 653h is a module for performing reading and displaying of action data. Also, the action module 653h requests the GUI module 654 to display buttons to be selected at the time of displaying action, and so forth. Also, upon the user selecting a button to be selected at the time of displaying action, the action module 653h transmits the action data (animation data) corresponding to the selected button, to all communication programs with sessions established. On the other hand, upon receiving action data, the action module 653h requests the GUI module 654 to display this action data.

The live performance module 653i is a module to act cooperatively with a live distribution program for performing live distribution of image data and audio data via the Internet 611. The communication program is capable of exchanging image data and audio data and the like with an external live distribution program, by having the live performance module 653i installed.

The application modules 653 are configured of various types of module such as described above. Note that neither the number nor the functions of the applications modules 653 installed to the communication program are restricted, and modules other than the above-described modules, individual functions, may be installed as one of the application modules 653. Also, with the communication program, application modules 653 may be added or deleted as necessary.

The GUI module 654 is a module for providing a screen display for window displays and the like occurring with the communication program. Note however, that the basic ways of drawing the various type of windows, such as dialogue boxes and the like, are provided by the basic module 652. The GUI module 654 performs drawing within the windows according to screen display requests made from other modules, and displays function selection buttons, image data, and so forth.

This GUI module 654 has information relating to the positioning and array of the functions election buttons, the display position of image data, and the overall array and configuration within the window, but performs display by making reference to data contained in the request from the core module 651 or the application module 653 with regard to the number of function selection buttons and the contents thereof.

Note that the application modules 653 installed to the communication program are capable of using application display area enabling individual drawing processing, without dependence on the GUI module 654. In the case of performing an image display using such an application display area, the GUI module secures an application display area in accordance to a request from an application module 653, and the drawing processing to the application display area that has been secured can be performed at the application module 653 side.

Also, the GUI module 654 has a function for, in the event that the user selects a function selection button or the like displayed in the window, notifying the basic module 652 and application modules 653 of an event indicating that a function selection button has been selected.

The communication program is configured of multiple modules, as described above, such that the modules cooperatively operate as necessary.

(2-5) Connection Setting Information

Next, description will be made regarding the connection setting information used with the communication systems 600 for establishing a session between computer apparatuses. The connection setting information is information generated at a computer apparatus where a communication program serving as a server is executed.

As shown in FIG. 29, for example, the setting information is made up of an Access key for performing a verification at the time of the communication program serving as a client establishing a session with a communication program serving as a server, port No. of the network interface 628 of the computer apparatus 610 and which the communication program uses, the number of IP addresses said in the computer apparatus 610 for the communication programs serving as the server is executed, a series of IP addresses said to the computer apparatus 610 for the communication programs serving as the server is executed, and so forth.

(2-6) Basic Processing Performed by the Communication Program

Figure 30:
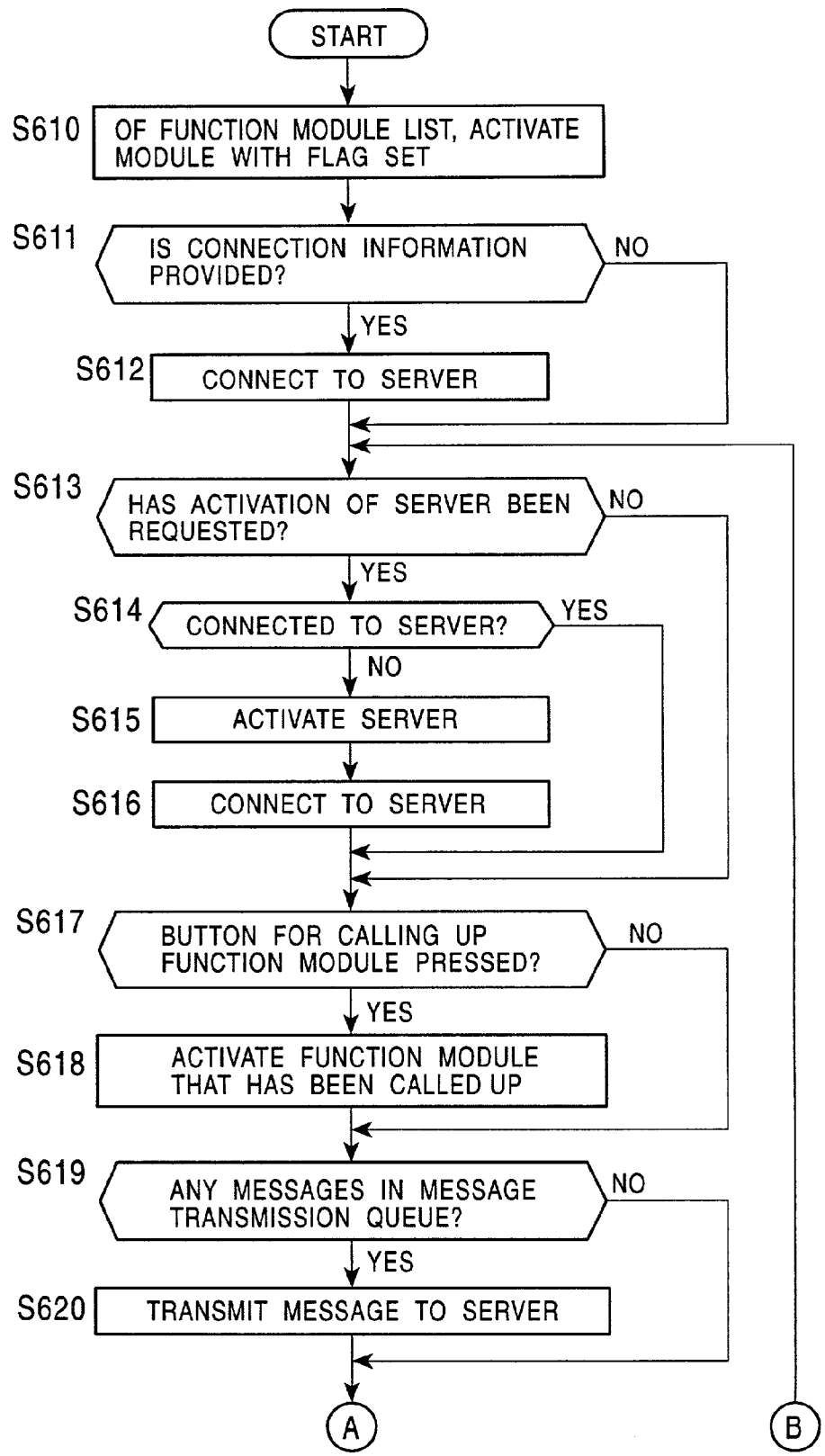
FIG. 30 is a flowchart illustrating the overall flow of processing by the communication program being executed.
Figures 31, 32:
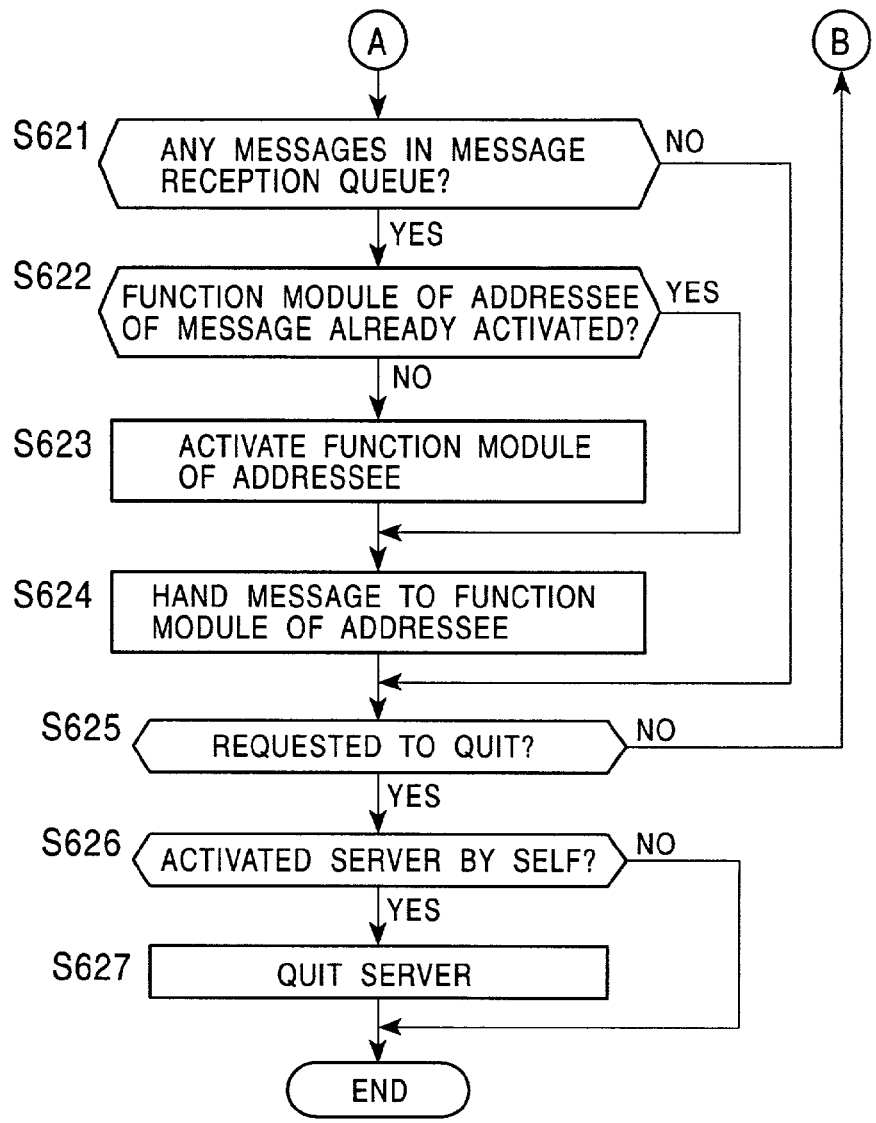
FIG. 31 is another flowchart illustrating the overall flow of processing by the communication program being executed.
FIG. 32 is a model diagram illustrating the data structure of the function module list used with the communication program.

The following is a description of the basic series of processing that is carried out in a case of the above-described communication program being executed on the computer apparatus 610, the description proceeding in order with reference to the flow charts shown in FIGS. 30 and 31.

Upon the execution processing being started (activated), the communication program, in step S610 shown in FIG. 30, activates modules with an activation flags set, by making of reference to the function module list. The function module list has a data structure such as shown in FIG. 32, for example, holding, for each function module making up the communication program, identification information unique to each function module (function ID), a module name unique to each function module, a type which indicates the execution form and usage conditions of the function module, an activation flag in debating whether or not the function module is to be activated upon started conditions, and so forth. The communication program is capable of selecting and activating modules to be activated according to startup conditions, by making reference to the function module list.

Next, the communication program, in step S611, judges whether or not connection setting information has been received by communication programs executed on the other computer apparatuses. In the event that the results of the judgment indicates that such reception has been made, the flow proceeds to step S612, and in the event that such reception has not been made, the flow proceeds to step S613.

Here, in the event that there has been reception of connection setting information, the communication program acts as a client, and various types of information are exchanged with the server-side communication program which is the sender of the connection setting information. On the other hand, in the event that such connection setting information has not been received, the communication program acts as a server.

In step S612, the communication program performs processing for establishing a session with the server-side communication program which is the sender of this connection setting information, based on the received connection setting information.

In step S613, the communication program is requested to act as a server, and judges whether or not to activate the server module which provide server functions. This judgment corresponds to the judgment made in step S611, and is made by judging whether or not connection setting information has been received from a communication program being executed on another computer apparatus. In the event that the server module is to be activated as a result of this judgment, the processing proceeds to step S614, and in the event that the communication program that is to act as a client without activating this server module, the flow proceeds to step S617.

In step S614, the communication program judges whether or not a session has been established and connection has been completed with the server module which it itself has activated. In the event that the results of this judgement show the connection has not been made yet, the flow proceeds to step S615, and in the event that the connection has already been made, the processing proceeds to step S617.

In step S615, the communication program activates the server module providing server functions. Next, in step S616, the communication program establishes a session and connects to the server module which it itself has activated. Thus, with the communication program, functions of the server are realized by the server module which it itself has activated, and modules other than the server module can perform connection operations as clients, to the server module.

In the communication program, the server functions are realized as a module, so even in the event of acting as a server, the modules other than the server module can access the server with the same procedures as when acting as a client. Accordingly, the processing procedures in these other modules can be simplified. Also, in step S616, following establishing of the session with the server module, the communication program proceeds the processing to step S617.

In step S617, the communication program displays the window on the screen of the computer apparatus 610, so that user instruction operations can be input by the input area displayed in the window or various function selection buttons or the like. Then, in step S617, the communication program judges whether the above described function selection buttons had been selected by the user, and whether to activate function modules corresponding to the function selection buttons. In the event that the function module is to be activated as the results of this judgment, the processing proceeds to step S618, and the events that no function modules are to be activated, the processing proceeds to step S619.

In step S618, the communication program activates the function module corresponding to the function selection button selected in step S617. Then, following activation of the function module, the communication program proceeds the processing to step S619.

In step S619, the communication program judges whether or not messages to be transmitted to a message transmission queue exist. In the event that messages exist in the message transmission queue, the processing proceeds to step S620, and the events that no messages existed therein, the flow proceeds to step S621 shown in FIG. 31.

Now, at the time of exchanging various types of information with other communication programs, such as image data, audio data, text data, etc., the communication program breaks the information down into information increments called "messages". Then, messages to be transmitted to the communication program of the other party are temporarily stored in the message transmission queue, and messages received from the other communication program are temporarily stored in the message reception queue. Note that a predetermined capacity is secured for the message transmission queue and message reception queue in a storage area of the RAM 621 of the computer 610, for example.

In step S620, the communication program transmits the messages existing in the message transmission queue to the server with which a session has been established. Following the processing in this step S620, the communication program proceeds with the processing to step S621 shown in FIG. 31.

In step S621, the communication program judges whether or not message is received from the server exist in the message reception queue. In the event that messages do exist in the message reception queue, the processing proceeds to step S622, and in the event that no messages exist therein, the processing proceeds to step S625.

In step S622, the communication program judges whether or not the function module that is the transmission destination of the message, i.e., the function module which uses this message, is already activated. In the event that the results of this judgment shows that the function module to be the transmission destination is not activated yet, the processing proceeds to step S623, and in the event that it already is activated, the processing proceeds to step S624.

In step S623, the communication program activates the activation module which is the destination of transmission of the message. Then, following activation of the function module which is the transmission destination, the communication program proceeds the processing to step S624.

In step S624, the communication program transmits the message to the function module which is a transmission destination of the message existing in the message transmission queue. Following the processing in this step S624, the communication program proceeds the processing to step S625.

In step S625, the communication program judges whether or not there is a request for ending the execution action, due to a predetermined instruction operation being performed by the user. In the event that the results of the judgment shows that quitting is requested, the processing proceeds to step S626, and in the event that quitting is not requested, the processing proceeds to step S613 in FIG. 30, and repeats this series of processing following the above-described step S613.

In step S626, the communication program judges whether or not it has itself activated the server module for realizing the server function. That is, the communication program judges whether or not the communication program itself is operating as a server. In the event that the results of this judgement show that the server module has been activated by itself, the processing proceeds to step S627, and in the event that the server module has not been activated by itself and the communication program is operating as a client, the various types of quitting processing are performed, and the series of processing operation is stopped.

In step S627, the communication program performs ending processing with regard to the server module which it itself has activated in step S615, thereby stopping the operation of the search for module. Subsequently, the communication program performs the various types of quitting operations, and the series of processing operation is stopped.

Next description will be made with regard to the series of processing at the server module activated in the above-described step S615, following the flowchart shown in FIGS. 33 and 34 in order.

Figure 33:
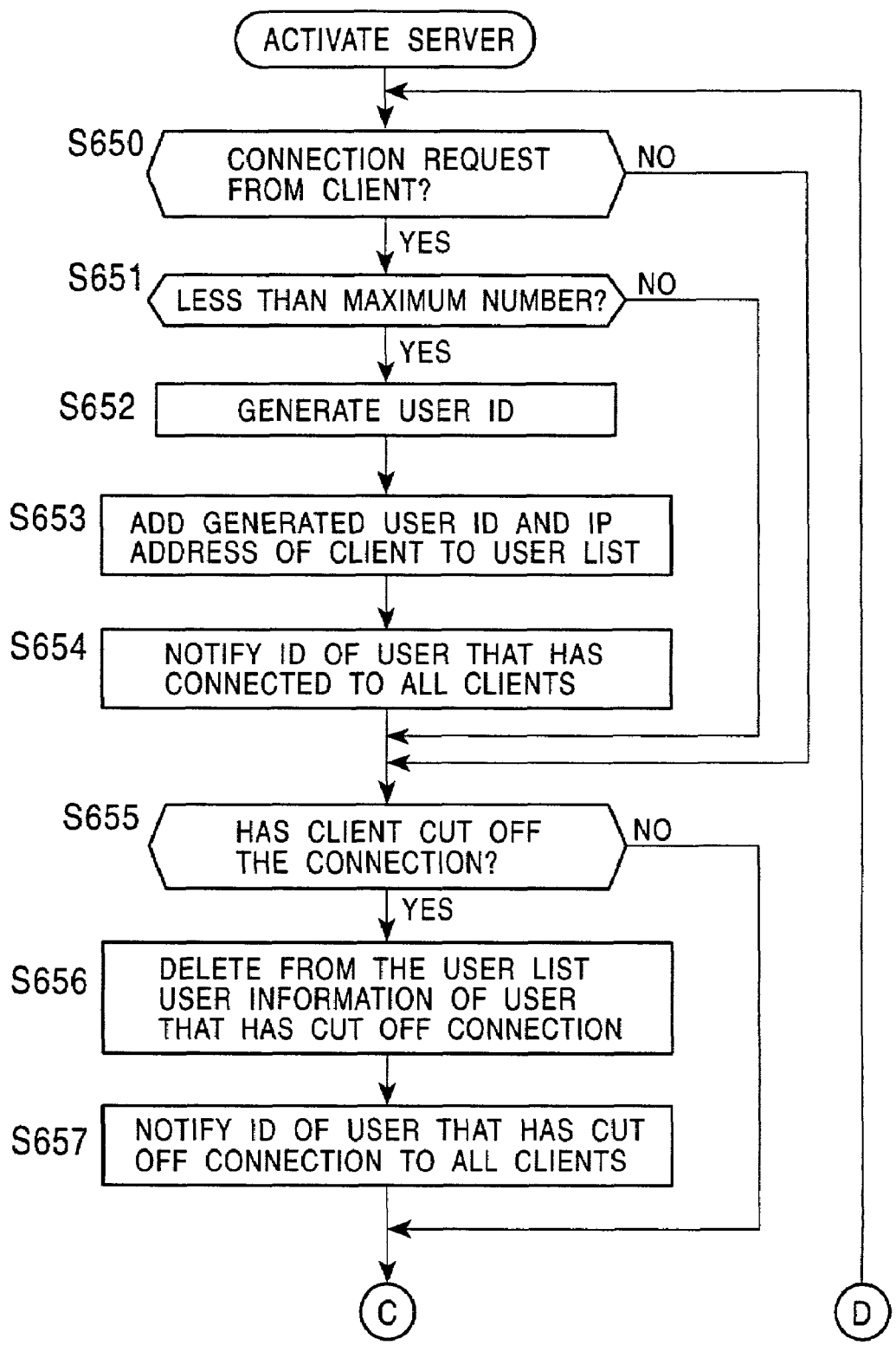
FIG. 33 is a flowchart illustrating the flow of processing by a server module activated in the communication program.

The server module, upon the execution processing starting, judges whether or not connection request (session establishing request) has been requested from a client in step S650 shown in FIG. 33. At this time, the client may be another function module making up the communication program which has activated the server module, or may be a function module making up a communication program being executed on another computer apparatus. In the event that the results of this judgment shows that a connection request has been received, the processing proceeds to step S651, and in the events that such has not been received, the processing proceeds to step S655.

In step S651, the server module judges whether or not the number of uses currently connected has reached the maximum number that has been set before hand. In the event that the results of this judgement show that the number of users has not yet reached the maximum number, the processing proceeds to step S652, and in the event that the number of users has yet reached the maximum number, the processing proceeds to step S655.

In step S652, the server module generates a user ID, which is information unique to each user, to a user which is performed and new connection request, and also establishes a session and connects with the communication program operating on the user side. Accordingly, a communication state is established with the server module, with the communication program operating at the side of the user which has performed a connection request as a client, and various information such as image data, audio data, text data, etc., can be exchanged.

Next, in step S653, the server module obtains the IP address of the computer apparatus executing the communication program at the user side which has made a new connection request, and the user name of the user, and adds the IP address and user name to user list along with the user ID generated in step S652.

Figures 34, 35:
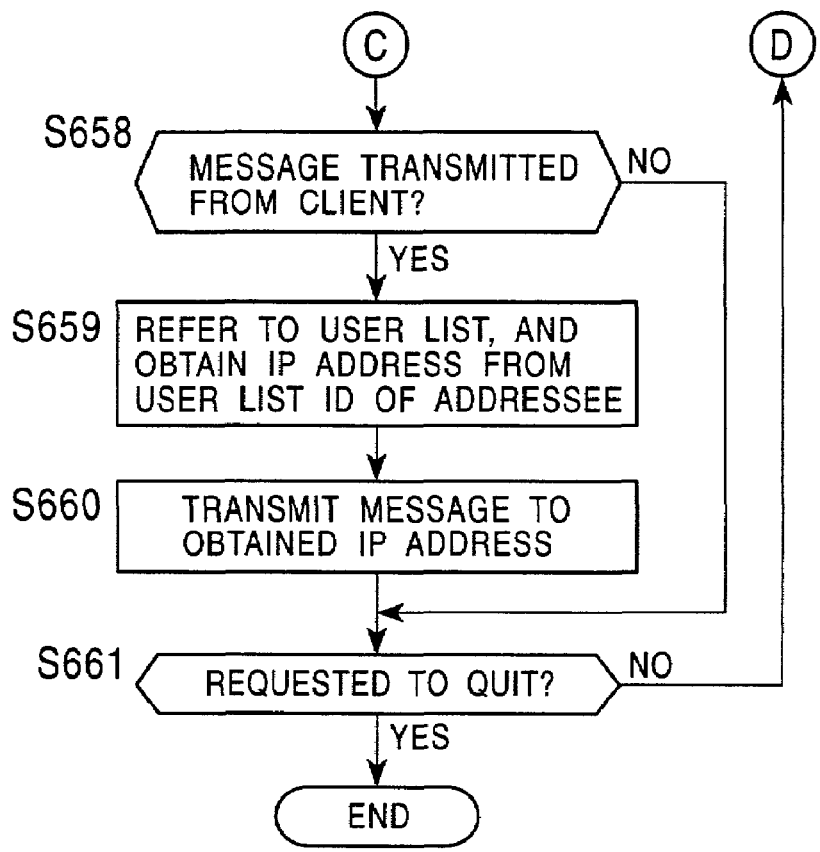
FIG. 34 is another flowchart illustrating the flow of processing by the server module activated in the communication program.
FIG. 35 is a model diagram illustrating the data structure of a user list used by the server module activated in the communication program.

Now, the user list has a data configuration such as shown in FIG. 35 for example, and is configured of the user ID of the user which has established a session with the server module, the user name of the user, and the IP address of the computer apparatus which executes the communication program at the user side.

Next, in step S654, the server module notifies all clients with which sessions have been established, of the user ID of the user which has been added in step S653. Accordingly, all clients which are connected to the server module can know that a new user has been connected. Following processing at this step S654, the server module proceeds the processing to step S655.

In step S655, the server module judges whether or not the connection state with the client with which a session has been established has been cut off. In the event that the results of the judgement show that the connection state has been cut, the processing proceeds to step S656, and in the event that the connection state has not been cut, the processing proceeds to step S658 shown in FIG. 34. At this time, factors causing the connection state to be cut off include, for example, trouble on the transmitting path between the server module and the client, quitting of the communication module by the user, and so forth.

In step S656, the server module deletes from the user list information relating to the user regarding which judgment has been made in that the connection state has been cut off in step 655. Next, in step S657, the server module notifies information such as the user ID and the like relating to the user which has been deleted from the user list in step S656, to all clients with which sessions have been established. Accordingly, all clients connected to the server module can know that the connection of this user has been cut off. Following the processing in step S657, the server module proceeds the processing to step S658 shown in FIG. 34.

In step S658, the server module judges whether or not a message has been transmitted from a connected client. In the event that the results of this judgment show that a message has been transmitted, the processing proceeds to step S659, and in that event that a message has not been transmitted, this processing proceeds to step S661.

In step S659, the server module makes reference to the user ID specified as the addressee of the message, and obtains an IP address corresponding to the user ID, based on the user list. Next in step S660, the server module transmits the message to the computer apparatus having set therein the IP address obtained in step S659, via a computer networks such as the Internet 611 or the like. Thus, the message is delivered to the transmission destination communication program. Following the processing in this step S660, the server module proceeds the processing to step S661.

In step S661, the server module judges whether or not a quitting request has been received from the communication program. In the event that the results of this judgement show that a quitting request has been received, the various types of quitting processing are performed, and a series of processing operation stops. Also, in the event that a quitting request has not been received, the processing proceeds to step S650 shown in FIG. 33, and a series of processing following the above-described step S650 is repeated. The quitting request to this server module is equivalent to step S627 in this series of processing of the communication program shown in FIG. 31 being processed.

The communication program is an application program which performs a series of processing as described above. As can be clearly understood from the above-described series of processing, the communication program can serve either as a server or as a client, depending on the need.

(2-7) Application Window Displayed by the Communication Program

Next, the application window displayed on the display screen of the display unit 624 by the above-described communication program being executed on the computer apparatus 610 will be described in order with reference to the figures.

Note that the communication program is configured so as to make the window display in a state according to start up conditions, but in the following description an example of execution processing under the most basic conditions will be described.

Also, with the communication system 600, communication programs are provided to each of the computer apparatuses 610 in an executable state, and the communication systems 600 is made up by a communication programs running on the computer apparatuses 610 to exchange various types of information, but in the following description, a window display made by a communication program operating on a particular computer apparatus 610 being executed, will be described.

Also, in the following description, the user of the communication program of interest in the description will be referred to as "user", and the user of the communication program connected to this communication program, i.e., the user of the other party, will be referred to as "client". However, the communication program of interest described here is not necessarily have to carry out server functions, and the server functions may be carried out by the communication program operating at the side of the user of the other party (client).

Figure 36:
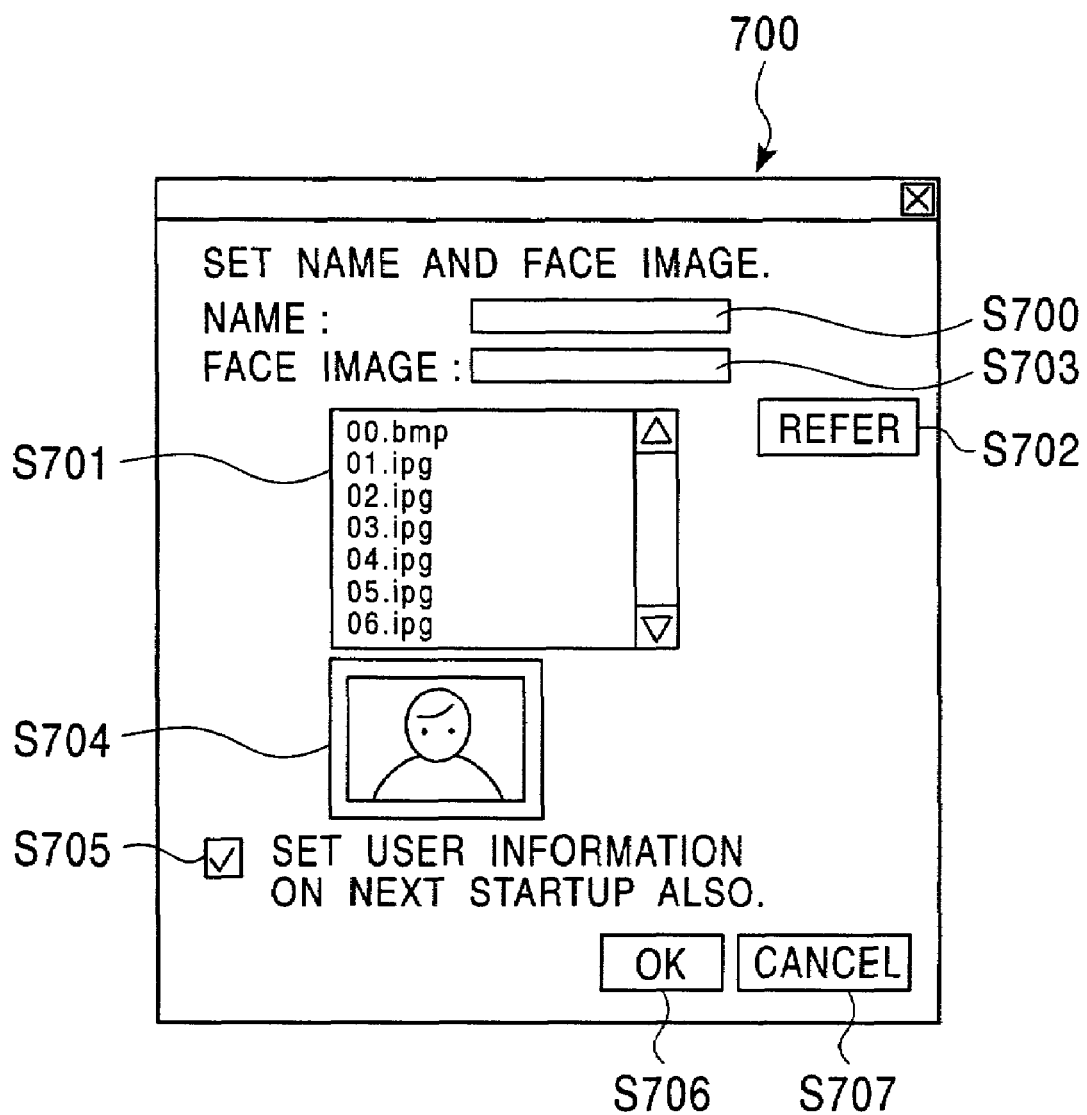
FIG. 36 is a model diagram illustrating an example of a user information setting window displayed on the screen of the computer apparatus by the communication program being executed.

Upon execution processing of the communication program being started, a user information setting window 700 such as shown in FIG. 36 is displayed on the screen of the display unit 624. This user information display window is a window for prompting selection of the name and face image corresponding to the user him/herself at the time of activating the communication program, and has the text input area S700 for inputting the name in text, and a face image selecting area S701 for selecting an image file corresponding to the face image.

The text input area S700 becomes capable of receiving a text input by being selected by a mouse or the like connected to the computer apparatus 610, for example, and is an area wherein text can be input from a keyboard or the like in this state. The text input to this text input area S700 is set as the user name in the subsequent communication program processing.

The face image selecting area S701 is an area where an a list of file names corresponding to image data stored in the computer apparatus 610, is displayed, registered as face images beforehand. The user selecting a file name from the list displayed in the face image selecting area S701 sets the image file corresponding to the selected file name as the face in image of the user in the subsequent communication program processing.

Also, the user information setting window 700 has a reference button S702 for making reference to files corresponding to this image data, at the time of the user setting arbitrary image data as a face image. Upon the reference button S702 being selected, a file selection window for selecting image data existing within the computer apparatus 610 is displayed. Then, upon the user selecting an operating a file within the file selecting window, image data corresponding to the selected file is set as a face image of the user. Also, the location (path) in the computer apparatus 610 where the file to the selected is, is displayed in a path display area S703 of the user information setting window 700. Also, an arrangement may be made wherein the arbitrary image data (file) is made selectable as a face image by directly text to the path display area S703, specifying a path.

Also, the user information setting window 700 has a preview display area S704 for making a preview display of the contents of the image data selected by the user as described above. Accordingly, the communication program is capable of selecting a face image which the user desires, in an easy and sure manner.

Now, FIG. 36 illustrates an example of a case wherein a so-called default face image, selected beforehand, is displayed in the preview display area S704. The following description will be made assuming a case wherein the user has selected no particular face image in the user information setting window 700, and this default face image has been selected.

The user information setting window 700 has: the check box S705 for setting whether or not to select a name and face image in the same way as described above upon the next target as well, an OK button S706 for ending the selection operation of the name and face image, and to cancel button S707 for canceling the selection operation of the name and face image, and canceling activation of the communication program.

In the event that the check box S705 is checked, the communication program displays the user information setting window 700 upon startup the next time as well. On the other hand, in the event that the check box S705 is not checked, the display of the user information setting window 700 is omitted, and the name and face image set by the user at the previous time is referred to and used.

Figure 37:
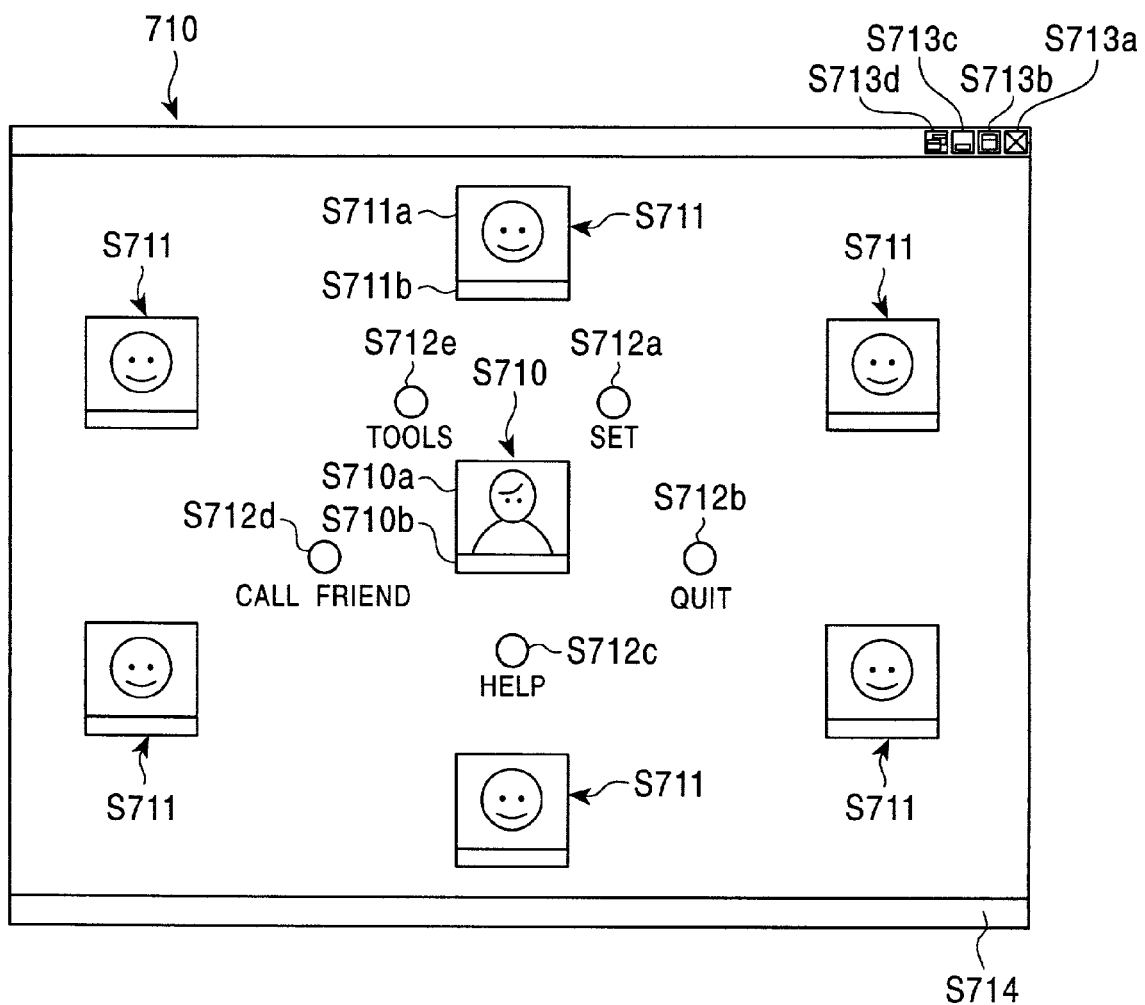
FIG. 37 is a model diagram illustrating an example of a basic display window displayed on the screen of the computer apparatus by the communication program being executed.

Now, upon the user selecting the OK button S706 in the user information setting window 700, communication program makes transition to a basic display mode, and displays a basic display window 710 such as shown in FIG. 37. In the event that the check box S705 in the user information setting window 700 is checked at the previous time, display of the user information setting window 700 is omitted the at the time of starting up the communication program, so the program goes to the basic display mode immediately following startup, and the basic display window 710 is displayed.

(2-7-1) Basic Display Mode

Now description of a case wherein the communication program has made transition to the basic displayed mode will be described with reference to the basic display window 710 shown in FIG. 37.

The basic display window 710 is a window which is displayed in the case at the communication program has made transition to the basic display mode, and is showing in FIG. 37, has a user face image frame S710 which displays a face image corresponding to the user, multiple client face image frames S711, each displaying face images corresponding to multiple clients, and multiple function selection buttons S712 for making selection operation for execution of various functions.

The user face image frame S710 is disposed at the center of the basic display window 710, and is made up of the face image display area S710a displaying a face image selected by the user, and a name display area S710b which is situated at the bottom of the face image display area S710a.

The client face image frames S711 are disposed at certain intervals when an imaginary circle with the user face image frame S710 at the center. These client face image frames S711 are equivalent to the user face image frame S710, and are frames for displaying client-side information, each having a face image display area S711a displaying the face images selected by each of the clients, and a name display area S711b located at the bottom of the face image display area S711a, displaying the name set by each of the clients.

Also, in FIG. 37, the state is shown wherein no clients are connected yet. In this state, the client face image frame S711 is in the state displaying a predetermined face image indicating that no clients are connected.

Also, each of the client face image frames S711 are displayed while slowly moving through an area centered on the initial display position of each. Thus, in the basic display window 710, each of the client face image frames S711 are displayed in a somewhat floating manner.

The function selection buttons S712 are disposed at certain intervals when an imaginary circle centered on the user face image frame S710. The radius of the imaginary circle upon which the function selection buttons S712 are disposed is smaller than the radius of the imaginary circle upon which the client face image frames S711 are disposed. That is to say, the function selection buttons S712 are displayed at a position inward from the client face image frames S711.

Predetermined functions are correlated to each of the function selection buttons S712. Upon one of the function selection buttons S712 being selected by a user, the communication program makes transition to an operation mode for realizing the functions corresponding to the selected function selection button S712.

In the example shown in FIG. 37, a "set" button S712a, a "quit" button S712b, a "help" button S712c, a "friends" button S712d, and a "tools" button S712e, are displayed.

The set button S712a is a function selection button for performing various types of settings necessary for the communication program. Upon the user selecting the set button S712a, the communication program displays a setting window showing setting items such as, for example, whether or not to emit sound effects in the event that operations are made by the user (omitted in the drawings). The communication program saves the items set by this setting window in a predetermined storage area in the computer apparatus 610, and reflects these on the operation of the communication program itself.

The quit button S712b is a function selection button for quitting the execution processing of the communication program. In the event that the user selects the quit button S712b, the communication program quits all execution processing.

The help button S712c is a function selection button for displaying help information for explaining operations of the communication program to the user. Upon the user selecting the help button S712c, the communication program displays help information describing operation guides and troubleshooting tips and the like in the help window (omitted in the drawings). Enabling such help information to be displayed allows the communication program to explain its own operations and functions to unaccustomed users in a way that is easy to understand.

The friends button S712d is a button for prompting other users (clients) connected to the Internet 611 to connect to the communication program and participate in the communication. Upon the user selecting the friend button S712d, a series of processing for prompting a client to participate is performed. The details of this processing will be described later.

The tools button S712e is a function selection button for making transition to a tools mode for realizing various operations by the user. Upon the user selecting the tools button S712e, the communication program makes transition to the tools mode. The details of this tools mode will be described later.

The basic display window 710 has multiple operation icons S713 for handling the display state of the basic display window 710 displayed next to each other as uppermost portion of the window, and a status display area S714 where the operation state (status) of the communication program and various types of messages are displayed as necessary, at the bottommost portion of the window.

Here, in the example shown in FIG. 37, a "quit" icon S713a, a "maximum" icon S713b, a "minimum" icon S713c, and a "change display size" icon S713d are displayed as operation icons S713.

The quit icon S713a is an operation icon for quitting execution processing of the communication program. In the event that the user selects the icon S713a, all execution processing is quit.

The maximum icon S713b is an operation icon for making a full-screen in largest display of the basic display window 710 of the computer display 610. Upon the user selecting the maximum icon S713b, processing for enlarging and displaying the basic display window 710 on the entire screen of the computer apparatus 610 is performed.

The minimum icon S713c is an operation icon for canceling the display of the basic display window 710, and deleting it from the display screen of the computer apparatus 610. Upon the user selecting the minimum icon S713c, the communication program cancels display of the basic display window 710, and performs processing for deleting this from the display screen of the computer apparatus 610. Notes that even in the state that the basic display window 710 has been deleted from the display screen in this way, the execution processing of the communication program still continues.

Figure 38:
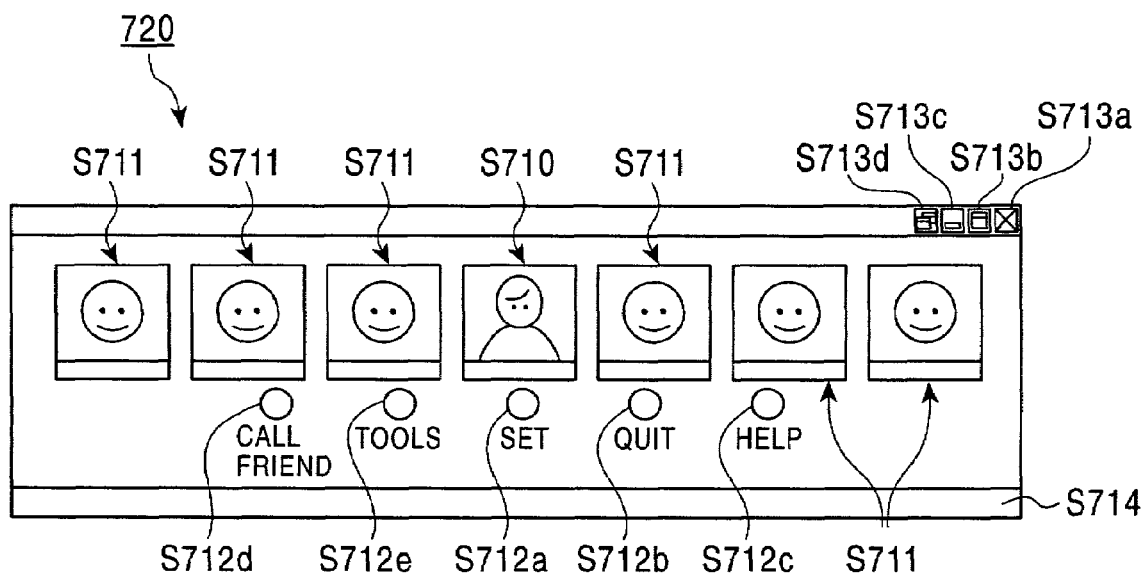
FIG. 38 is a model diagram illustrating an example of a reduced display window displayed on the screen of the computer apparatus by the communication program being executed.

The change display size icon S713d is an operation icon for making transition to a reduction display mode wherein the basic display window 710 displayed in a reduced manner. Upon the user selecting the change display size icon S713d, the communication program makes transition from the basic display mode to the reduced displayed mode. Accordingly, the display area of the basic display window 710 is reduced, and becomes a reduced display window 720, such as shown in FIG. 38, for example.

(2-7-2) Reduced Display Mode

Now a case wherein the communication program has made transitioned to reduced display mode will be described with reference to the reduced display window 720 shown in FIG. 38.

The reduced display window 720 is a window displayed in the event that the communication program has made transition to the reduced display mode, wherein the display area is smaller than that of the basic display window 710, and the window and assumes a shape elongated in the horizontal direction on the screen of the computer apparatus 610.

Now, with the reduced display window 720 shown in FIG. 38, description of the frames having an equivalent functions with those in the basic display window 710 shown in FIG. 37 will be denoted with the same reference numerals, and description thereof will be omitted. Also, in the following description, the frames, buttons, and icons, denoted by the same reference numerals in the figures, will be described as equivalent to those described above.

In this reduced display window 720, the multiple client face image frames S711 are arrayed sideways on both sides of the user face image frame S710 positioned at the center, and the function selection buttons S712 are arrayed sideways below the user face image frame S710 and the client face image frames S711. Also, the multiple operation icon 713 are disposed at the uppermost portion of the reduced display window 720.

In the event that the user selects the display size changing icon S713d in this reduced display window 720, the communication program makes transition from the reduced display mode to the basic display mode. Accordingly, the display area of the reduced display window 720 is enlarged, and becomes the basic display window 710 shown in FIG. 37.

That is, with the communication program, the basic display mode and the reduced display mode can be freely switched between, back and forth, by the user selecting the change display size icon S713d.

(2-7-3) Participation of Clients

Now, description will be made regarding a case wherein the user selects the above-described friends button S712d. In the event that the user selects the friends button S712d, the communication program performs the series of processing prompting the client to participate. At this time, the communication program transmits connection setting information to the client that the user has specified. Thus, the session is established from the client side to the user side, based on the IP address contained in the connection setting information, and the connection is completed.

Now, at the time of transmitting the connection setting information to the client side, the communication program attaches a file containing connection setting information to an e-mail, for example, and transmits this e-mail to the computer apparatus of the client side. At this time, the e-mail with contents shown in the e-mail window 740 shown in FIG. 39, for example, is transmitted to the client side.

Figure 39:
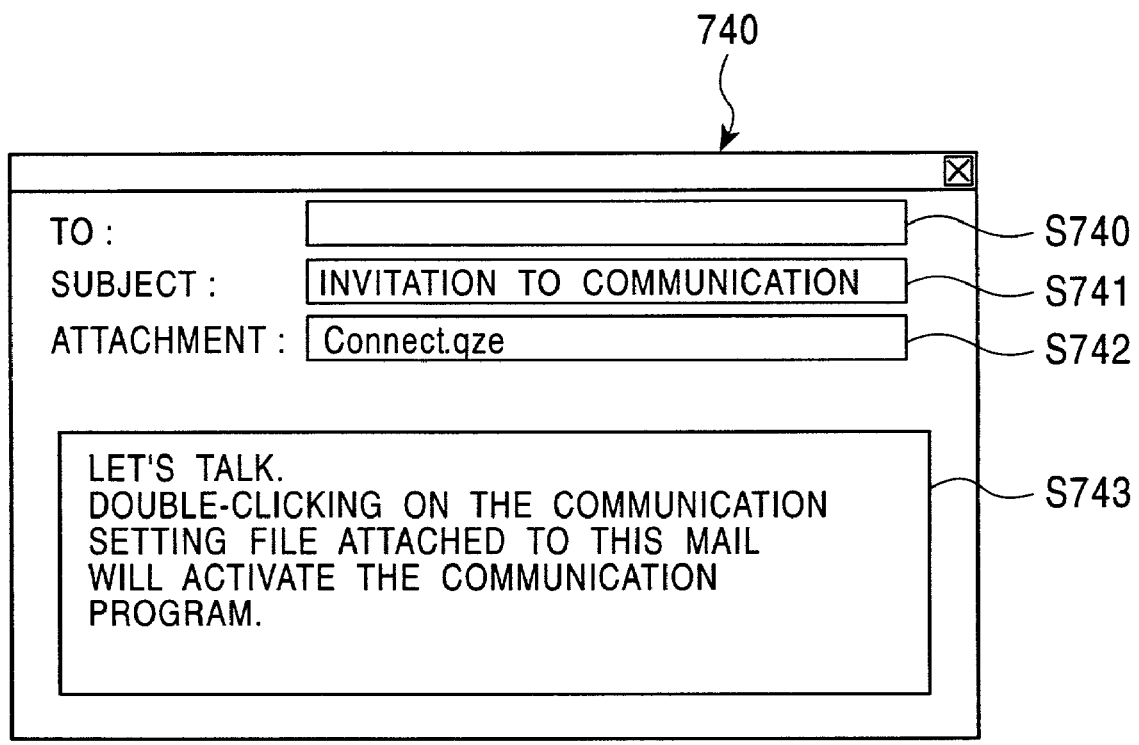
FIG. 39 is a model diagram illustrating an example of an e-mail window displayed on the screen of the computer apparatus by the communication program being executed.

As shown in FIG. 39, the e-mail window 740 is made up of an addressee input area S740 for inputting and displaying that addressee of this e-mail, i.e., the e-mail address set to the computer apparatus of the client to be prompted to participate, a subject input area S741 for inputting and displaying the subject of this e-mail, an attachment file display area S742 for displaying the file name and the like of a file attached to this e-mail, and a main body display area S743 for input and display of the body of this e-mail.

Input to the subject input area S741 is text prompting the receiver to connect to the user-side communication program and participate in communication, such as "INVITATION TO COMMUNICATION", for example. Also, displayed in the attached file display area S742 is the file name of a file containing the connection setting information (for example, "Connect.qze"), or the like. Also, described in the main body display area S743 is a message prompting the receiver to activate the communication program on the computer apparatus that the transmission destination of the e-mail by executing the file attached to the e-mail, for example, thereby establishing a session with the user-side communication program.

Then, following user inputting the e-mail address of the client who is to be prompted to participate in the addressee input area S740, transmission processing of this e-mail is performed, thereby transmitting the connection setting information to the client side in the form of a file attached to the e-mail.

Now, the communication system 600 is by no means restricted to transmitting and connection setting information to the client side by e-mail, and an arrangement may be made wherein, for example, application programs for realizing various types of file exchange between computers connected to the Internet 611, such as so-called FTP software, are used to send the connection setting information in the form of data files or application programs. Also, for example, a configuration may be made wherein the communication program is automatically activated in on the client-side computer apparatus without the user being conscious of starting of the connection (establishing of a section), by directly exchanging the connection setting information between the computer apparatuses, without notifying starting of the connection to the user of the computer apparatus.

(2-7-4) Interaction with Client

Figure 40:
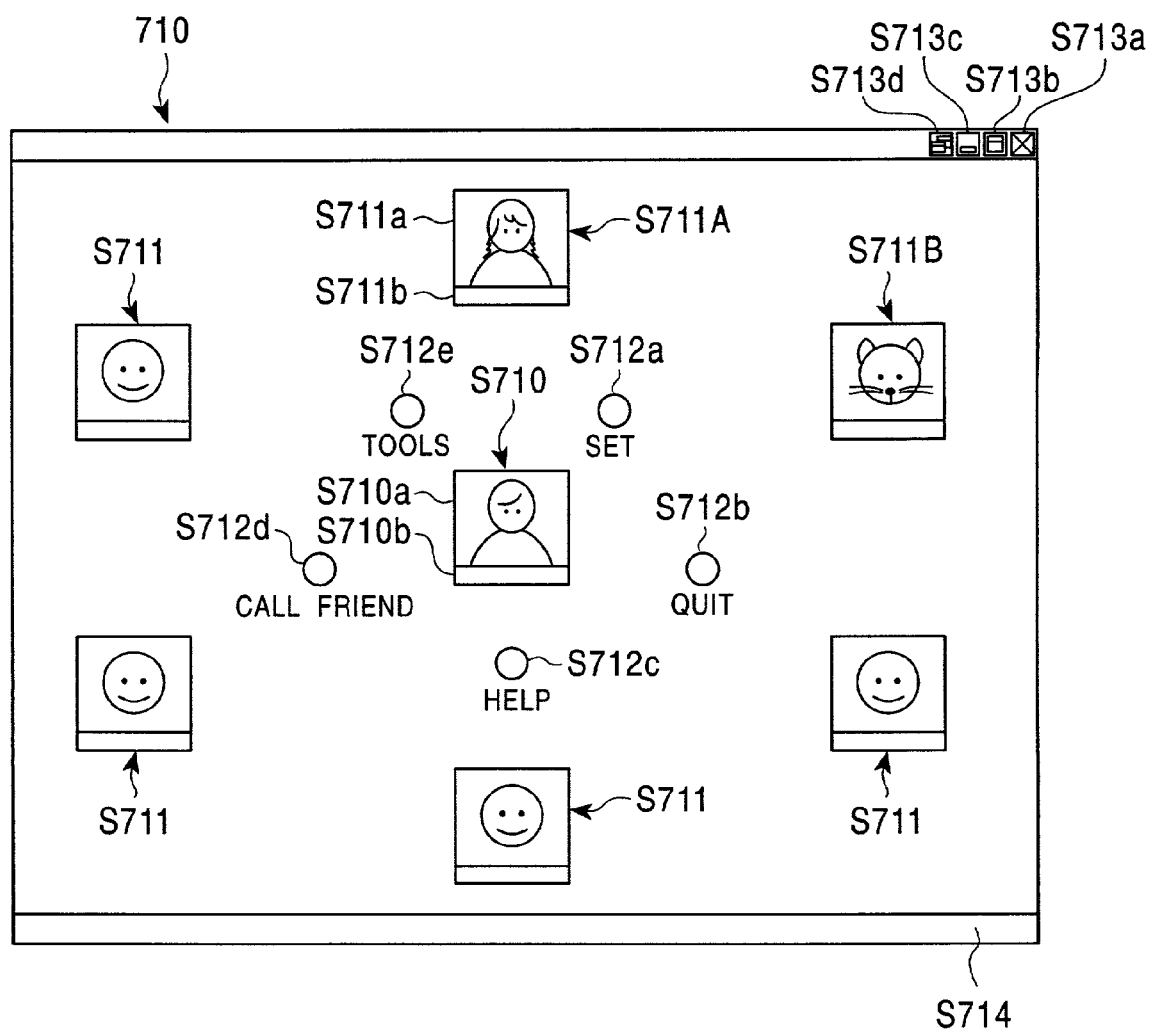
FIG. 40 is a model diagram illustrating an example of a state wherein a client is connected to the communication program, and an image corresponding to the client is displayed in the basic display window.

Now, once the connection setting information is transmitted to the client side as described above, and a session is established with the client, the face image in name of the client with which the connection has been made it is displayed on the client face image frame in the basic display window 710, for example, as shown in FIG. 40.

Here, FIG. 40 shows two clients having been connected. The first client has set thereto an image depicting a half figure of a female, while the second client has set thereto an image depicting the face of an animal, these being displayed in a first client face image frame S711A and a second client face image frame S711B. The following description assumes a state where and these first and second clients are connected.

Figure 41:
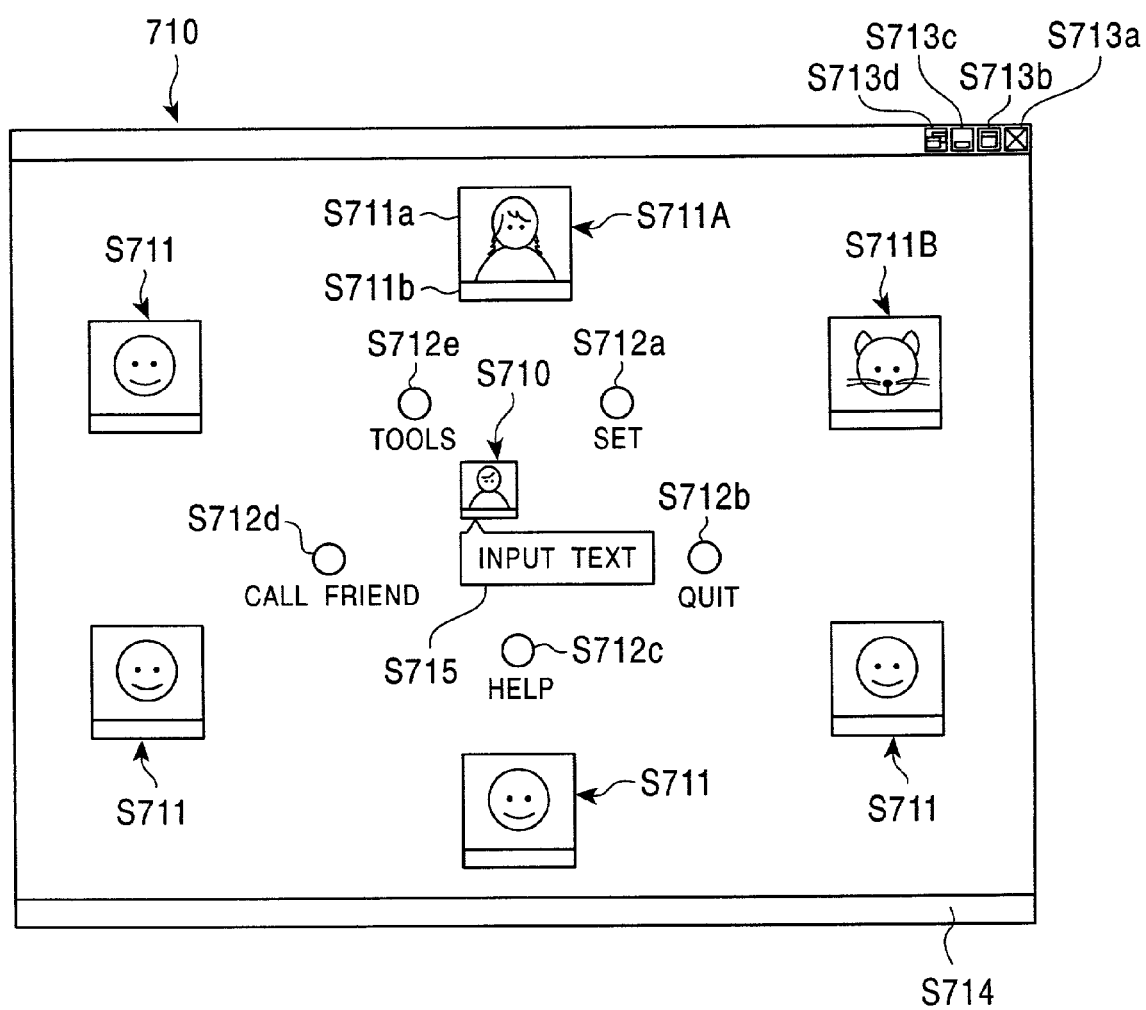
FIG. 41 is a model diagram illustrating an example of the basic display window in the event that text data is to be transmitted from the user side, in the communication program.

Now, in the event that the user selects the user face image frame S710 by the cursor moving over the user face image frame S710 by a mouse operation or the like, for example, the user face image frame S710 is displayed it in a reduced manner as shown in FIG. 41, while a text input area S715 which allows the user to input text (character data) is displayed near the position of the user face input frame S710 displayed in a reduced manner.

This text input area S715 is an area having a shape of a "balloon" which is what is used for comic characters to "talk", and this is positioned as to the user face input frame S710 displayed in a reduced manner, so that the text input thereto appears to be spoken by the face image in the user face input frame S710. Upon the user a text into this text input area S715, the communication program transmits the input text (character data) to all clients that are currently connected.

Figure 42:
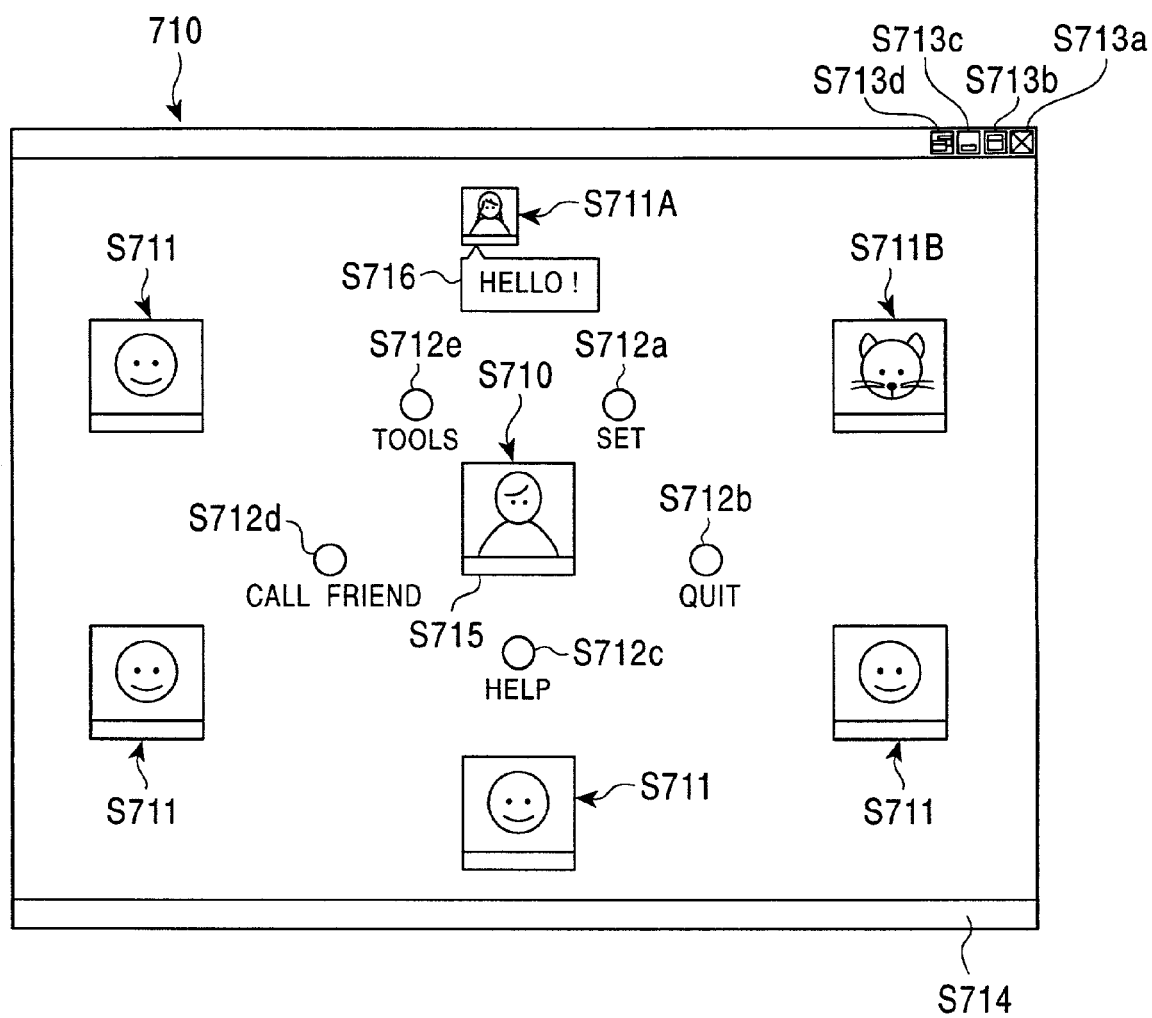
FIG. 42 is a model diagram illustrating an example of the basic display window in the event that text data transmitted from the client side is displayed, in the communication program.

Also, upon receiving text and (character data) transmitted from a client in the same manner, the communication program displays the client face image frame S711 corresponding to this client in a reduced manner, as shown in FIG. 42, and displays the text transmitted from the client in the text display area S716 near the client face image frame S711 which is displayed in a reduced manner. This text display area S716 is an area which has a shape like a so-called "balloon", used in comics, corresponding to the client face image frame S711 displayed in a reduced manner.

FIG. 42 shows a case wherein the text "Hello!" is transmitted from the client so the first client face image frame S711A is displayed in a reduced manner, and the text display area S716 is displayed near the first client face image frame S711A. Also, with the communication program, in the event that text is transmitted from multiple clients at the same time, for example, text display areas S716 are displayed for each of the corresponding clients. That is to say, in the event that text is transmitted from four clients at the same time, the client face image frames S711 corresponding to each of the clients are displayed in a reduced manner, and balloon-shaped text display areas S716 are displayed for each of these.

As described above, with this communication program, character data can be mutually exchanged between the user and clients, and further, text can be exchanged in a simultaneously progressive manner.

Also, with a communication program, the above-described exchange of text using the text input area S715 and text display area S716 is not restricted to the basic display window 710 in the basic display mode, but rather is enabled in windows in other operating modes, as well.

(2-7-5) Tools Mode

Now, description will be made regarding a case of the communication program making a transition to the tools mode, with reference to the tools display window 750 displayed in FIG. 43.

Figure 43:
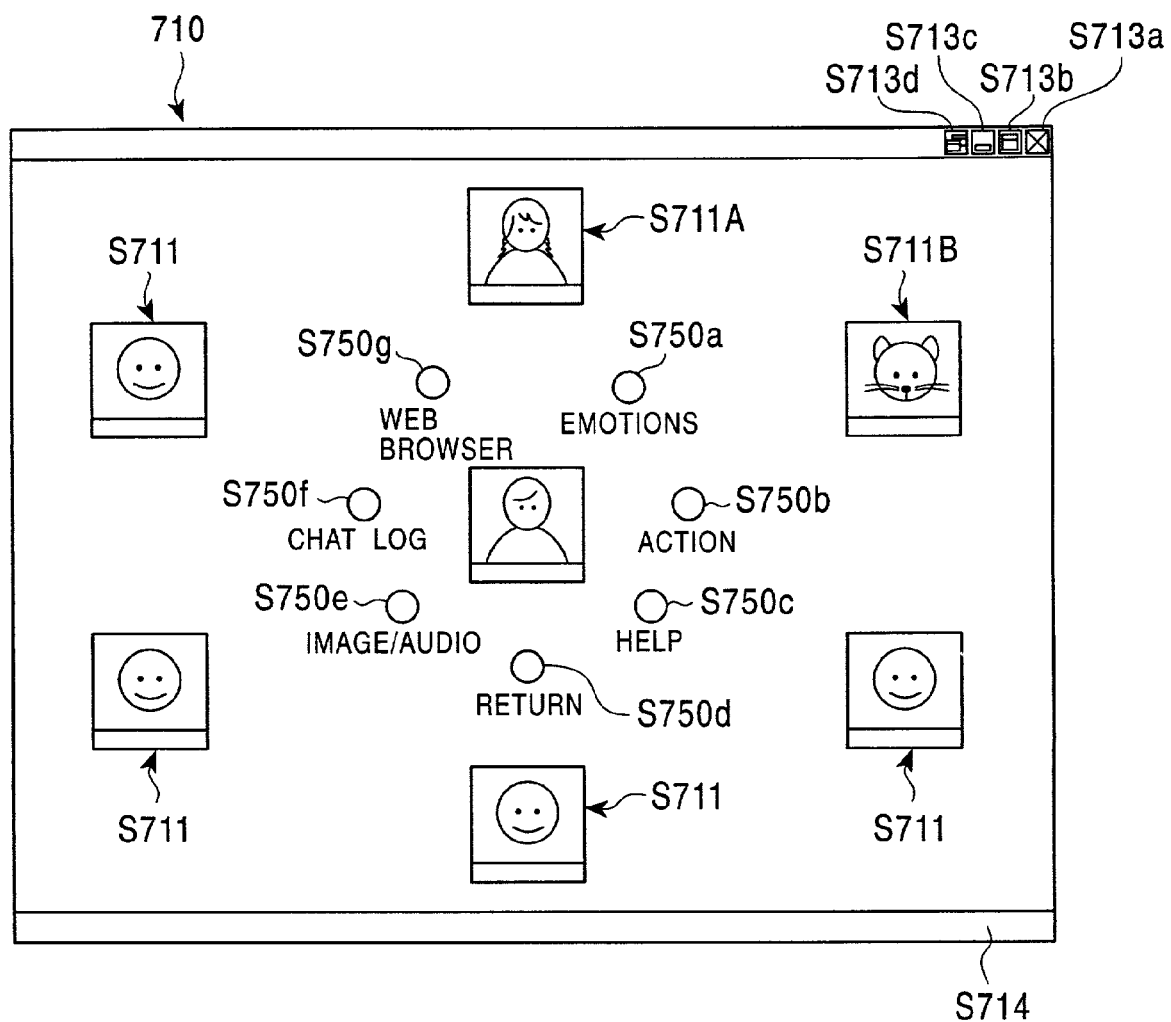
FIG. 43 is a model diagram illustrating an example of a tool display window which is displayed on the screen of the computer apparatus by executing the communication program.

The tools display window 750 is a window which is displayed in the case of the communication program making a transition to the tools mode, and as shown in FIG. 43, has the same basic configuration as that of the basic display window 710 showed in FIG. 37. With this tools display window 750 shown in FIG. 43, description with regard to the frame, buttons, and icons which are the same or equivalent to those in the basic display window 710 shown in FIG. 37 will be omitted, and these components will be denoted with the same reference numerals.

The tools display window 750 differs from the basic display window 710, in that it has multiple function selection buttons S750 instead of the function selection buttons S712 shown in FIG. 37. The function selection buttons S750 are arrayed at certain intervals on an imaginary circle centered on the user face image frame S710, in the same way as the function selection buttons shown in FIG. 37. The radius of the imaginary circle upon which the function selection buttons S750 are disposed is smaller than the radius of the imaginary circle upon which the client face image frames S711 are disposed. That is to say, the function selection buttons S750 are displayed at a position inward from the client face image frames S711.

Predetermined functions are correlated to each of the function selection buttons S750. Upon one of the function selection buttons S750 being selected by a user, the communication program makes transition to an operation mode for realizing the functions corresponding to the selected function selection button S750.

In the examples shown in FIG. 43, an "emotion" button S750a, an "action" button S750b, a "help" button S750c, a "return" button S750d, an "image/audio" button S750e, a "chat log" button S750f, and a "Web browser" button S750g, are displayed.

The emotion button S750a is a function selection button for making transition to an emotion expressing mode for the user to express emotions. Upon the user selecting the emotion button S750a, the mode changes to the emotion expressing mode. The details of the emotion expressing mode will be described later.

The action button S750b is a function selection button for making transition to an action expressing mode for the user to express actions to other clients. Upon the user selecting the action button S750b, the communication program makes transition to the action expression mode.

The help button S750c is a function selection button equivalent to the help button S712c shown in FIG. 37, for displaying help information for explaining operations of the communication program to the user. Upon the user selecting the help button S712c, the communication program displays help information describing operation guides and troubleshooting tips and the like in the help window (omitted in the drawings).

The return button S750d is a function selection button for quitting the tools mode and returning to the basic display mode. Upon the user selecting the return button S750d, the communication program quits the tools mode and makes transition to the basic display mode.

The image/audio button S750e is a function selection button for making transmission to an image/audio setting mode for the user to make various settings operations relating to images and audio. Upon the user operating the image/audio button S750e, the communication program makes transition to the image/audio mode.

The chat log button S750f is a function selection button for making transition to a chat log display mode for displaying a chat log. Upon the user selecting the chat log button S750f, the communication program makes transition to the chat log display mode.

The Web browser button S750g is a function selection button for making transition to a Web browsing mode. Upon the user selecting the Web browser button S750g, the communication program makes transition to the Web browsing mode.

Also, in the event that the change display size icon S713d is selected by the user in the state that the tools display window 750 is displayed, the communication program displays the reduced display window 720 shown in FIG. 38. In the event that the reduced display window 720 is displayed in the tools mode state, the above-described function selection buttons S750 are displayed in the reduced display window 720 shown in FIG. 38 instead of the function selection buttons S712. Also, in the event that transition is made in the state of the reduced display window 720 shown in FIG. 38 being displayed, the reduced display window 720 remains, and the above-described function selection buttons S750 are displayed instead of the function selection buttons S712.

That is, with the communication program, the window size may be maximized or minimized corresponding to the maximum icon S713b and the minimum icon S713c, without being dependent on the operating mode. Also, each time the user selects the change display size icon S713d, the window switches back and forth between the state display in the standard size equivalent to the basic display window 710 or the tools display window 750, and the state displayed in the reduced size equivalent to the reduced display window 720. Note that with the communication program, such changes in window size can be made in the operation modes described later, as well.

(2-7-6) Emotion Expression Mode

Now, a case of the communication program making transition to the emotion expression mode will be described with reference to the emotion expression window 760 shown in FIG. 44.

Figure 44:
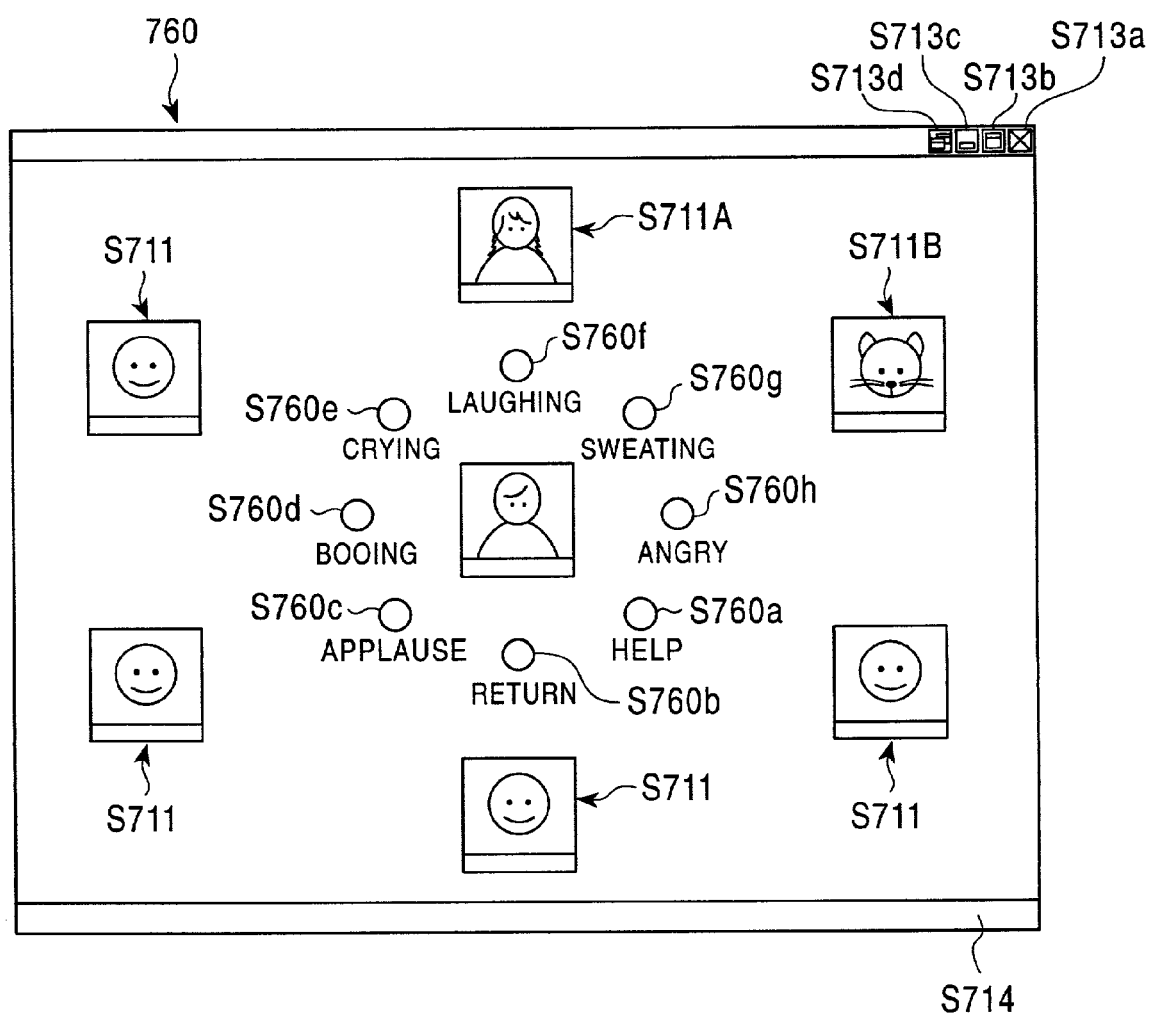
FIG. 44 is a model diagram illustrating an example of an emotion expression window which is displayed on the screen of the computer apparatus by executing the communication program.

The emotion expression window 760 is a window displayed in the event that the communication program makes transition to the emotion expression mode, and as shown in FIG. 44, basically has the same configuration as that of the basic display window 710 shown in FIG. 37. Accordingly, with the emotion expression window 760 shown in FIG. 44, description with regard to the frame, buttons, and icons which are the same or equivalent to those in the basic display window 710 shown in FIG. 37 will be omitted, and these components will be denoted with the same reference numerals.

The emotion expression window 760 differs from the basic display window 710, in that it has multiple function selection buttons S760 instead of the function selection buttons S712 shown in FIG. 37. The function selection buttons S760 are arrayed at certain intervals on an imaginary circle centered on the user face image frame S710, in the same way as the function selection buttons shown in FIG. 37. The radius of the imaginary circle upon which the function selection buttons S760 are disposed is smaller than the radius of the imaginary circle upon which the client face image frames S711 are disposed. That is to say, the function selection buttons S760 are displayed at a position inward from the client face image frames S711.

Predetermined functions are correlated to each of the function selection buttons S760. Upon one of the function selection buttons S760 being selected by a user, the communication program makes transition to an operation mode for realizing the functions corresponding to the selected function selection button S760.

In the example shown in FIG. 44, a "help" button S760a, a "return" button S760b, an "applause" button S760c, a "booing" button S760d, a "cry" button S760e, a "laugh" button S760f, a "sweat" button S760g, and an "angry" button S760h, are displayed as function selection buttons.

The help button S760a is a function selection button, equivalent to the help button S712c shown in FIG. 37, for displaying help information for explaining operations of the communication program to the user. Upon the user selecting the help button S760a, the communication program displays help information describing operation guides and troubleshooting tips and the like in the help window (omitted in the drawings).

The return button S760b is a function selection button for quitting the emotion expression mode and returning to the tools mode. Upon the user selecting the emotion expression button S760b, the communication program quits the emotion expression mode and makes transition to the tools mode.

The function selection buttons S760c through S760h are function selection buttons for expressing emotions corresponding to the names of each. In the event that the user selects one of the function selection buttons S760c through S760h, the communication program applies animation effects expressing emotions corresponding to the names of the function selection buttons S760c through S760h, to the user face image frame S710. At this time, the communication program may output audio that expresses the emotion from a speaker device either connected to or installed in the computer apparatus 610, at the same time as applying the animation effects to the user face image frame S710. Thus, expressions of emotions can be improved even further.

Now, as a specific example of animation effects and audio expressing emotions, a description will be made regarding a case that the applause button S760c has been selected by the user. In this case, for example, an applauding animation image (either a moving image or a series of still images) is superimposed over the face image within the face image display area S710a of the user face image frame S710, for example, and that the same time, audio of the sound of hands clapping is output. An arrangement may also be made wherein, at this time, the display position of the entire user face image frame S710 is continuously changed within the predetermined area centered around the initial display area, thereby further intensifying the expression that the user is applauding.

Also, in the event that the cry button S760e has been selected by the user, a crying animation image is superimposed over the face image within the face image display area S710a of the user face image frame S710, for example, and that the same time, audio of the sound of crying is output. An arrangement may also be made wherein, at this time, the display position of the entire user face image frame S710 is continuously changed within the predetermined area centered around the initial display area, thereby further intensifying the expression that the user is crying.

As described above, the communication program is capable of expressing emotions of the user by displaying animation images, outputting audio, and changing the display position of the user face image frame S710.

Now, upon the user selecting one of the function selection buttons S760c through S760h, the respective emotion expression effects are applied to the user face image frame S710 as described above, and also transmits information indicating that the user has selected one of the function selection buttons S760c through S760h to all of the clients via the server. Accordingly, the above-described effects are applied to the face image corresponding to the user on the communication program running on the client side.

That is, for example, in the case that an emotion expression described above has been selected at the first client side corresponding to the first client face image frame S711A, the first client face image frame S711A is subjected to the display of an animation image, output of audio, and changing the display position of the first client face image frame S711A, in the window which the communication program is displaying at the user side.

Thus, the communication program allows the user and client to share various types of expressions of emotions. Accordingly, the communication program is capable of more diverse and effective communication as compared to communication simply by text (character data).

(2-8) Exchanging Function Modules Between Communication Programs

As described above, the communication program according to the present embodiment is capable of carrying out communication with text and images between multiple users with established sessions, by the multiple function modules for realizing each of the functions operating cooperatively.

Now, in the event that the user of the other party (client) does not have a particular function module for carrying out a certain function which the user is attempting to use by selecting an above-described function button, the communication program has a function for transmitting the function module from the user side to the client side, so that this function module can also be used at the client side. The following is a description of exchanging function modules in this way between communication programs (i.e., between the users side and the client side).

(2-8-1) Overview of Function Module Exchange

First an overview of a case of exchanging function modules, realized by the communication program according to the present embodiment, will be described with reference to FIG. 45.

Figure 45:
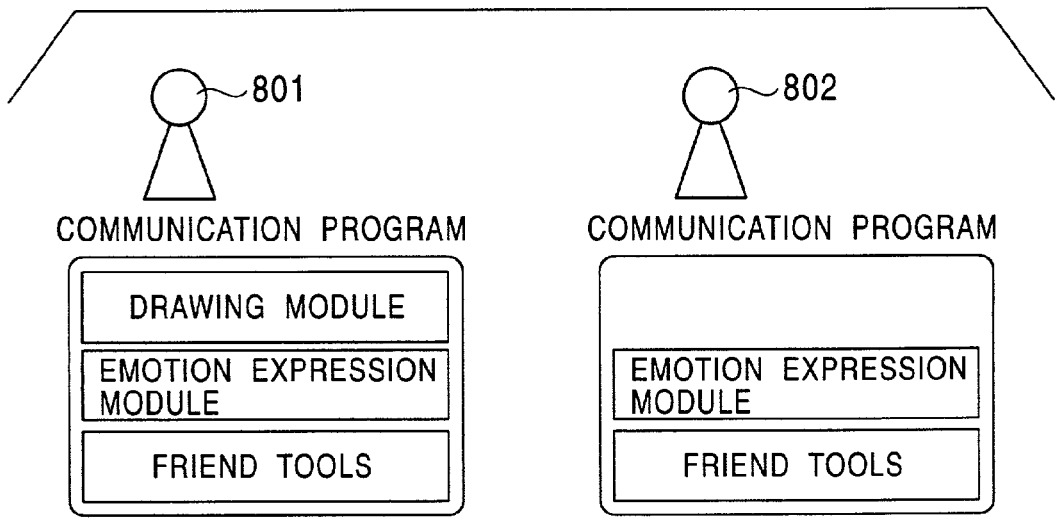
FIG. 45 is a model diagram describing a case of exchanging a function module by the communication program.

In the following, let us assume a case wherein, as shown in FIG. 45, the two application modules 653 of "drawing module" and "emotion expression module" are installed to the communication program at the side of one user (the first user 801), while only the one application module 653 of "emotion expression module" is installed to the communication program at the side of the other user (the second user 802). Also, memory area for holding function module provided from other users are set in the storing means (e.g., the RAM 621 or hard disk drive 623) of the computer apparatuses 610 of the first and second users 801 and 802. This memory area is displayed as "FRIEND TOOLS" in FIG. 45.

In the state shown in FIG. 45, in the event that the first user 801 uses the "drawing module", the communication program of the second user 802 is not installed with the "drawing module", so in this state the first user 801 cannot communicate with the second user 802 by exchanging data relating to the "drawing module".

Figure 46:
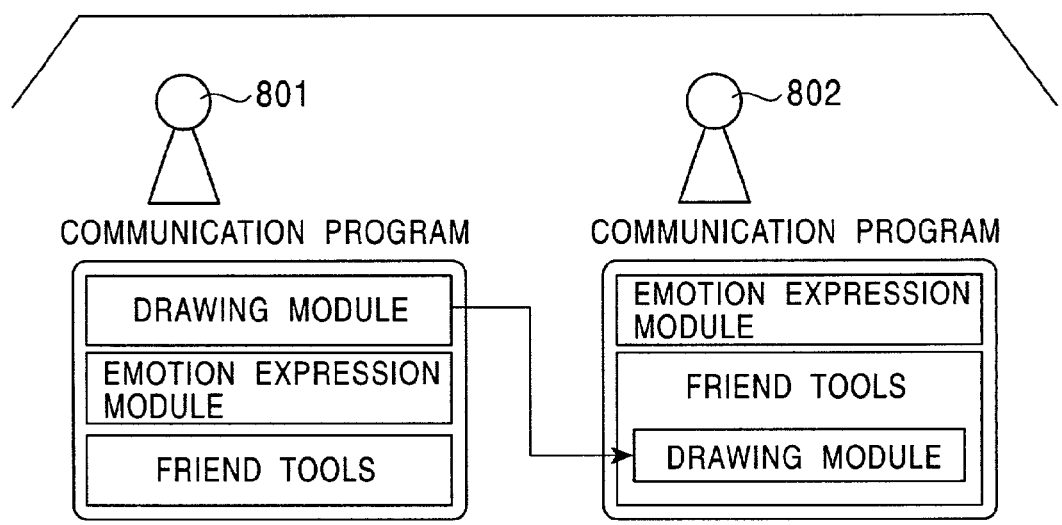
FIG. 46 is a model diagram describing the state wherein a function module has been exchanged by the communication program.

Now the communication system according to the present embodiment enables the "drawing module" to be sent from the first user 801 side to the second user 802 side in such a case. Thus, as shown in FIG. 46, the "drawing module" is installed in the memory area set as "FRIEND TOOLS", and subsequently, the first user 801 and the second user 802 can communicate using this "drawing module".

(2-8-2) Practical Exchange of Function Modules

Figure 47:
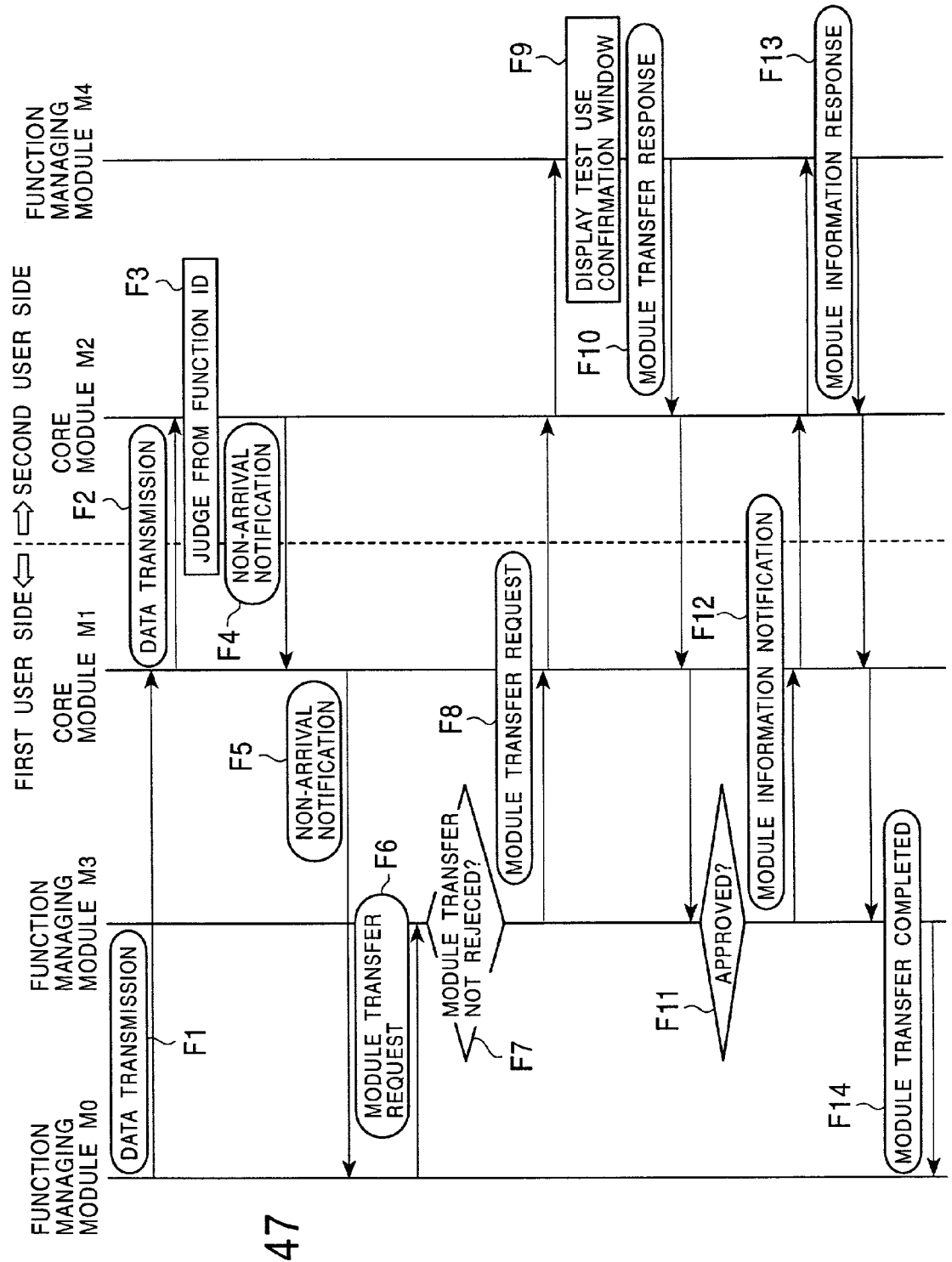
FIG. 47 is a flowchart explaining a case of exchanging a function module by the communication program.

Next, the following is a description of a case of sending of particular function module from the first user 801 side to the second user 802 side, as described above, with reference to the flowchart shown in FIG. 47. In the following description, let us assume that a function module M0 which is the object of being sent exists at the first user 801 side, and core modules M1 and M2, and functions managing modules M3 and M4 serving as a basic module 652 for performing function module managing processing, exist at both the first and second user 801 and 802 sides.

First, upon the functions provided by the function module M0 being used at the first user 801 side, the data used by this function is transmitted from the function module M0 to the core module M1 (F1), and is transmitted from the core module M1 to the core module M2 at the second user 802 side (F2).

The core module M2 at the second user 802 side makes reference to the function module list based shown the data delivery destination contained in the received data (e.g., function ID of the intended function module), and judges whether or not the function module intended for delivery is installed (F3). In the event that this is not installed, the core module M2 transmits a non-arrival notification, indicating that the function module corresponding to the received data does not exist, to the core module M1 at the first user 801 side (F4). This non-arrival notification is transmitted from the core module M1 to the function module M0 (F5).

The function module M0, upon receiving the non-arrival notification, requests the function managing module M3 to transmit a duplication of the function module M0 to the second user 802 side (F6). The function managing module M3 confirms whether or not transfer of the function module M0 has been rejected by the second user 802, in this session established with the second user 802 (F7). In the event that this has not been rejected, or in the event that this is the first time of transferring the function module M0 to the second user 802 in the session, the function managing module M3 requests transfer of the function module to the function managing module M4 at the second user 802 side, via the core module M1 and the core module M2.

Figure 48:
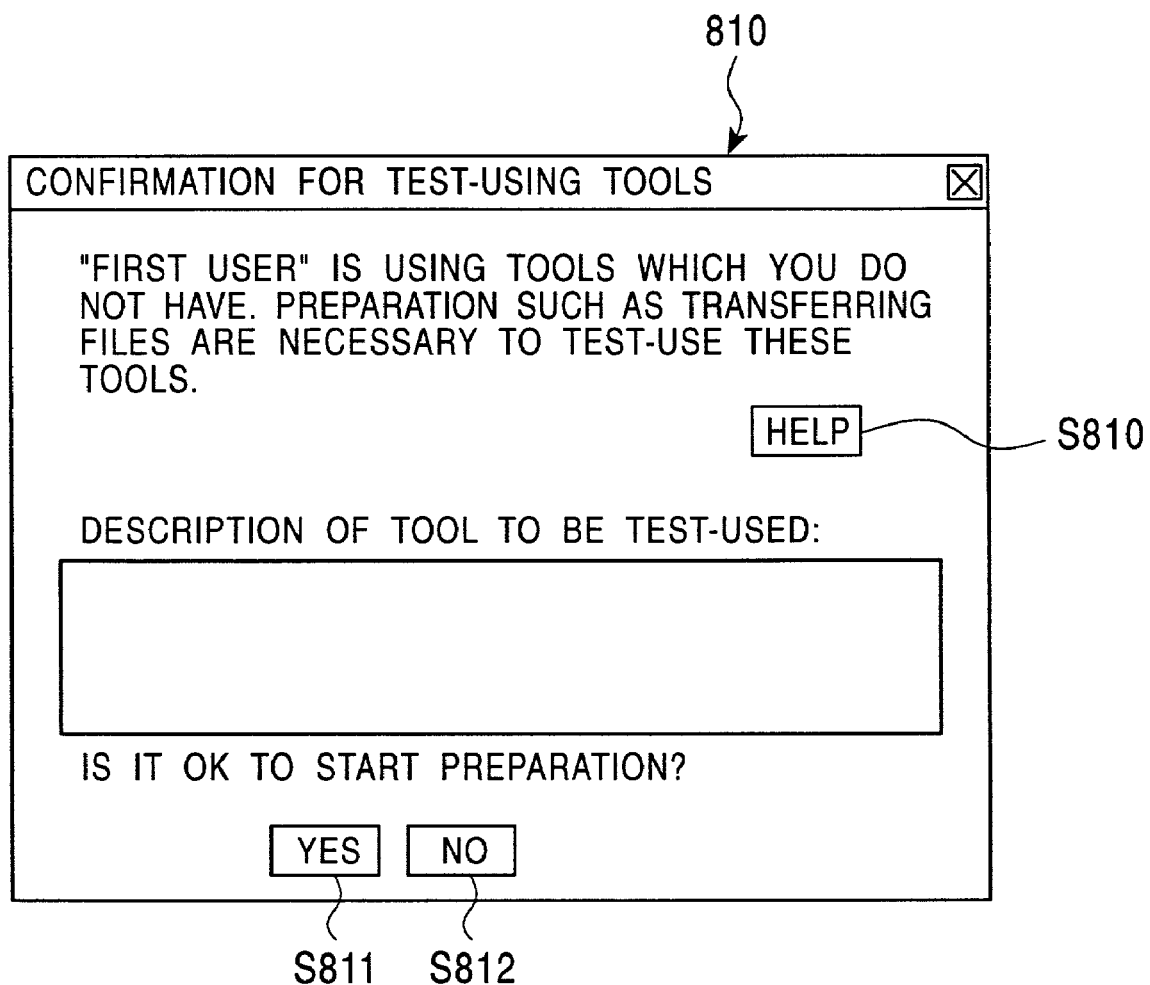
FIG. 48 is a model diagram illustrating an example of a test-use confirmation window which is displayed on the screen of the computer apparatus by exchanging a function module with the communication program.

Next, the function managing module M4 displays a test-use confirmation window 810 on the display screen of the computer apparatus 610 as shown in FIG. 48, for example, and notifies the second user 802 that the function module will be test-used (F9).

The test-use confirmation window 810 displays a message notifying to the effect that another user is using a function which is realized by function module not installed to the second user 802, and that there is the need to transfer to function module in order to use this function. In the event that the user selects a help button S810 positioned within this test-use window 810, detailed description relating to transfer of the function module, for example, is displayed in a separate window or the like.

In the event that transfer of the function module is accepted in this test-use confirmation window 810, by the second user 802 selecting a "YES" button S811 in response to a query to the user regarding whether or not the user agrees to start the transfer of the function module, or some other like means, the function managing module M4 proceeds with the processing to perform a transfer of the function module. Also, in the event that the "NO" button S812 is selected or the like, the subsequent transfer processing of the function module is cancelled.

Upon the second user 802 accepting transfer, the function managing module M4 judges whether or not the transfer request transmitted from the first user is a valid request, and then requests the first user 801 side function managing module M3 to start transfer of the function module, via the core module M2 and the core module Ml (F10).

Now, the transfer start request is made following judgement by the function managing module M4 regarding whether or not the transfer request is a valid request, so reception unauthorized function modules, with tampering of the contents or the like, can be prevented. Such judgment can be realized using correlation information for performing coloration, such as the size, check sum, etc., for example. Specifically, for example, at the time that the module transfer request is performed in step F8, such correlation information might be sent from the function managing module M3 to the function managing module M4 beforehand, to be combined at the time of actually exchanging data relating to the function module between the first user side at 801 and the second user side 802.

Next, the function managing module M3 at the first user 801 side detects that transfer of the function module has been accepted at the second user 802 side (F11), so the function module M0 is transferred to the second user 802 side function managing module M3 via the core module M1 and the core module M2 (F12).

Then, upon the function module M0 being successfully transferred, the function managing module M4 transmits a response indicating that the transfer has been successfully completed, to the function managing module M3 (F13). Next, the function managing module M3 transmits to the function module M0 a message indicating that the duplicate of the function module M0 has been transmitted to the second user 802 side (F14).

Due to the above transfer processing, transfer of the function module M0 from the first user 801 to the second user 802 is completed, and hereafter the first user 801 and the second user 802 can communicate using the function provided by this function module M0 by transmitting and receiving between the function modules of the first user 801 and the second user 802.

Further, in the above-described step F12, the function ID or the like of the function module M0 to be transferred is preferably transmitted before transmitting the function module MO itself. While this will be described in detail later, this allows the function module M0 to be placed in a temporarily-usable state based on the received function ID, in the event that the second user 802 side already has a function module M0 in a test-use state in the hard disk drive 623, or the like. That is to say, in this case, there is no need to transfer to function module M0 itself, so the time and bandwidth needed to transfer the function module itself can be conserved.

Also, in step F12, an arrangement may be made wherein the function module M0 to be transferred is not transmitted all at once, but the data contents are broken down, and the function module M0 is transferred while the function managing modules M3 and M4 confirm whether the data is being correctly transmitted and received.

With the communication systems 600 according to the present embodiment, even in the event that a certain function module is not included in the communication program of the other party, the function module can be transferred to the other party and used, as described above. Accordingly, there is no lack of functions between users due to not having a certain function modules. Also, all users can readily experience various types of functions, which is advantageous in that the use of the function modules are promoted in a natural manner.

(2-8-3) Usage Restrictions on Test-Use Function Modules

Now, the function modules that are provided from the first user 801 as described above and installed in the "FRIEND TOOLS" at the second user 802 side, are in a "test-use" state at the second user 802, as compared to the first user 801 having the rights to use the function module. Accordingly, the second user 802 is in a state of "borrowing" the function module from the first user 801.

Accordingly, at the second user 802 side, in the event that the "test-use" state is reset by the session established with the first user 801 being cut off, or the communication program at the second user 802 side being restarted, for example, use of the function module that is in the test-use state is restricted. The following is a description of such usage restrictions.

With the communication program, information relating to the installed function modules is managed as a function module list, as described above with reference to FIG. 32. This function module list is saved in a predetermined storage area within the hard disk drive 623 of the computer apparatus 610, for example. More specifically, with the Windows (a registered trademark) system, which is the Microsoft operating system, setting information relating to the system itself including the settings and the like of device drivers, and various types of setting information for test-use in applications, are managed in a database called a registry. With the communication program, the function module list can be kept in this registry, for example.

The function module list has information such as identification information correlated with the function module (i.e., function ID), as described above with reference to FIG. 32, and further, includes the recording location on the hard disk drive 623 (path) and test-use flags for judging whether the function module is in the test-use state, and so forth, for each function module.

Of these, the test-use flag indicates that the function module is in a test-use state in the event that the value thereof is TRUE, and indicates that the user has proper rights to use the function module in the event the value thereof is FALSE. Also, in the event that the user has the rights to use the function module, a value within a predetermined valid range is set to the function ID.

Accordingly, with regard to function modules transferred from other users (function modules in the testuse state), the value of the test-use flags in the function module list is set to FALSE, and the value of the function ID in a normal state is set to the value outside of the above-described valid range. Accordingly, under the state that the communication program is normally activated, the use of the function module in the test-use state is restricted.

Figure 49:
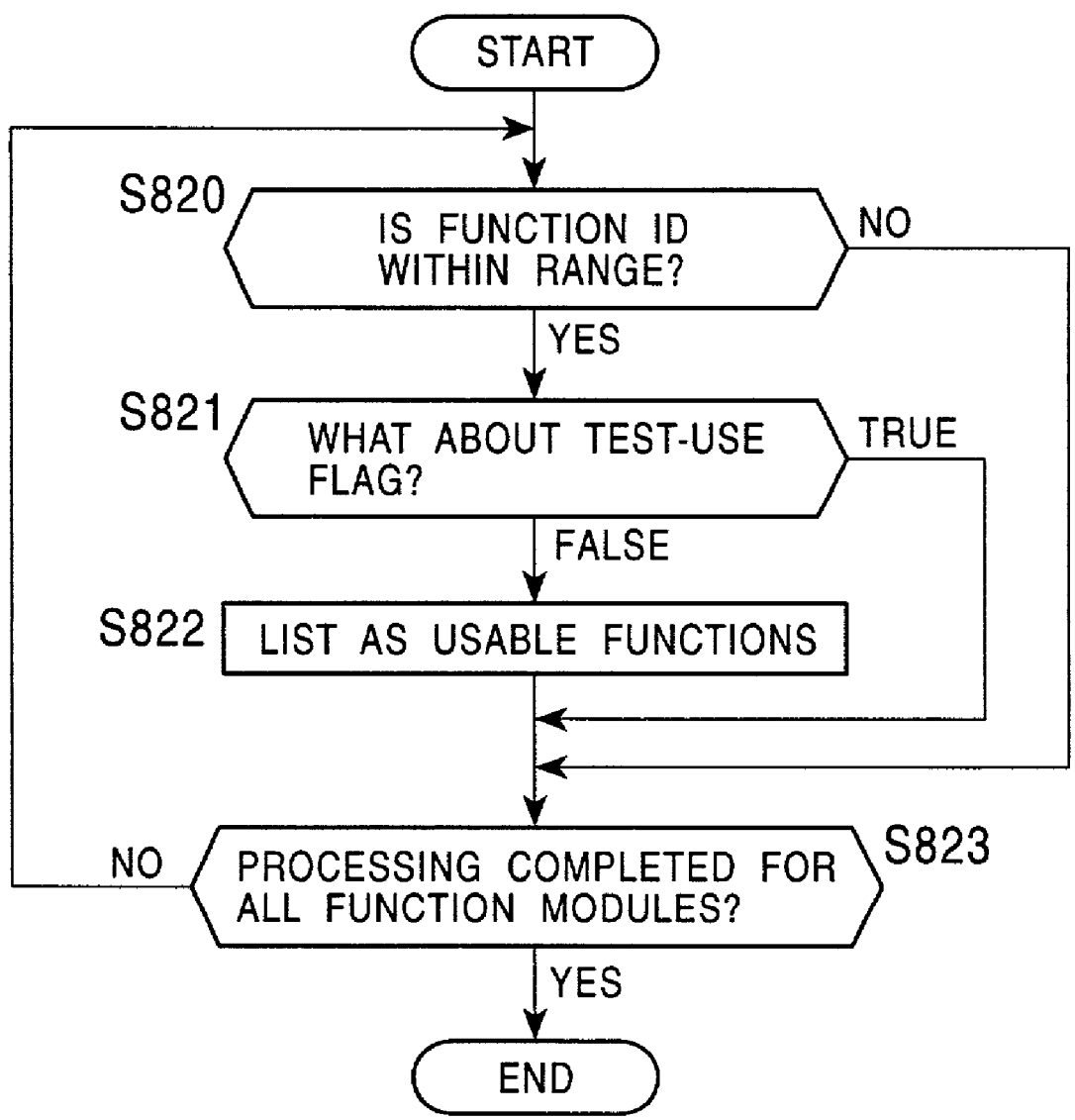
FIG. 49 is a flowchart illustrating processing for selecting a usable function module with the communication program.

Specifically, for example, in the event that the tools button S712e shown in FIG. 40 is selected by the user, processing for selecting usable functions is performed as shown in FIG. 49, before displaying the tools display window 750 shown in FIG. 43.

Upon this function selecting processing being started, in step S820 shown in FIG. 49, the communication program judges whether or not the value of the function ID correlated with each function module is within the predetermined a valid range, by making reference to the function module list. In the event that the results of the judgment so that the value of the function ID is within a valid range, the processing proceeds to step S821, and in the event that the value is outside of the valid range, the processing proceeds to step S823.

In step S821, the communication program makes reference to the value of the test-use flag with regard to the function module. Then, in the event that the value of the test-use flag is FALSE (i.e., in the event that the user has the rights to use it), the processing proceeds to step S822, and in the event that the value of the test-use flag is TRUE (i.e., in the test-use state), the processing proceeds to step S823.

In step S822, the communication program registers this function module as usable, in a list listing usable function modules, for example. Following this registration processing, the processing proceeds to step S823.

In step S823, the communication program judges whether or not the above-described processing has been completed for all function modules listed in the function module this. In the event that the results of this judgment show that processing has not been completed, the processing proceeds to step S820 and processing is performed for the next function module, and in the event that the processing has been completed, the function selection processing is completed.

Following the usable function modules being thus listed, function selection buttons are displayed within the tools display window 750 in the state shown in FIG. 43 for example, regarding the functions provided by the function modules listed in this list. Accordingly, functions corresponding to the function modules which are in a test-use state are not displayed in the tools display window 750, and therefore are unusable.

(2-8-4) Temporary Use of a Test-Use Function Module

Now, a test-use function module which has been received from another user and saved in the hard disk drive 623 of the personal computer apparatus 610, for example, has the test-use flag set to TRUE, and in a normal state the function ID is set to a value outside of the valid range. Accordingly, as described above, the function module is not usable under a normal activation state. However, in the state that a session is established with another communication program (user), in the event that use of the function module in the test-use state is requested from a user of the other party again, the value of the function ID of this function module is restored to the value with in the valid range, and is set to a temporarily usable state.

In this case, the value of the test-use flag of the function module in the test-use state is set to TRUE, so in the event that the tools button S712*e* in the basic display window 710 is selected, for example a function selection button corresponding to the tools display window 750 is not displayed, by the processing shown in FIG. 49.

Figure 50:
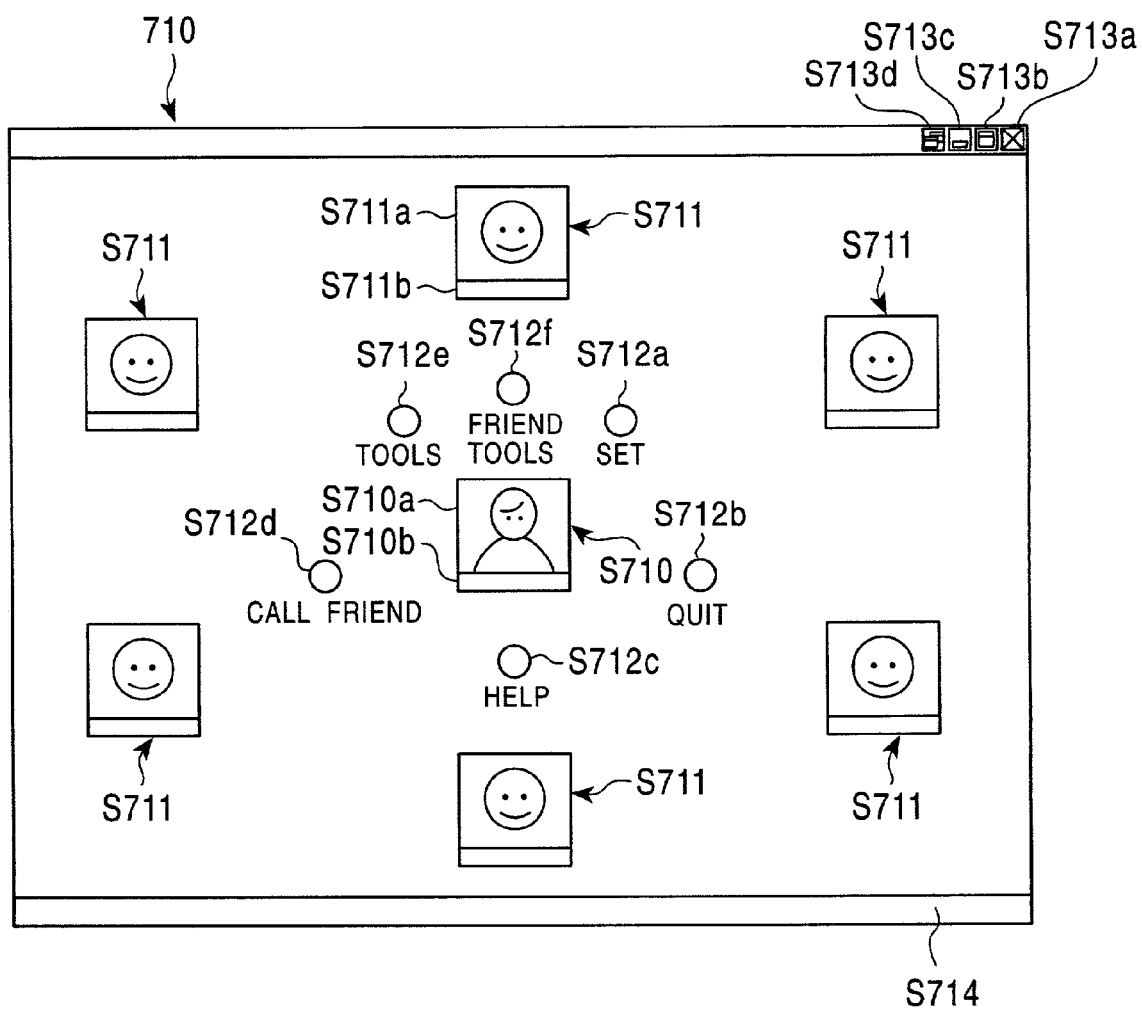
FIG. 50 is a model diagram illustrating an example of basic display window in a state wherein a button is displayed for selecting functions provided from another user with the communication program.

However, in this case, as shown in FIG. 50 for example, a "friend tools" button S712*f* is newly displayed in the basic display window 710. This "friend tools" button S712*f* may be hierarchically displayed in the tools display window 750 shown in FIG. 43, instead of the basic display window 710. Upon the user selecting the "friend tools" button S712*f*, the communication program performs the judging processing shown in FIG. 51.

Figure 51:
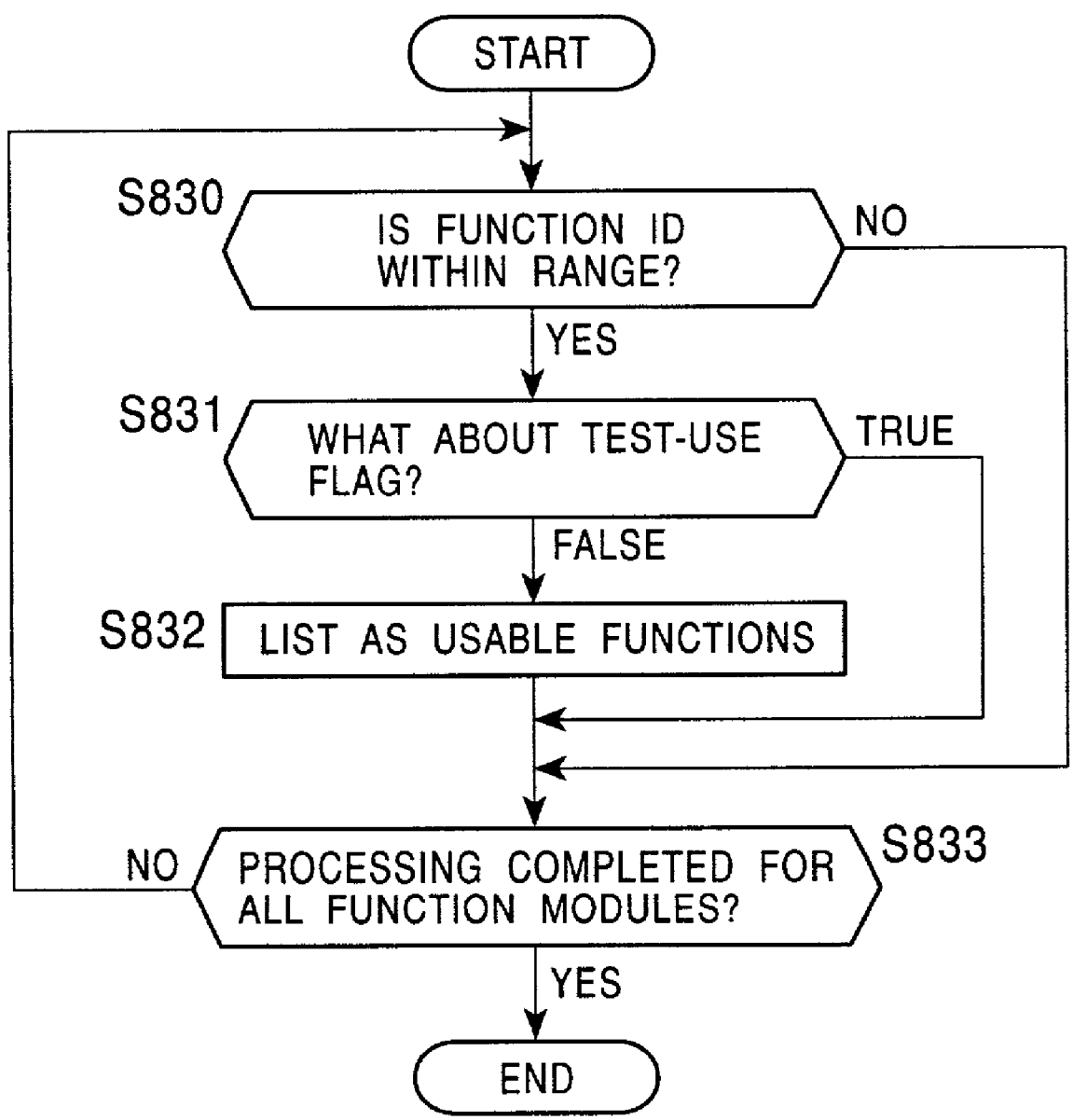
FIG. 51 is a flowchart illustrating judging processing which is performed in the event of using functions provided from another user with the communication program.

That is, in step S830 shown in FIG. 51, the communication program makes reference to the function module list, and judges whether or not the values of the function IDs correlated to the function modules are each within the initially-stipulated valid range. In the event that the results of this judgment show that the values of the function IDs are within the valid range, processing proceeds to step S831, and in the event that the values of the function IDs are outside of the valid range, processing proceeds to step S833. At this time, even though the function module that is the object of a judgment is in the test-use state, the value of the function ID is restored to the value within the valid range, so the processing regarding this function module proceeds to step S831.

In step S831, the communication program makes reference to the test-use flag with regard to this function module. Then, in the event that the value of the test-use flag is true, the processing proceeds to step S833, and in the event that the value of the test-use flag is false (i.e., in a test-use state), the processing proceeds to step S832.

In step S832, the communication program registers this function module in a list listing test-usable function modules, for example, with this function module listed as being test-usable. Following the registration processing, the flow proceeds to step S833.

In step S833, the communication program judges whether or not the above-described processing has been completed for all function modules listed in the function module list. In the event that the results of the judgment shows that processing has not been completed, the processing is returned to step S830 and processing is performed for the next processing module, and in the event of the processing is completed, the function selecting processing is completed.

Following the list of usable function modules being listed as described above, a function selection button is displayed within the window in the state such as shown in FIG. 43, for example, making this usable. However, in this case, only function selection buttons corresponding to the function modules in the test-use state, are displayed in the window. That is to say, the test-use functions provided from other users (i.e., "friend tools") are displayed here.

Also, the communication program makes reference to the function module list at the time of activation, and performs processing for returning the values of the function IDs for the function modules whose test-use flag have been set to true (i.e., the function modules in the test-use state), to their original value (i.e., to the value out side of the valid range). Accordingly upon the next to startup, the function modules in the test-use state are unusable again, until there is the usage request from another user again. In this way, the processing for returning the values of the function IDs may be performed at the time of quitting the communication program for example, but is preferably performed at the time of activation thereof, in the event that a normal quitting process cannot always be guaranteed. Thus, the test-use state of the function module can be maintained in a sure manner.

With the communication system 600 according to the present embodiment, as described above, even in the event of keeping, in the hard disk drive 623, function modules that have been provided from other users in the past that are in the test-use state, a state wherein usage is restricted, and a state wherein temporary use is allowed, can be switched over in a sure and simple manner. Also, keeping the function modules in the test-use state in the hard disk drive 623 does away with the needy for function modules to be transferred between users each time test-using the function module, so the time and communication bandwidth necessary for transferring the function module can be conserved.

(2-9) Other Embodiments

While the above description has been made with regard to a case wherein function modules provided from other users are set in the "test-use" state, and the usage thereof is restricted, the present invention is by no means limited to arrangements wherein such restrictions are employed; rather, arrangements may be made wherein function modules provided from other users can be freely used as with the other function modules, following completion of transfer.

Also, the embodiment describes a function module provided from another user being saved (installed) in the user-side hard disk drive 623, in the state distinguished from other function modules regarding which the user has usage rights, using a function ID or test-use flag in the function module list. That is to say, with the embodiment, even following quitting of the session with a user of the other party who has provided the function module, this test-use function module remains saved in the user-side hard disk drive 623. However, an arrangement may be made wherein, at any point in time described the next, the test-use function module is deleted from the computer apparatus 610 at the user side. That is, at the point that the usage of the function provided by the function module being test-used ends, at the point that the session with the user of the other party who has provided the function module ends, at the point that the communication program quits, at the point that the communication program is activated, etc., the function module may be deleted.

Also, the above description of the embodiments of the present invention has been made around a communication program which is executed on information processing apparatuses making up a communication system 600, but it is needless to say that the present invention may be widely applied to a communication system realized by such communication programs being executed, a communication method realized by procedures equivalent to the processing executed by the above-described communication program, or information processing apparatuses realized by procedures is equivalent to the processing executed by the above-described communication program being realized by other software or hardware means.

Also, the above-described communication program, or software programs for realizing functions the same as the functions realized by this communication program on various type of electronic devices, may be stored in various types of recording media, and provided.

Thus, according to the present invention, at the time of exchanging information processed by particular function module between multiple information processing apparatuses, even in the event that the function module does not exist at the receiving-side information processing apparatus, the function module can be transmitted from the sending-side information processing apparatus. Accordingly, the information processed by this function module can be exchanged, by the function module provided from the sending-side information processing apparatus being executed on the receiving-side information processing apparatus.

Accordingly, there is no lack of functions between users of the information processing apparatuses due to not having a certain function modules. Also, all users can readily experience various types of functions, which is advantageous in that the use of the function modules are promoted in a natural manner. Also, even in the event that a particular function module does not exist at the user side, the function module which another user with which a session has been established has started using is transferred, so the user can use the functions provided by this function module. Thus, users only need to keep function modules which provide the functions suiting their tastes, within their information processing apparatuses.

Also, function modules provided from other users can be used in a so-called test-use state, so a system wherein a price is charged for the use of the function modules, and restrictions are applied to the functions of function modules in the test-use state, can be easily implemented.

What is claimed is:

1. An information processing apparatus, comprising:
    a storage unit configured to store at least one function module, said function module configured to enable execution of a function, said function module including a function code segment configured to produce output based on input;
    a transmitter configured to transmit an existing function module to an other information processing apparatus not including said existing function module, said existing function module including a function code segment configured to produce output based on input;
    a communication unit configured to receive information obtained by executing on said other information processing apparatus the processing of said function according to said transmitted function module, said information transmitted from said other information processing apparatus, said communication unit configured to transmit information to said other information processing apparatus, said information obtained by executing the processing of said function according to said existing function module; and
    an execution unit configured to execute processing of said function according to said existing function module and the information received by the communication unit from said other information processing apparatus.

2. An information processing method, comprising:
    storing at least one function module, said function module configured to enable execution of a function, said function module including a function code segment configured to produce output based on input;
    transmitting an existing function module to an other information processing apparatus not including said existing function module, said existing function module including a function code segment configured to produce output based on input;
    receiving information obtained by executing on said other information processing apparatus the processing of said function according to said transmitted function module, said information transmitted from said other information processing apparatus; and
    transmitting information to said other information processing apparatus, obtained by executing the processing of said function according to said existing function module; and
    executing processing of said function according to said existing function module and the information received by the receiving.

3. A computer readable storage medium including encoded computer readable code which causes a computer to execute a method, comprising:
    storing at least one function module, said function module configured to enable execution of a function, said function module including a function code segment configured to produce output based on input;
    transmitting an existing function module to an other information processing apparatus not including said existing function module, said existing function module including a function code segment configured to produce output based on input;
    receiving information obtained by executing on said other information processing apparatus the processing of said function according to said transmitted function module, said information transmitted from said other information processing apparatus; and
    transmitting information to said other information processing apparatus, obtained by executing the processing of said function according to said existing function module; and
    executing processing of said function according to said existing function module and the information received by the receiving.

4. An information processing apparatus, comprising:
    a receiver configured to receive a function module transmitted from an other information processing apparatus, said function module configured to enable execution of a function, said function module including a function code segment configured to produce output based on input;
    a communication unit configured to receive information obtained by executing, on said other information processing apparatus, the processing of said function according to said function module, said information transmitted from said other information processing apparatus, said communication unit configured to transmit information to said other information processing apparatus, said information obtained by executing the processing of said function according to said received function module; and
    an execution unit configured to execute processing of said function according to said received function module and the information received by the communication unit from said other information processing apparatus.

5. An information processing method, comprising:
    receiving a function module transmitted from an other information processing apparatus, said function module configured to enable execution of a function, said function module including a function code segment configured to produce output based on input;

receiving information obtained by executing on said other information processing apparatus the processing of said function according to said function module and transmitted from said other information processing apparatus; and transmitting information to said other information processing apparatus, obtained by executing the processing of said function according to said received function module; and executing processing of said function according to said received function module and the information received by the receiving.

6. A computer readable storage medium including encoded computer readable code which cause a computer to execute a method, said method comprising:

receiving a function module transmitted from an other information processing apparatus, said function module configured to enable execution of a function, said function module including a function code segment configured to produce output based on input;

receiving information obtained by executing on said other information processing apparatus the processing of said function according to said function module and transmitted from said other information processing apparatus; and transmitting information to said other information processing apparatus, obtained by executing the processing of said function according to said received function module; and executing processing of said function according to said received function module and the information received by the receiving.

7. An information processing apparatus, comprising:

means for storing at least one function module, said function module configured to enable execution of a function, said function module including a function code segment configured to produce output based on input;

means for transmitting said existing function module to an other information processing apparatus determined to not include said existing function module by said means for determining, said existing function module including a function code segment configured to produce output based on input;

means for communicating configured to receive information obtained by executing on said other information processing apparatus the processing of said function according to said transmitted function module, said information transmitted from said other information processing apparatus, said means for communicating configured to transmit information to said other information processing apparatus, said information obtained by executing the processing of said function according to said existing function module; and means for executing processing of said function according to said existing function module and the information received by said means for communication from said other information processing apparatus.

8. An information processing apparatus, comprising:

means for receiving a function module transmitted from an other information processing apparatus, said function module configured to enable execution of a function, said function module including a function code segment configured to produce output based on input;

means for communicating configured to receive information obtained by executing, on said other information processing apparatus, the processing of said function according to said function module, said information transmitted from said other information processing apparatus, said means for communicating configured to transmit information to said other information processing apparatus, said information obtained by executing the processing of said function according to said received function module; and means for executing processing of said function according to said received function module and the information received by said means for communicating from said other information processing apparatus.

* * * * *